(12) United States Patent
Kouno

(10) Patent No.: US 10,321,128 B2
(45) Date of Patent: Jun. 11, 2019

(54) IMAGE ENCODING APPARATUS AND IMAGE ENCODING METHOD

(71) Applicant: SONY CORPORATION, Tokyo (JP)

(72) Inventor: Masakazu Kouno, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/545,084

(22) PCT Filed: Jan. 22, 2016

(86) PCT No.: PCT/JP2016/051804
§ 371 (c)(1),
(2) Date: Jul. 20, 2017

(87) PCT Pub. No.: WO2016/125604
PCT Pub. Date: Aug. 11, 2016

(65) Prior Publication Data
US 2018/0288406 A1    Oct. 4, 2018

(30) Foreign Application Priority Data
Feb. 6, 2015  (JP) ................. 2015-022235

(51) Int. Cl.
*H04N 19/103*  (2014.01)
*H04N 19/109*  (2014.01)
(Continued)

(52) U.S. Cl.
CPC ......... *H04N 19/103* (2014.11); *H04N 19/119* (2014.11); *H04N 19/124* (2014.11);
(Continued)

(58) Field of Classification Search
CPC ..... H04N 19/103; H04N 19/109; H04N 19/11
(Continued)

(56) References Cited

U.S. PATENT DOCUMENTS

2005/0157784 A1    7/2005    Tanizawa et al.
2006/0165170 A1    7/2006    Kim et al.
(Continued)

FOREIGN PATENT DOCUMENTS

CN    1809168 A    7/2006
CN    105247864 A    1/2016
(Continued)

OTHER PUBLICATIONS

Lin, et al., "Layer-Adaptive Mode Decision and Motion Search for Scalable Video Coding With Combined Coarse Granular Scalability (CGS) and Temporal Scalability", 2007, 289-292 pages.
(Continued)

*Primary Examiner* — Dominic D Saltarelli
(74) *Attorney, Agent, or Firm* — Chip Law Group

(57) ABSTRACT

The present disclosure relates to an image encoding apparatus that makes it possible to improve the encoding speed while maintaining the image quality. A statistical information calculation unit supplies calculated statistical information to a table selection unit. Further, a picture type of an image from a screen rearrangement buffer and a quantization parameter Qp from a rate control unit are supplied to the table selection unit. The table selection unit determines a mode table to be used from a plurality of mode tables stored in a table storage unit on the basis of the statistical information and the picture type. For example, the table selection unit selects the mode table according to whether the statistical information is larger or smaller than a predetermined threshold. The present disclosure can be applied to, for example, an image processing apparatus that performs encoding.

16 Claims, 28 Drawing Sheets

(51) Int. Cl.
- *H04N 19/11* (2014.01)
- *H04N 19/176* (2014.01)
- *H04N 19/157* (2014.01)
- *H04N 19/124* (2014.01)
- *H04N 19/159* (2014.01)
- *H04N 19/119* (2014.01)

(52) U.S. Cl.
CPC ......... *H04N 19/157* (2014.11); *H04N 19/159* (2014.11); *H04N 19/176* (2014.11)

(58) Field of Classification Search
USPC .......................... 375/240.02, 240.03, 240.13
See application file for complete search history.

(56) References Cited

U.S. PATENT DOCUMENTS

| | | | | |
|---|---|---|---|---|
| 2015/0304681 A1* | 10/2015 | An | ........................ | H04N 19/597 375/240.16 |
| 2015/0319451 A1* | 11/2015 | Henry | .................. | H04N 19/196 375/240.12 |
| 2015/0373332 A1* | 12/2015 | Kim | ..................... | H04N 19/176 375/240.03 |
| 2015/0381980 A1 | 12/2015 | Tsuchiya et al. | | |
| 2016/0014421 A1* | 1/2016 | Cote | .................... | H04N 19/196 382/170 |
| 2016/0100180 A1* | 4/2016 | Oh | ........................ | H04N 19/172 375/240.08 |

FOREIGN PATENT DOCUMENTS

| | | |
|---|---|---|
| JP | 2005-191706 A | 7/2005 |
| JP | 2006-203909 A | 8/2006 |
| JP | 2009-021927 A | 1/2009 |
| JP | 2012-160991 A | 8/2012 |
| JP | 2014-236264 A | 12/2014 |
| WO | 2012/105406 A1 | 8/2012 |
| WO | 2014/192244 A1 | 12/2014 |

OTHER PUBLICATIONS

Hung-Chih Lin et al., "Layer-Adaptive Mode Decision and Motion Search for Scalable Video Coding with Combined coarse Granular Scalability (CGS) and Temporal Scalability", IEEE International Conference on Image processing (ICIP 2007), vol. 2, Sep. 2007, II-289-II-292 pages.

International Search Report and Written Opinion of PCT Application No. PCT/JP2016/051804, dated Apr. 5, 2016, 02 pages of English Translation and 08 pages of ISRWO.

* cited by examiner

|  | AVC | HEVC |
|---|---|---|
| DIRECTIONAL PREDICTION | 9 DIRECTIONS | 33 DIRECTIONS |
| NONDIRECTIONAL PREDICTION | Plane (16 × 16), DC | Planar, DC (IMPROVED) |
| PREDICTION UNIT SIZE | 4 × 4, 8 × 8, 16 × 16 | 4 × 4, 8 × 8, 16 × 16, 32 × 32 |

FIG. 14

| Qp | INTRA ||||| INTER ||||||||||||||||||||
|---|---|---|---|---|---|---|---|---|---|---|---|---|---|---|---|---|---|---|---|---|---|---|
| | 64x64 | 32x32 | 16x16 | 8x8 | 4x4 | 64x64 | 64x32 | 32x64 | 32x32 | 32x24 | 32x16 | 32x8 | 24x32 | 16x32 | 16x16 | 16x12 | 16x8 | 16x4 | 12x16 | 8x16 | 8x8 | 8x4 | 4x8 | 4x4 |
| 0 TO 19 | x | x | x | x | ○ | x | x | x | x | x | x | x | x | x | x | x | x | x | x | x | x | ○ | ○ | ○ |
| 20 TO 28 | x | x | x | ○ | x | x | x | x | x | x | x | x | x | x | ○ | x | x | x | x | x | ○ | x | x | x |
| 29 TO 36 | x | x | ○ | x | x | x | x | x | ○ | x | ○ | x | x | x | ○ | x | x | x | x | x | x | x | x | x |
| 37 TO 43 | x | ○ | x | x | x | ○ | x | x | ○ | x | ○ | x | x | x | x | x | x | x | x | x | x | x | x | x |
| 44 TO 51 | ○ | x | x | x | x | ○ | ○ | ○ | x | x | x | x | x | x | x | x | x | x | x | x | x | x | x | x |

○ : AVAILABLE MODE
× : UNAVAILABLE MODE

FIG. 15

| qp | INTRA | | | | | INTER | | | | | | | | | | | | | | | | |
|---|---|---|---|---|---|---|---|---|---|---|---|---|---|---|---|---|---|---|---|---|---|---|
| | 64x64 | 32x32 | 16x16 | 8x8 | 4x4 | 64x64 | 64x32 | 32x64 | 32x32 | 32x24 | 32x16 | 24x32 | 16x32 | 8x32 | 16x16 | 16x12 | 16x8 | 16x4 | 12x16 | 8x16 | 4x16 | 8x8 | 8x4 | 4x8 | 4x4 |
| 0 TO 19 | x | x | x | x | O | x | x | x | x | x | x | x | x | x | x | x | x | x | x | x | x | O | x | x | O |
| 20 TO 51 | x | x | x | O | x | x | x | x | x | x | x | x | x | x | x | x | x | x | x | x | x | x | x | x | x |

○: AVAILABLE MODE
×: UNAVAILABLE MODE

FIG. 19

| Qp | INTRA | | | | | | INTER | | | | | | | | | | | | | |
|---|---|---|---|---|---|---|---|---|---|---|---|---|---|---|---|---|---|---|---|---|
| | 64x64 | 32x32 | 16x16 | 8x8 | 4x4 | 64x64 | 64x32 | 32x64 | 32x32 | 32x24 | 32x8 | 24x32 | 16x32 | 16x16 | 16x12 | 16x8 | 16x4 | 12x16 | 8x16 | 8x8 | 8x4 | 4x16 | 4x8 | 4x4 |
| 0 TO 19 | × | ○ | ○ | ○ | ○ | × | × | × | ○ | × | × | × | × | ○ | × | ○ | × | × | ○ | ○ | × | × | × | × |
| 20 TO 36 | ○ | ○ | ○ | ○ | × | ○ | × | × | ○ | × | × | × | × | ○ | × | ○ | × | × | ○ | ○ | × | × | × | × |
| 37 TO 51 | ○ | ○ | ○ | ○ | × | ○ | ○ | ○ | ○ | ○ | × | × | × | ○ | × | × | × | × | × | ○ | × | × | × | × |

○: AVAILABLE MODE
×: UNAVAILABLE MODE

FIG. 20

| Qp | INTRA | | | | INTER | | | | | | | | | | | | | | | | | |
|---|---|---|---|---|---|---|---|---|---|---|---|---|---|---|---|---|---|---|---|---|---|---|
| | 64x64 | 32x32 | 16x16 | 8x8 | 4x4 | 64x64 | 64x32 | 32x64 | 32x32 | 32x24 | 32x16 | 24x32 | 16x32 | 16x16 | 16x12 | 16x8 | 16x4 | 12x16 | 8x16 | 4x16 | 8x8 | 8x4 | 4x8 | 4x4 |
| 0 TO 51 | x | x | x | o | o | x | x | x | x | x | x | x | x | x | x | x | x | x | x | x | o | o | o | o |

○: AVAILABLE MODE
×: UNAVAILABLE MODE

IMAGE ENCODING APPARATUS AND IMAGE ENCODING METHOD

CROSS REFERENCE TO RELATED APPLICATIONS

This application is a U.S. National Phase of International Patent Application No. PCT/JP2016/051804 filed on Jan. 22, 2016, which claims priority benefit of Japanese Patent Application No. JP 2015-022235 filed in the Japan Patent Office on Feb. 6, 2015. Each of the above-referenced applications is hereby incorporated herein by reference in its entirety.

TECHNICAL FIELD

The present disclosure relates to an image encoding apparatus and an image encoding method, and particularly, to an image encoding apparatus and an image encoding method that make it possible to improve the encoding speed while maintaining the image quality.

BACKGROUND ART

High efficiency video coding (HEVC) includes various encoding tools taking the encoding efficiency into consideration. One of the encoding tools is various prediction modes.

When a prediction mode is determined, an encoding apparatus typically calculates a cost of each prediction mode by adding a value obtained by multiplying a bit generation amount by a weighting factor (which depends on a quantization parameter Qp) and a distortion amount, and selects a prediction mode having the smallest cost as an optimal prediction mode.

Further, for example, Patent Document 1 proposes operation amount reduction in prediction mode selection in the case of H.264 and MPEG-4 Part 10 (advanced video coding, hereinbelow, referred to as AVC).

CITATION LIST

Patent Document

Patent Document 1: Japanese Patent Application Laid-Open No. 2009-21927

SUMMARY OF THE INVENTION

Problems to be Solved by the Invention

However, in a case where coding is performed using a considerably larger number of prediction modes than prediction modes used in AVC, and costs of all the prediction modes are calculated, the calculation amount becomes enormous. Thus, for example, usage as an encoder for a low-delay or real-time purpose is difficult.

The present disclosure has been made in view of the above circumstances and makes it possible to improve the encoding speed while maintaining the image quality.

Solutions to Problems

An image encoding apparatus of one aspect of the present disclosure includes: a setting unit that sets a prediction mode used in encoding an image in a state in which there is a limitation on a type of a prediction mode to be a selection target according to a quantization parameter used in encoding the image; and an encoding unit that encodes the image for each recursively partitioned coding block according to the prediction mode set by the setting unit.

The setting unit may set a prediction mode used in encoding an image in a state in which there is a limitation on a prediction mode to be a selection target for each range of the quantization parameter.

The setting unit may set a prediction mode used in encoding an image in a state in which a prediction mode having a small block size is a selection target and a prediction mode having a large block size is a non-selection target in a case where the quantization parameter is smaller than a threshold.

The setting unit may set a prediction mode used in encoding an image in a state in which a prediction mode having a large block size is a selection target and a prediction mode having a small block size is a non-selection target in a case where the quantization parameter is equal to or larger than a threshold.

The setting unit may set a prediction mode used in encoding an image in a state in which a prediction mode of asymmetric motion partitioning is a non-selection target.

The setting unit may set a prediction mode used in encoding an image in a state in which a prediction mode having a block size equal to or larger than a predetermined size is a non-selection target.

The setting unit may change a correspondence relationship between the quantization parameter and a prediction mode to be a selection target according to statistical information of the image.

The setting unit may change the correspondence relationship between the quantization parameter and the prediction mode to be a selection target for each coding tree block (CTB) that is an origin of recursive partitioning of a coding block.

The statistical information of the image may be distributed information or motion information of the image.

The setting unit may change a correspondence relationship between the quantization parameter and a prediction mode to be a selection target according to an application.

The setting unit may change the number of prediction modes to be a selection target according to the application.

The setting unit may change the type of a prediction mode to be a selection target according to the application.

A memory that stores a correspondence relationship between the quantization parameter and a prediction mode to be a selection target in a table form may further be included, and the setting unit may set a prediction mode using a table stored in the memory.

A learning unit that learns a pattern of a prediction mode to be limited according to a prediction mode set by the setting unit may further be included, and the setting unit sets a prediction mode according to the pattern learned by the learning unit.

The learning unit may learn the pattern of the prediction mode to be limited according to a type of the image or statistical information of the image.

An image encoding method includes: setting a prediction mode used in encoding an image in a state in which there is a limitation on a type of a prediction mode to be a selection target according to a quantization parameter used in encoding the image by an image encoding apparatus; and encoding the image for each recursively partitioned coding block according to the set prediction mode by the image encoding apparatus.

In one aspect of the present disclosure, a prediction mode used in encoding an image is set in a state in which there is a limitation on the type of a prediction mode to be a selection target according to a quantization parameter used in encoding an image. Then, the image is encoded for each recursively partitioned coding block according to the set prediction mode.

Further, the above image encoding apparatus may be an independent image processing apparatus or may be an internal block which constitutes one image encoding apparatus.

Effects of the Invention

According to one aspect of the present disclosure, it is possible to encode an image. In particular, it is possible to improve the encoding speed while maintaining the image quality.

Further, the effects described herein are not necessarily limited, and may be any effect described in the present disclosure.

BRIEF DESCRIPTION OF DRAWINGS

FIG. 14 is a diagram illustrating an example of a mode table taking maximization of the encoding efficiency into consideration.

FIG. 15 is a diagram illustrating an example of a mode table taking the subjective image quality into consideration.

FIG. 19 is a diagram illustrating an example of a mode table taking maximization of the encoding efficiency into consideration.

FIG. 20 is a diagram illustrating an example of a mode table taking the subjective image quality into consideration.

MODE FOR CARRYING OUT THE INVENTION

Hereinbelow, embodiments for carrying out the present disclosure (hereinbelow, referred to as the embodiments) will be described. Note that the description will be made in the following order.

0. Summary
1. First Embodiment (Encoding Apparatus)
2. Second Embodiment (Network)
3. Third Embodiment (Computer)
4. Fourth Embodiment (Television Apparatus)
5. Fifth Embodiment (Portable Telephone)
6. Sixth Embodiment (Recoding/Reproducing Apparatus)
7. Seventh Embodiment (Imaging Apparatus)
8. Other Examples of Implementation

SUMMARY (Encoding System)

Hereinbelow, the present technology will be described with an example of application to image encoding/decoding of the high efficiency video coding (HEVC) system.

(Block Partitioning)

Encoding processing is executed in a processing unit called a macroblock in a conventional image encoding system such as MPEG2 or H.264/AVC (hereinbelow, referred to as AVC). The macroblock is a block having a uniform size of 16×16 pixels. On the other hand, in HEVC, encoding processing is executed in a processing unit called a coding unit (CU). The CU is a block that is formed by recursively partitioning the largest coding unit (LCU) and has a variable size. A selectable maximum size of the CU is 64×64 pixels. A selectable minimum size of the CU is 8×8 pixels. A CU having the minimum size is called the smallest coding unit (SCU).

As a result of the employment of the CU having a variable size in this manner, it is possible to adaptively adjust the image quality and the encoding efficiency according to the contents of an image in HEVC. Prediction processing for predictive coding is executed in a processing unit called a prediction unit (PU). The PU is formed by partitioning the CU by one of some partitioning patterns. Further, orthogonal transform processing is executed in a processing unit called a transform unit (TU). The TU is formed by partitioning the CU or the PU up to a certain depth.

(Recursive Block Partitioning)

Figure 1:
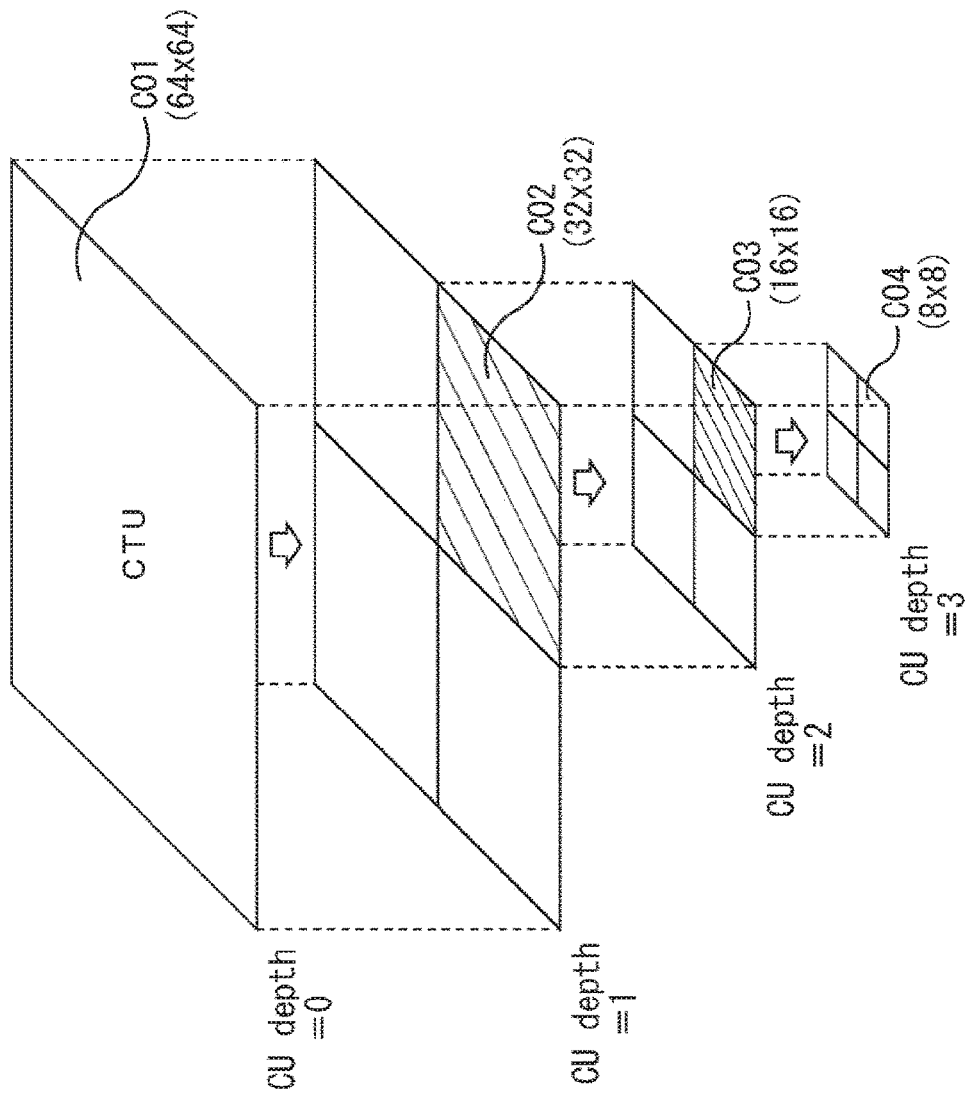
FIG. 1 is an explanatory diagram for describing an outline of recursive block partitioning for a CU in HEVC.

FIG. 1 is an explanatory diagram for describing an outline of recursive block partitioning for a CU in HEVC. The CU block partitioning is performed by recursively repeating the partitioning of one block into four (=2×2) subblocks. As a result, a tree structure having a quad-tree form is formed. One entire quad-tree is referred to as a coding tree block (CTB), and a logical unit corresponding to the CTB is referred to as a coding tree unit (CTU).

As an example, a CU C01 having a size of 64×64 pixels is illustrated in the upper part of FIG. 1. A partitioning depth of the C01 is equal to zero. This means that the C01 is a root of a CTU and corresponds to an LCU. The LCU size can be designated by a parameter encoded in a sequence parameter set (SPS) or a picture parameter set (PPS). A CU C02 is one of four CUs partitioned from the C01 and has a size of 32×32 pixels. A partitioning depth of the C02 is equal to 1. A CU C03 is one of four CUs partitioned from the C02 and has a size of 16×16 pixels. A partitioning depth of the C03 is equal to 2. A CU C04 is one of four CUs partitioned from the C03 and has a size of 8×8 pixels. A partitioning depth of the C04 is equal to 3. In this manner, each CU is formed by recursively partitioning an encoded image. The partitioning depth is variable. For example, a CU having a larger size (that is, having a smaller depth) can be set in a flat image area such as a blue sky. On the other hand, a CU having a smaller size (that is, having a larger depth) can be set in a steep image area including a large number of edges. Further, each set CU serves as a processing unit for encoding processing.

(Setting of PU to CU)

Figure 2:
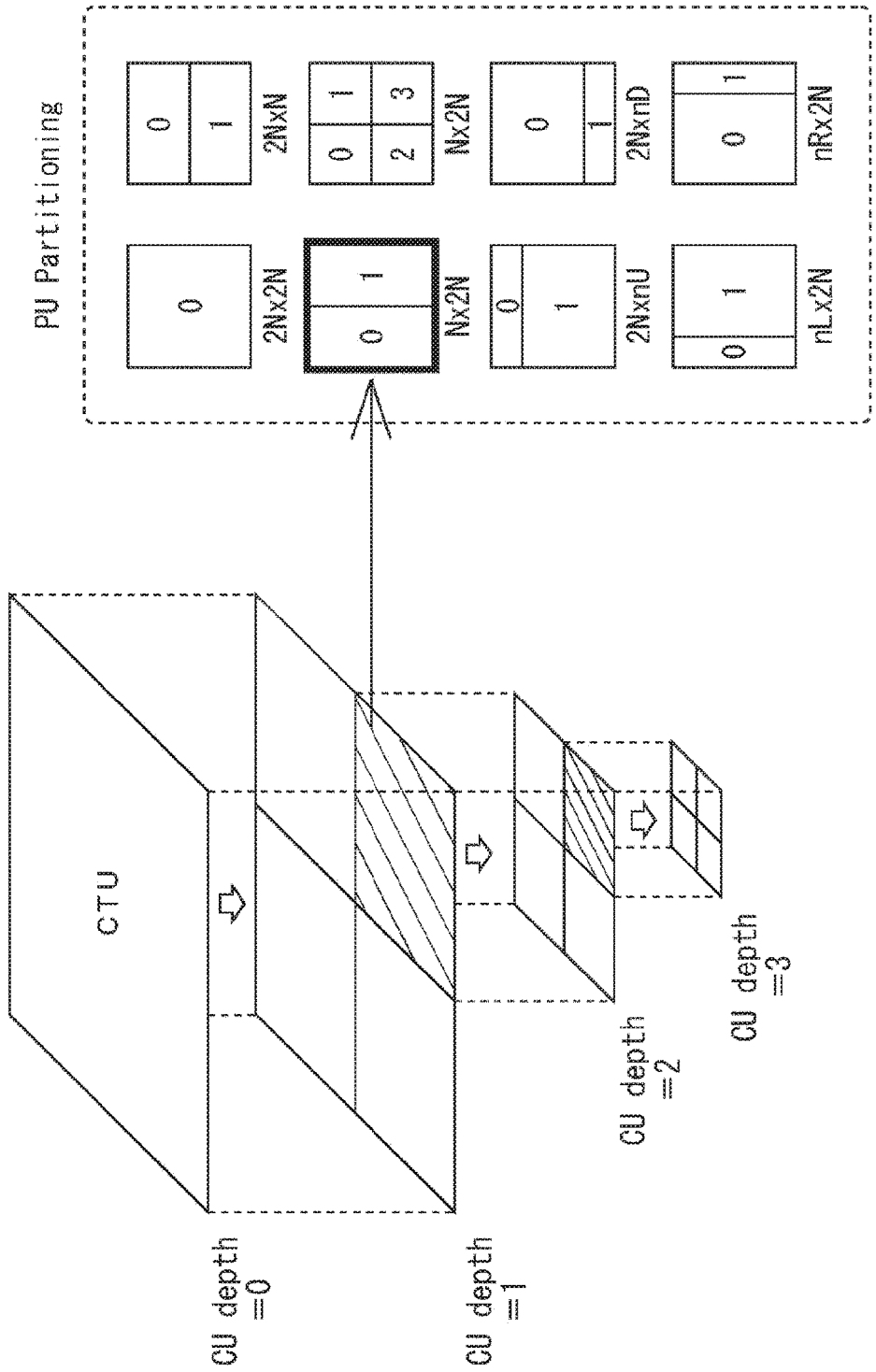
FIG. 2 is an explanatory diagram for describing setting of a PU to the CU illustrated in FIG. 1.

A PU is a processing unit for prediction processing which includes intra prediction and inter prediction. The PU is formed by partitioning a CU by one of some partitioning patterns. FIG. 2 is an explanatory diagram for describing setting of a PU to the CU illustrated in FIG. 1. In the right part of FIG. 2, eight partitioning patterns of 2N×2N, 2N×N, N×2N, N×N, 2N×nU, 2N×nD, nL×2N, and nR×2N are illustrated. In intra prediction, two types of partitioning patterns 2N×2N and N×N can be selected from these partitioning patterns (N×N can be selected only in a SCU). On the other hand, in inter prediction, all the eight types of partitioning patterns can be selected in a case where asymmetric motion partitioning is enabled.

(Setting of TU to CU)

Figure 3:
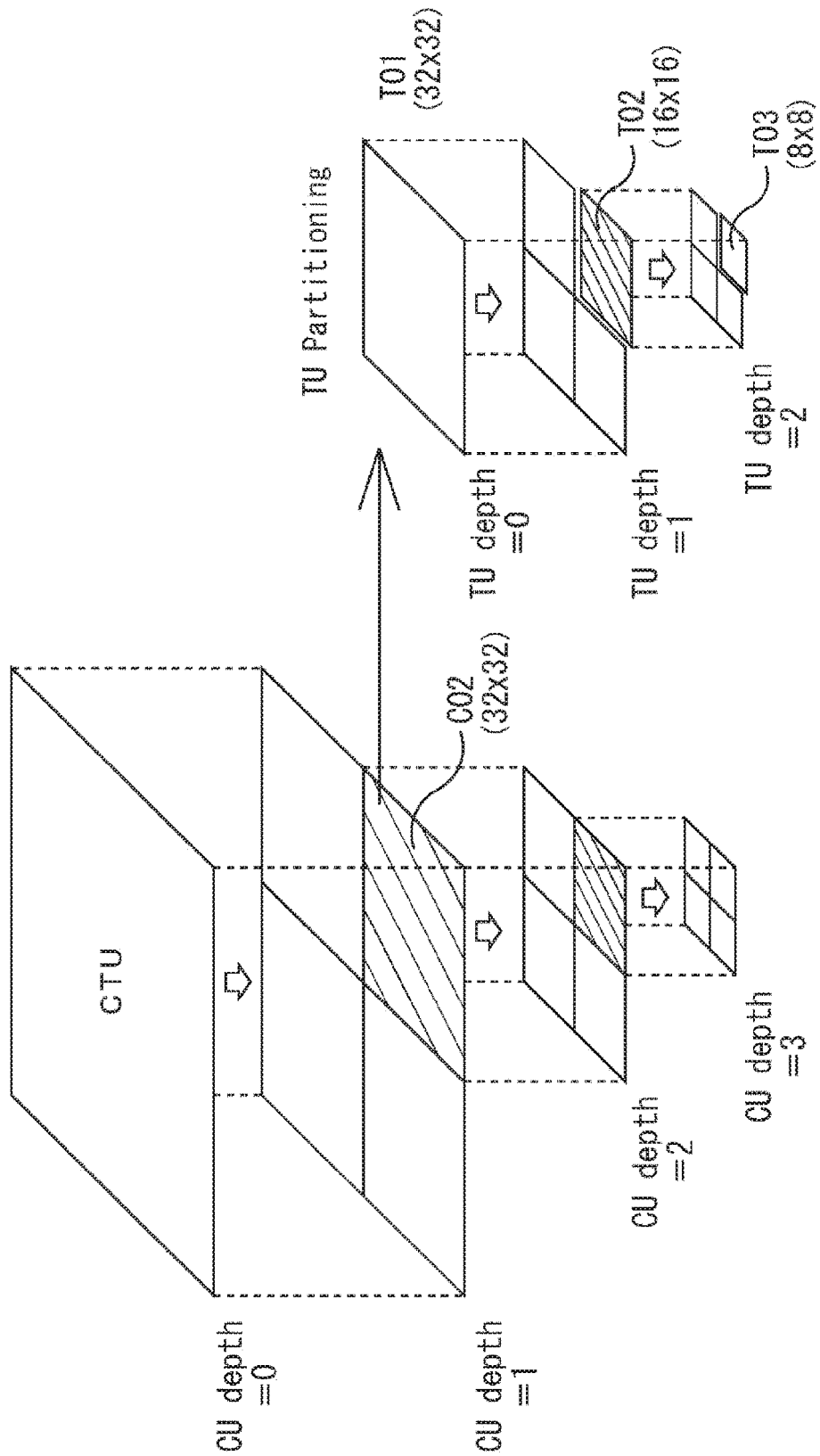
FIG. 3 is an explanatory diagram for describing setting of a TU to the CU illustrated in FIG. 1.

A TU is a processing unit for orthogonal transform processing. The TU is formed by partitioning a CU (in an intra CU, each PU in the CU) up to a certain depth. FIG. 3 is an explanatory diagram for describing setting of a TU to the CU illustrated in FIG. 1. In the right part of FIG. 3, one or more TUs which can be set in the C02 are illustrated. For example, a TU T01 has a size of 32×32 pixels, and a TU partitioning depth thereof is equal to zero. A TU T02 has a size of 16×16 pixels, and a TU partitioning depth thereof is equal to 1. A TU T03 has a size of 8×8 pixels, and a TU partitioning depth thereof is equal to 2.

What kind of block partitioning is performed for setting blocks such as the above CUs, PUs, and TUs in an image is typically determined on the basis of a comparison of costs which influence the encoding efficiency. An encoder compares costs, for example, between one CU of 2M×2M pixels and four CUs of M×M pixels, and determines partitioning the CU of 2M×2M pixels into the four CUs of M×M pixels if setting the four CUs of M×M pixels results in a higher encoding efficiency.

However, the number of types of block sizes selectable in HEVC is considerably larger than that in a conventional image encoding system. A large number of types of selectable block sizes means that there are a large number of combinations of block sizes whose costs should be compared for finding an optimal block size. In contrast, the block size of a macroblock (as a processing unit of encoding processing) in AVC is limited to 16×16 pixels. Although the block size of a prediction block in AVC is variable, the upper limit of the size is 16×16 pixels. The block size of a transform block is 4×4 pixels or 8×8 pixels in AVC. An increase in the types of selectable block sizes in HEVC imposes, on an encoder, a requirement that more pieces of information should be processed with a higher speed within a limited time and increases a mounting cost of the encoder.

(Scanning Order of CUs/PUs)

Figure 4:
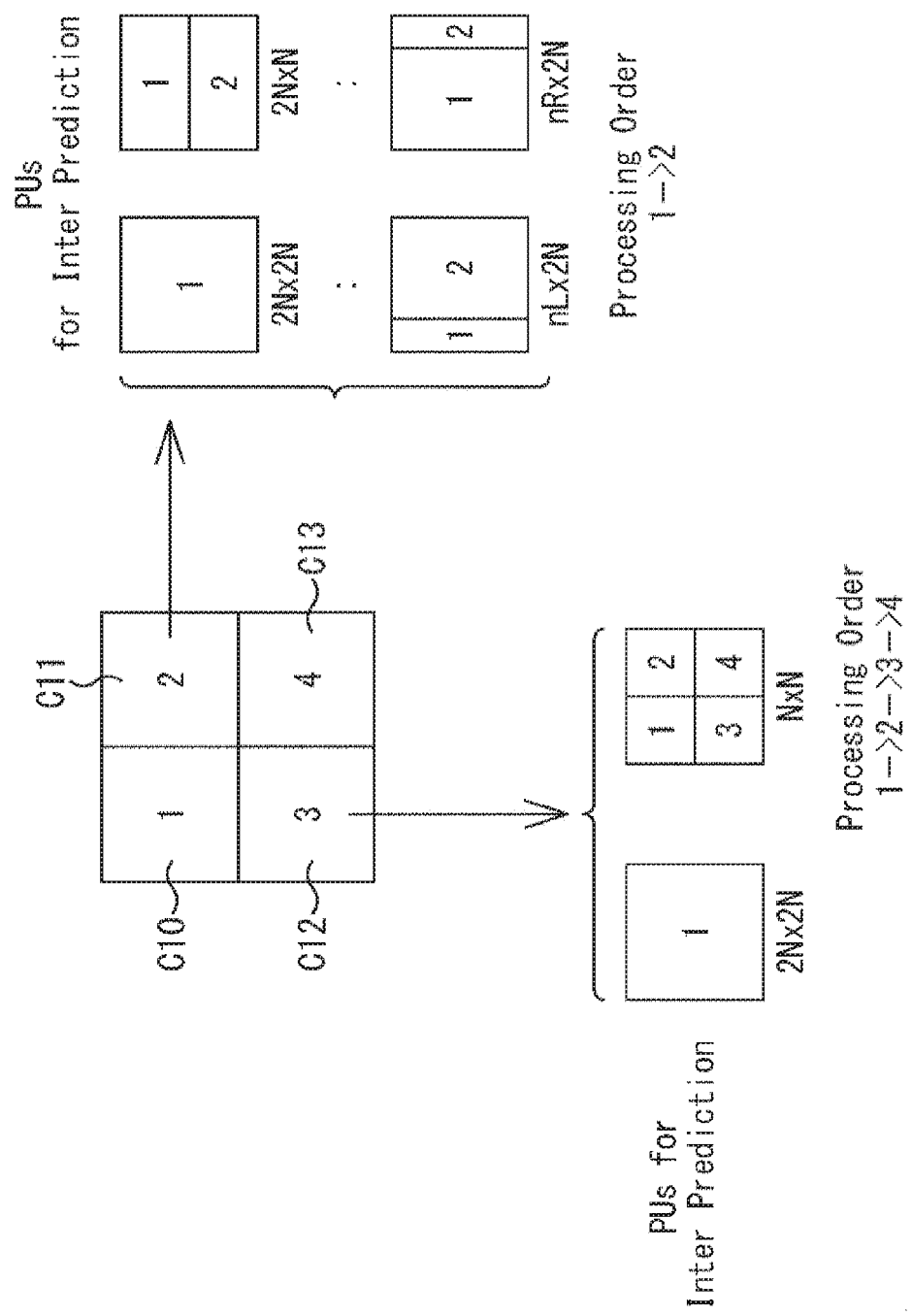
FIG. 4 is an explanatory diagram for describing a scanning order of CUs/PUs.

When an image is encoded, CTBs (or LCUs) which are set in a grid-like form within the image (or a slice, tile) are scanned in a raster-scan order. Within one CTB, CUs are scanned from left to right and from up to down in a quad tree. When a current block is processed, information of upper and left adjacent blocks is used as input information. FIG. 4 is an explanatory diagram for describing a scanning order of CUs/PUs. In the upper left of FIG. 4, four CUs C10, C11, C12, and C13 which can be included in one CTB are illustrated. A numerical value inside a frame of each CU represents the order of processing. Encoding processing is executed in the order of an upper left CU C10, an upper right CU C11, a lower left CU C12, and a lower right CU C13. In the right part of FIG. 4, one or more PUs for inter prediction which can be set in the CU C11 are illustrated. In the lower part of FIG. 4, one or more PUs for intra prediction which can be set in the CU C12 are illustrated. As indicated by numerical values inside frames of these PUs, the PUs are also scanned from left to right and from up to down. When one block is partitioned into more subblocks, the number of subblocks which should be scanned in series increases. As a result, a clock of a processing circuit becomes tight, and the number of memory accesses also increases. Thus, such block partitioning into smaller blocks may also increase performance requirements of the encoder.

(Reference of Adjacent Blocks)

Figure 5:
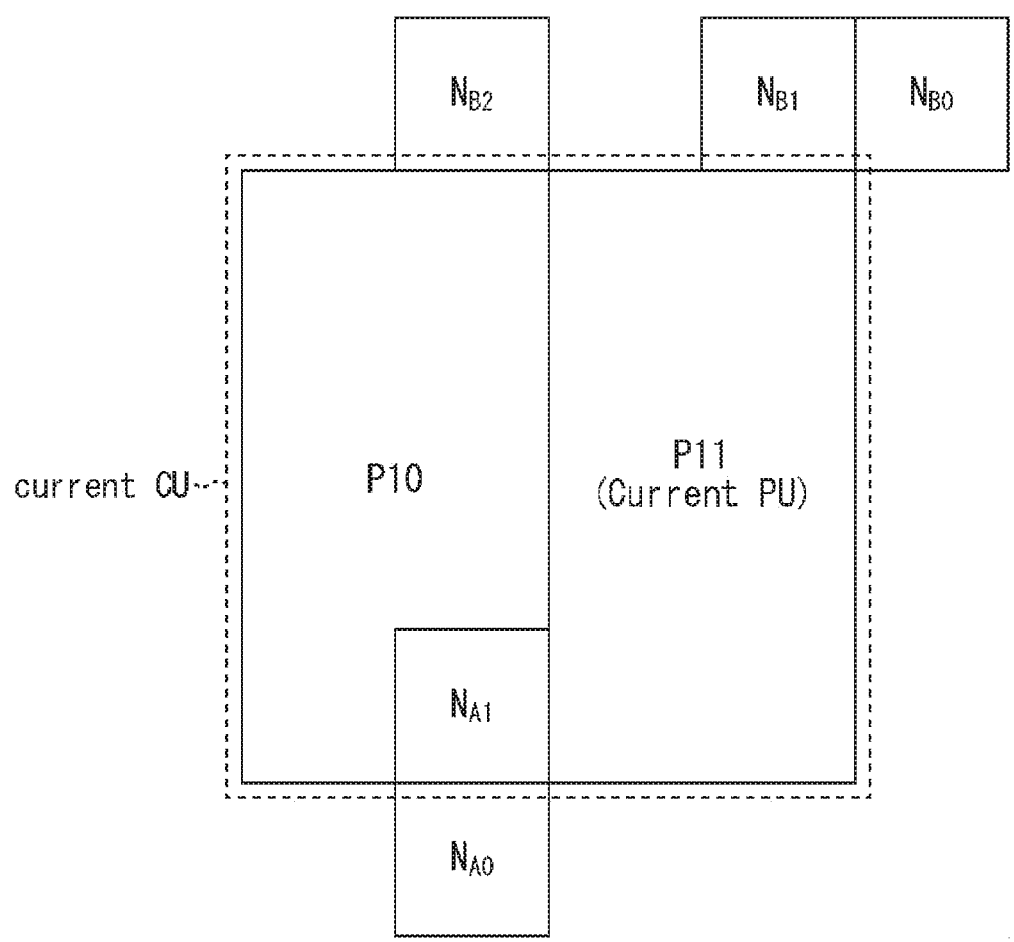
FIG. 5 is an explanatory diagram for describing reference of adjacent PUs in inter prediction processing.

Inter prediction of HEVC has a mechanism called adaptive motion vector prediction (AMVP). In AMVP, in order to reduce a code amount of motion vector information, motion vector information of a current PU is predictively encoded on the basis of motion vector information of adjacent PUs. FIG. 5 is an explanatory diagram for describing reference of adjacent PUs in inter prediction processing. In the example of FIG. 5, two PUs P10 and P11 are set in a current CU. The PU P11 is a current PU. In AMVP of inter prediction processing for the PU P11, motion vectors set in left adjacent blocks $N_{AO}$ and NA and upper adjacent blocks $N_{B0}$, $N_{B1}$ and $N_{B2}$ are referred to as candidates for a predictive motion vector. Thus, the inter prediction processing for the PU P11 is executed after the end of inter prediction processing for these upper and left adjacent blocks.

Figures 6, 7:
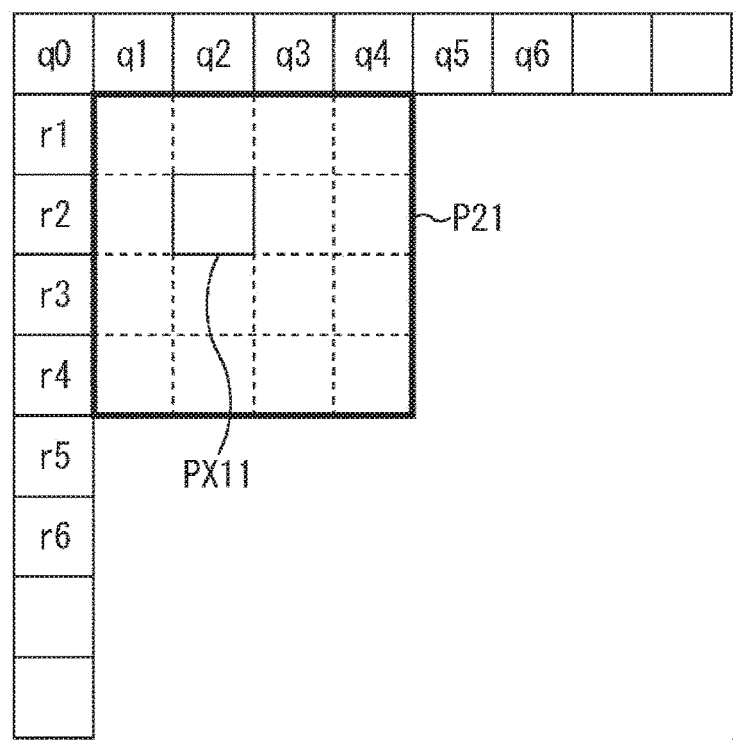
FIG. 6 is an explanatory diagram for describing reference of adjacent PUs in intra prediction processing.
FIG. 7 is a diagram illustrating the difference in intra-frame prediction between AVC and HEVC.

In intra prediction of HEVC, a predicted pixel value of a current PU is calculated using reference pixel values of adjacent PUs. FIG. 6 is an explanatory diagram for describing reference of adjacent PUs in intra prediction processing. In the example of FIG. 6, a PU P21 is the current PU. A pixel PX11 is a pixel belonging to the PU P11. On the other hand, pixels q0 to q6 are reference pixels belonging to upper adjacent PUs, and pixels r1 to r6 are reference pixels belonging to left adjacent PUs. For example, a predicted pixel value of the pixel PX11 in intra DC prediction is equal to an average of pixel values of the reference pixels q1, q2, q3, q4, r1, r2, r3, and r4.

The reference relationship between blocks which has been described with reference to FIGS. 5 and 6 is also a factor that increases performance requirements of the encoder in a case where one block is partitioned into more blocks. For example, in a case where processing of the current block cannot be started until the end of processing of adjacent blocks, the clock of the processing circuit may become tight. Further, the number of accesses to a buffer which holds pixel values of adjacent blocks may depend on the number of times of using reference pixels.

(Mode Selection)

Incidentally, it is important to select an appropriate prediction mode to achieve a higher encoding efficiency in the AVC and HEVC systems.

There is a method implemented in reference software of AVC called joint model (JM) (published in http://iphome.hhi.de/suehring/tml/index.htm) as an example of such selection method.

In JM, two mode determination methods of a high complexity mode and a low complexity mode (described below) can be selected. In both the methods, a cost function value for each prediction mode Mode is calculated, and a prediction mode that minimizes the cost function value is selected as an optimal mode for the block to a macroblock.

A cost function in the high complexity mode is represented by the following formula (1).

$$\text{Cost}(\text{Mode} \in \Omega) = D + \lambda * R \quad (1)$$

Here, $\Omega$ denotes a universal set of candidate modes for encoding the block to the macroblock, and D denotes a difference energy between a decoded image and an input image in a case where encoding is performed in the prediction mode. Further, $\lambda$ denotes a Lagrange undetermined multiplier which is provided as a function of a quantization parameter. Further, R denotes a total code amount including an orthogonal transform factor in a case where encoding is performed in the mode.

That is, the above parameters D and R are calculated to perform encoding in the high complexity mode. Thus, it is necessary to once perform temporary encoding processing in all candidate modes, which requires a larger operation amount.

A cost function in the low complexity mode is represented by the following formula (2).

$$\text{Cost}(\text{Mode} \in \Omega) = D + QP2\text{Quant}(QP) * \text{HeaderBit} \quad (2)$$

In this case, D denotes a difference energy between a predicted image and an input image differently from that in the high complexity mode. Qp2Quant (QP) is provided as a function of a quantization parameter Qp, and HeaderBit denotes a code amount that includes no orthogonal transform factor and relates to information belonging to Header such as a motion vector and a mode.

That is, in the low complexity mode, although it is necessary to perform prediction processing for each candidate mode, a decoded image is not required. Thus, it is not necessary to perform encoding processing. Thus, the low complexity mode can be achieved with a lower operation amount than the high complexity mode.

(Inter-Frame Prediction)

Similarly to AVC, motion compensation processing with a ¼ pixel accuracy can be performed for a luminance signal and motion compensation processing with a ⅛ pixel accuracy can be performed for a chrominance signal in HEVC.

Note that, in AVC, motion compensation is performed using a 6-tap filter for a luminance signal and by linear interpolation for a chrominance signal. On the other hand, in HEVC, motion compensation is performed using an 8 or 7-tap filter for a luminance signal and using a 4-tap filter for a chrominance signal. That is, the tap length is long and the operation accuracy is improved to 16 bits in HEVC as compared to AVC.

Further, operation errors are reduced to achieve a higher encoding efficiency by performing a product-sum operation in the horizontal direction and the vertical direction and then performing rounding processing only once without performing two stages of processing including rounding processing after a product-sum operation in the horizontal direction and rounding processing after a product-sum operation in the vertical direction.

Further, in HEVC, motion compensation partition by asymmetric partitioning (a single CU is partitioned into PU shapes having uneven sizes in up and down or right and left) can be used in addition to motion compensation partition by symmetric partitioning (a single CU is partitioned into PU shapes having even sizes in up and down or right and left), which further improves the encoding efficiency.

(Intra-Frame Prediction)

FIG. 7 is a diagram illustrating the difference in intra-frame prediction between AVC and HEVC. In HEVC, the compression rate is improved using the correlation between adjacent pixels. Thus, intra-frame predictive coding using a decoded pixel value is performed. In the case of intra-frame prediction, the prediction is performed in a square TU unit and includes four sizes of 4×4, 8×8, 16×16, and 32×32. Intra-frame prediction of HEVC is variously improved in the following manner as compared to intra-frame prediction of AVC.

First, since a reference pixel which is adjacent to a block to be encoded is filtered according to conditions, the prediction efficiency is improved by noise elimination, and the prediction efficiency is particularly improved in a place far from the reference pixel. Further, in the above filter processing, special filter processing for improving the visual quality of gradation area coding is applied according to conditions.

Directional prediction can be performed in nine directions in AVC and, on the other hand, can be performed in thirty-three directions in HEVC. Thus, in HEVC, directional prediction can be designated in more detail and can be performed with a high efficiency even at subtle angles.

Further, in HEVC, DC prediction and horizontal/vertical prediction which are also performed in AVC are improved, and higher-performance planar prediction which replaces plane prediction of AVC is introduced.

HEVC has an intra-frame prediction block size of 32×32 in addition to 4×4, 8×8, and 16×16 in AVC. Further, in HEVC, the type of prediction is common in all the block sizes.

As described above, in HEVC, intra-frame prediction mode numbers (predModeIntra) which are numbered from 0 to 34 by putting two ways of nondirectional prediction and thirty-three ways of directional prediction together are applied to respective PUs. A TU has a square shape having a size equal to or smaller than a PU. Encoding/decoding and intra-frame prediction are performed in a TU unit. The same predModeIntra is used in each TU in a PU.

Next, three types of intra-frame prediction processing will be described. Note that, hereinbelow, a predicted pixel value generated in a TU is denoted by preSamples[x] [y].

1. Planar Prediction (in the Case of predModeIntra=0)

In planar prediction, a predicted pixel value is smoothly generated using four reference pixel values. The predicted pixel value in planar prediction is represented by the following formula (3).

[Mathematical Formula 1]

$$predSamples[x][y]=((N-1-x)p[-1][y]+(x+1)p[N][-1]+(N-1-y)p[x][-1]+(y+1)p[-1][N]+N)/(2N) \quad (3)$$

Figure 8:
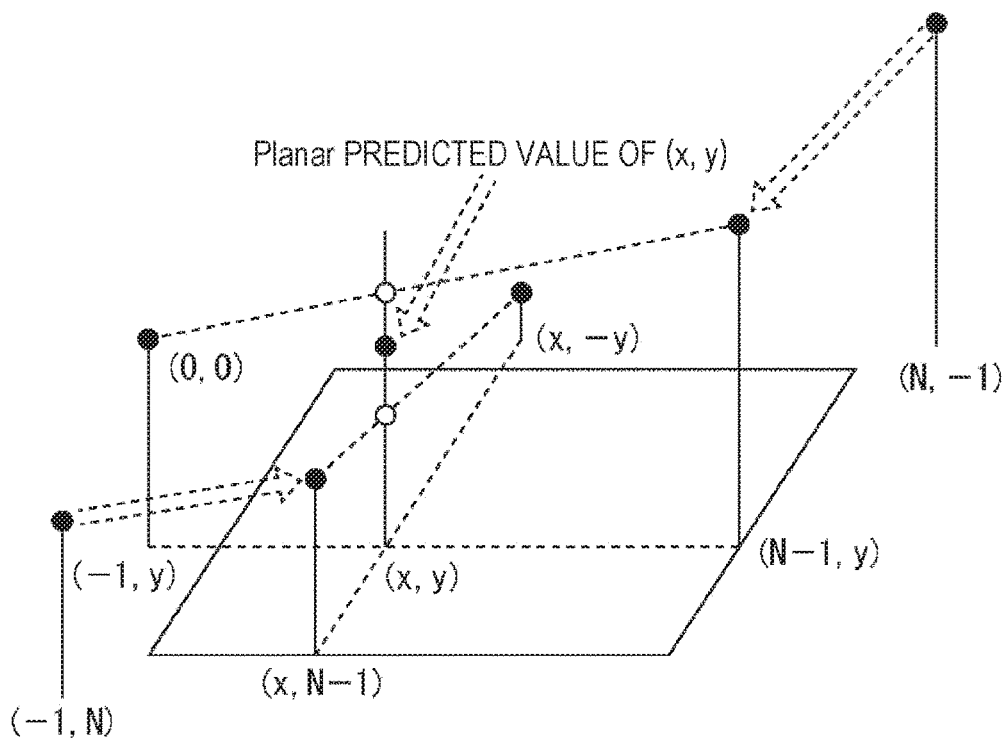
FIG. 8 is a diagram describing planar prediction.

FIG. 8 is a diagram describing planar prediction. In planar prediction, it is assumed that p[N] [−1] is located not at (N, y), but at (N+1, y) and p[−1] [N] is located at (x, N−1), and an average of values (O) obtained by horizontal and vertical linear interpolation at a position (x, y) is an interpolated value.

That is, a predicted image is formed in the least square plane in plane prediction of AVC, and, on the other hand, a predicted image is a curved plane in planar prediction of HEVC.

2. Direct Current (DC) Prediction (in the Case of pred-ModeIntra=1)

Figure 9:
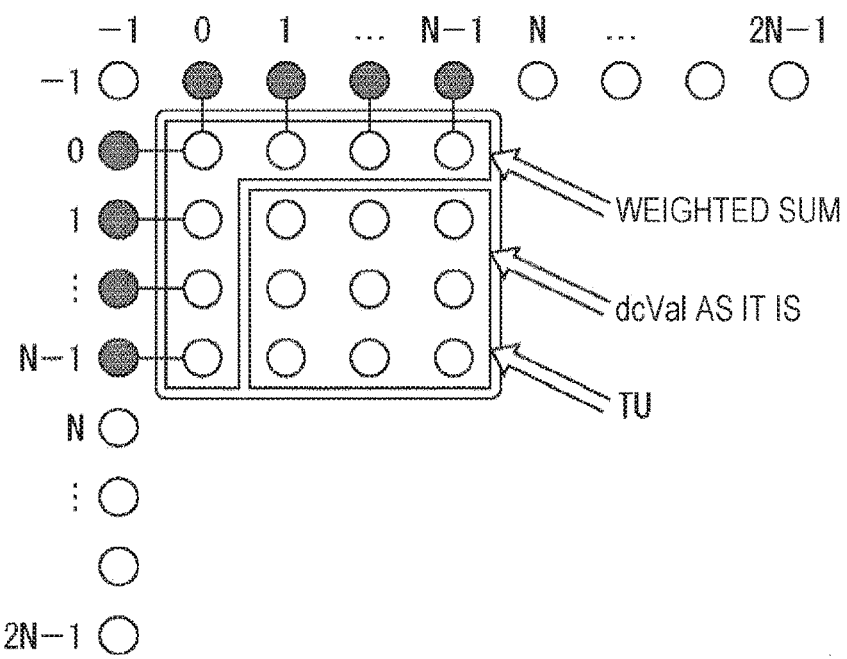
FIG. 9 is a diagram describing direct-current (DC) prediction.

A predicted image is generated by filling a TU with average values (dcVal) of reference pixels (2N reference pixels) indicated by black circles of FIG. 9. A predicted pixel value in DC prediction is represented by the following formula (4).

[Mathematical Formula 2]

$$dcVal = \left(\sum_{t=0}^{N-1}(p[-1][t]+p[t][-1])+N\right) / (2N) \quad (4)$$

$$predSamples[x][y] = dcVal, y = 0 \ldots N-1)$$

Note that, in a case where a TU size (N) is less than 32 in a luminance signal, in upper and left edge pixels of the TU, a pixel value change in a broken line direction can be reduced by obtaining a weighted average with the closest reference image (each reference pixel indicated by a black circle which is connected to a predicted pixel indicated by a white circle of FIG. 9 through a broken line).

That is, as represented by the following formula (5), although a predicted image is generated with a reference pixel average value in DC prediction of AVC, processing for blending a part adjacent to the reference pixel is added in DC prediction of HEVC.

[Mathematical Formula 3]

$$predSamples[0][0]=(p[-1][0]+2dcVal+p[0][-1]+2)/4$$

$$predSamples[x][0]=(p[x][-1]+3dcVal+2)/4,(x=1 \ldots N-1)$$

$$predSamples[0][y]=(p[-1][y]+3dcVal+2)/4,(y=1 \ldots N-1) \quad (5)$$

In this case, deVal is unchanged in a part other than the edges.

3. Directional Prediction (in the Case of predModeIntra=2 to 34)

Inclination of Reference Direction

Figure 10:
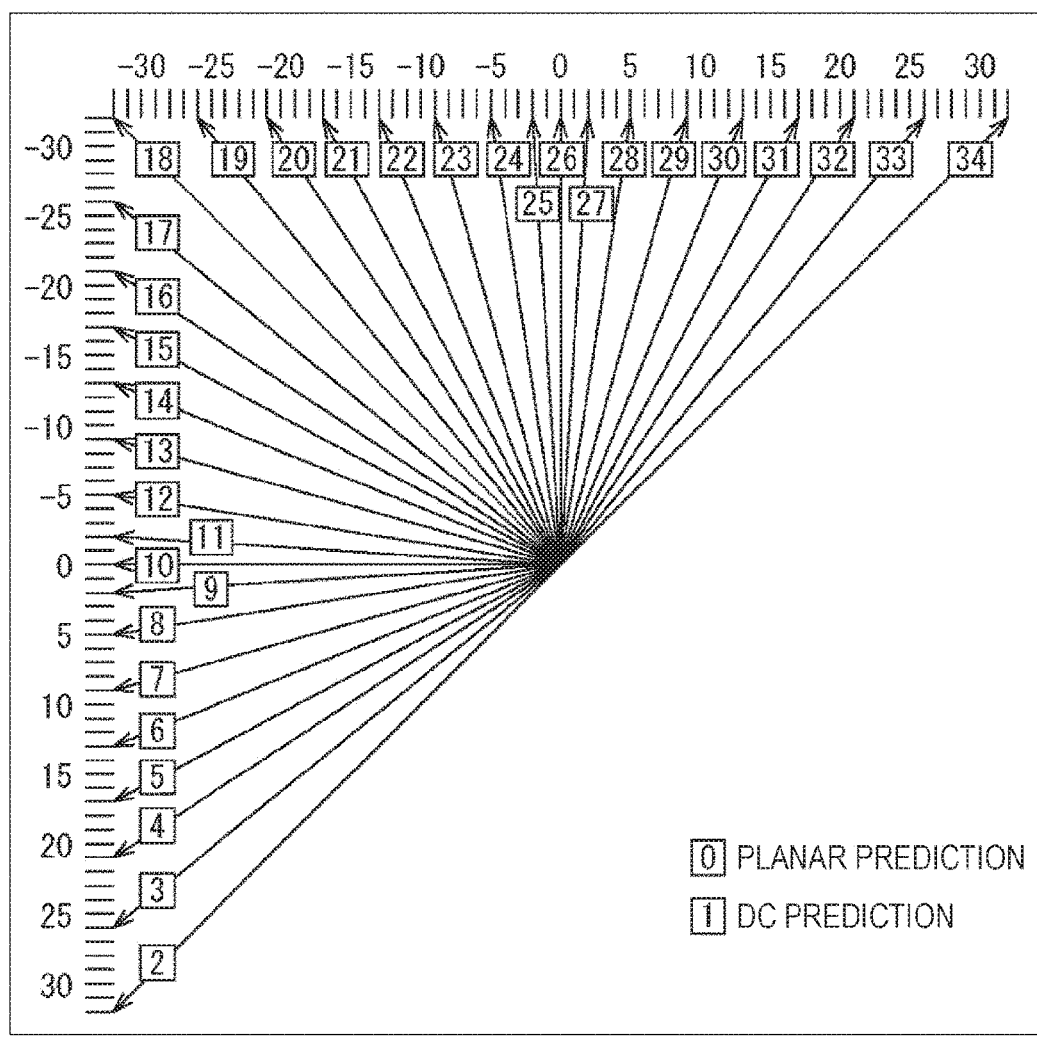
FIG. 10 is a diagram illustrating predModeIntra and reference directions.

FIG. 10 is a diagram illustrating the predModeIntra and reference directions. Arrows of FIG. 10 indicate pixel value reference directions in directional prediction (33 ways of predModeIntra=2 to 34). A numerical value pointed by each arrow indicates the inclination of the corresponding reference direction. For example, in a case where predModeIntra=10, the reference direction is the horizontal direction (because a change in the y direction is 0). In a case where predModeIntra=13, the reference direction has an inclination of −9/32 (because a change in the x direction is −32 and a change in the y direction is −9). In a case where predModeIntra=22, the reference direction has an inclination of 32/13 (because a change in the x direction is −13 and a change in the y direction is −32).

Prediction by Internally Divided Value

Figure 11:
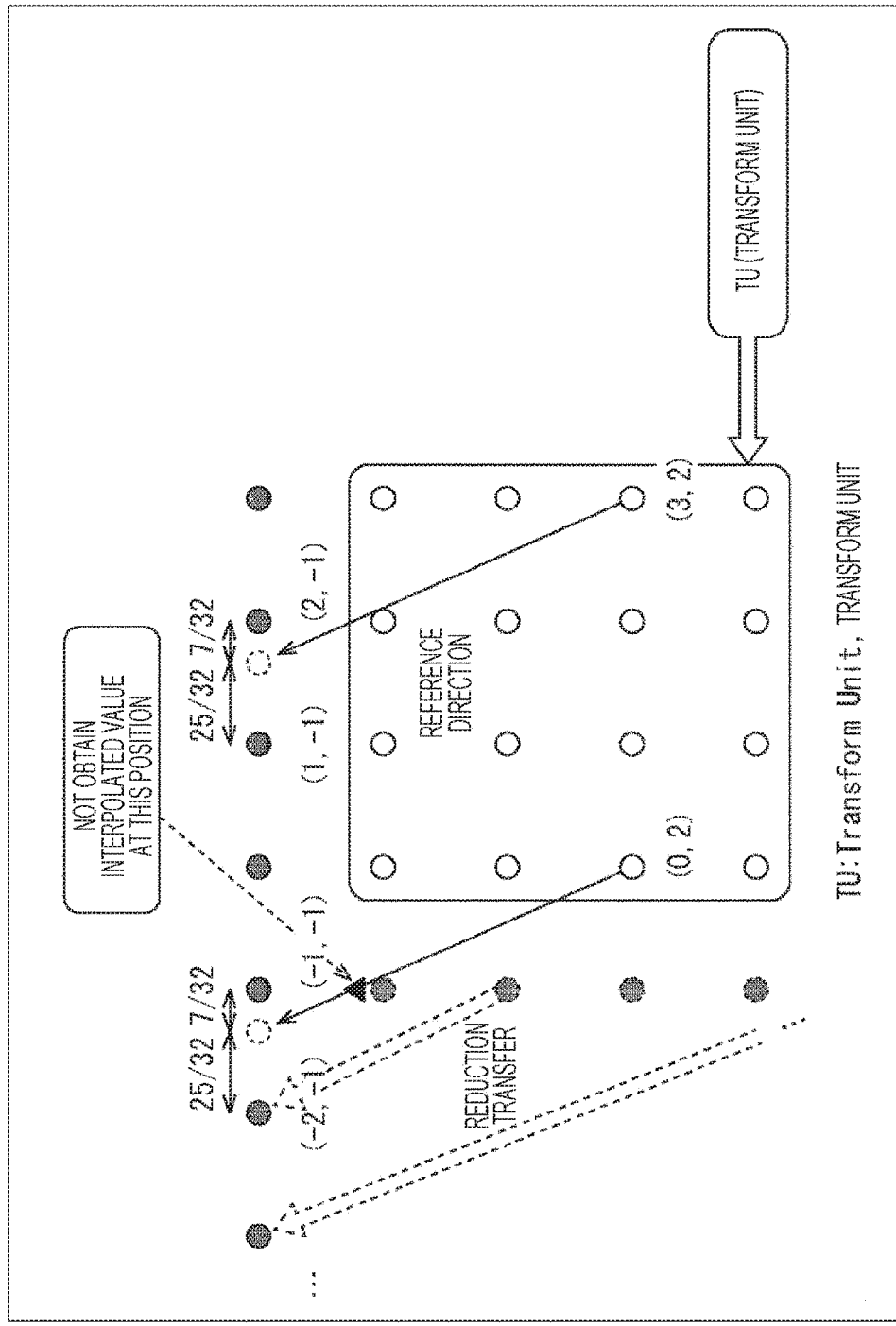
FIG. 11 is a diagram illustrating a prediction example in the case of predModeIntra=22.

FIG. 11 is a diagram illustrating a prediction example in the case of predModeIntra=22. Note that the same coordinate system as that of FIG. 9 is used in FIG. 11. In obtaining a value at a position (3, 2) in a case where predModeIntra=22, a movement of −3 in the y direction up to a line where the reference pixel is present results in a shift of 13/32*3=39/32 in the x-axis direction because the inclination in the reference direction is 32/13. That is, in practice, a pixel value at a position (a broken-line circle of FIG. 11) that is away from (1, −1) by 25/32 and from (2, −1) by 7/32 is virtually obtained.

In HEVC, this value is obtained by interior division calculation according to the distance from the reference pixel. That is, the following formula (6) represents an intra-frame predicted value at the position (3, 2). Further, if a reference destination is an integer pixel position, the interior division calculation is not performed, and a reference pixel value at the position is regarded as a predicted value as it is.

[Mathematical Formula 4]

$$predSamples[3][2]=(7p[1][-1]+25p[2][-1]+16)/32 \quad (6)$$

Reduction Transfer and Prediction using invAngle

In FIG. 11, in obtaining a predicted value at a position (0, 2), a pixel value at a position indicated by a triangle is obtained from a left reference pixel row in AVC. On the other hand, in HEVC, prior to interpolated value calculation, reduction transfer is performed using a value called invAngle (an inverse angle parameter, rounded to an integer by multiplying the inverse of a numerical value (integer of −2 to 32) indicated by an arrow of FIG. 10 by 8192 (=$2^{13}$)) which is designated so that reference pixels are arranged in a straight line (horizontal in this case (predModeIntra=22>18), vertical when predModeIntra is less than 18). The reduction transfer is represented by the following formula (7).

[Mathematical Formula 5]

$$p'[x-1][-1]=p[-1][-1+((x*invAngle+128)/256)] \quad (7)$$

In a case where predModeIntra=22, invAngle is −630. Thus, the reduction transfer is performed as represented by the following formula (8).

[Mathematical Formula 6]

$$p'[-2][-1]=p[-1][1],$$

$$p'[-3][-1]=p[-1][4],$$

$$p'[-4][-1]=p[-1][6],$$

$$p'[-5][-1]=p[-1][9], \quad (8)$$

Then, as represented by the following formula (9), an interpolated value is obtained in the same manner as the above case of (3, 2).

[Mathematical Formula 7]

$$predSamples[0][2]=(7p[-2][-1]+25p[-1][-1]+16)/32 \quad (9)$$

Exception Processing for Predicted Value

Further, in a case where N<32 in a luminance signal, the following exceptional prediction is performed.

In a case where predModeIntra=10 (horizontal direction reference), the upper end predicted image row is predicted as predSamples[x] [0]=Clip(p[−1] [0]+((p[x] [−1]−p[−1] [−1])>>1)) (x=0 . . . N−1). In a case where predModeIntra=26 (vertical direction reference), the left end row is predicted as predSamples[0] [y]=Clip(p[0] [−1]+((p[−1] [y]−p[−1] [−1])>>1)) (y=0 . . . N−1). Note that Clip( ) is a function for clipping an argument to a possible value of a luminance signal (0 to 255 in the case of an 8-bit image) (for causing the argument to fall within the upper and lower limits).

As described above, HEVC has a considerably larger number of prediction modes than AVC. Further, HEVC has an increased calculation amount due to a refinement for improving the encoding efficiency. Thus, if costs of all the modes are calculated using the above formulas (1) and (2), the calculation amount becomes enormous. As a result, for example, usage as an encoder for a low-delay or real-time purpose is difficult.

Further, although a distortion amount used in cost calculation is typically an objective evaluation value such as a sum of absolute difference (SAD) or a signal-noise ratio (SNR), this does not necessarily match the subjectivity. That is, if the current cost calculation is used, a mode that is not subjectively optimal may be disadvantageously selected.

Thus, in the present technology, a prediction mode which is used in encoding an image is set in a state in which there is a limitation on the type of a prediction mode to be a selection target according to a quantization parameter used in encoding the image. Then, the image is encoded for each recursively partitioned coding block according to the set prediction mode.

Next, a specific example of application of the present technology as described above to an apparatus will be described.

First Embodiment (Configuration Example of One Embodiment of Encoding Apparatus)

Figure 12:
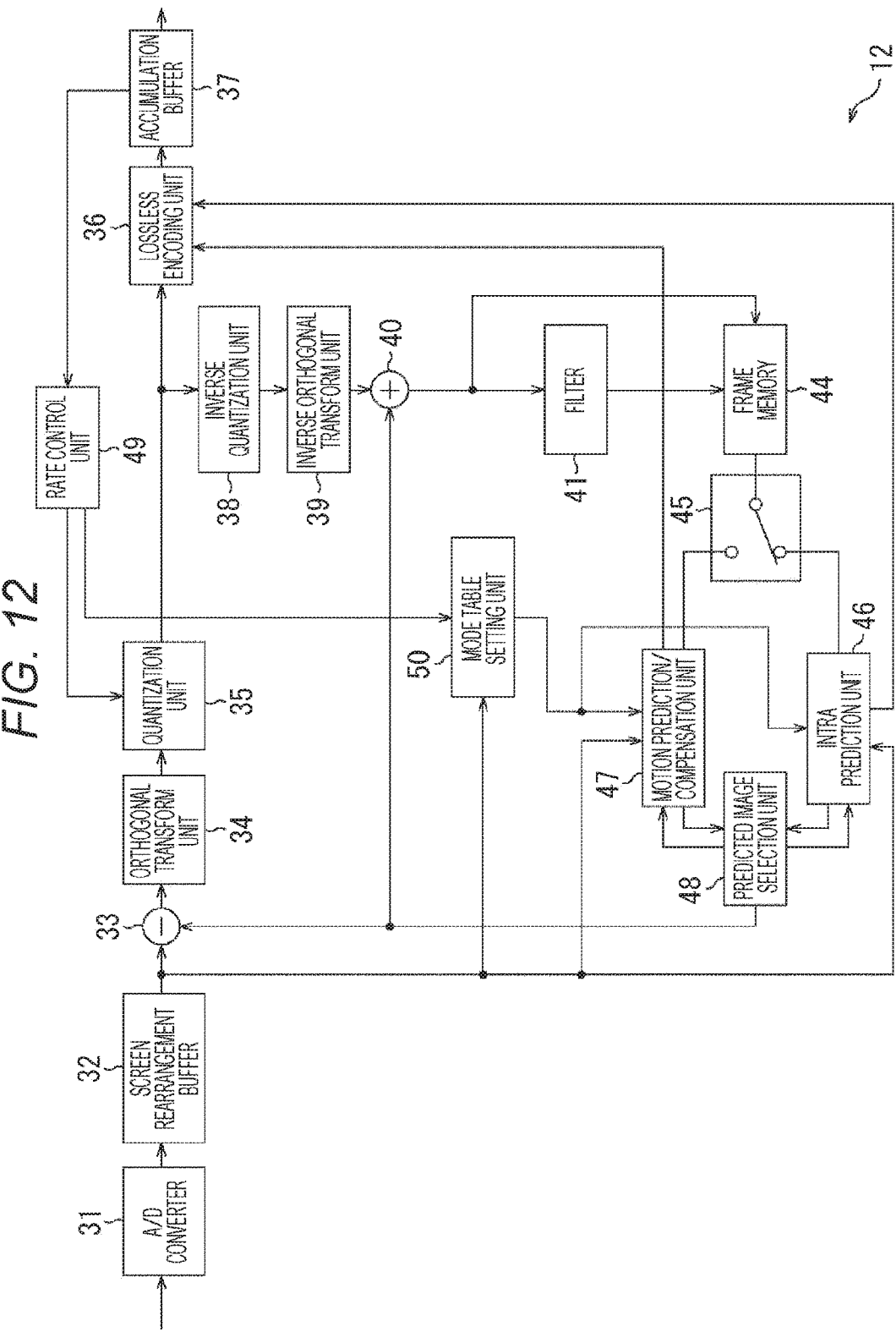
FIG. 12 is a block diagram illustrating a configuration example of one embodiment of an encoding apparatus to which the present technology is applied.

FIG. 12 is a block diagram illustrating a configuration example of one embodiment of an encoding apparatus to which the present technology is applied.

An encoding apparatus 12 of FIG. 12 includes an A/D converter 31, a screen rearrangement buffer 32, an operation unit 33, an orthogonal transform unit 34, a quantization unit 35, a lossless encoding unit 36, an accumulation buffer 37, an inverse quantization unit 38, an inverse orthogonal transform unit 39, and an addition unit 40. Further, the encoding apparatus 12 includes a filter 41, a frame memory 44, a switch 45, an intra prediction unit 46, a motion prediction/compensation unit 47, a predicted image selection unit 48, a rate control unit 49, and a mode table selection unit 50.

The A/D converter 31 of the encoding apparatus 12 A/D converts an image in a frame unit which is input as an encoding target. The A/D converter 31 outputs the converted image as a digital signal to the screen rearrangement buffer 32, and the screen rearrangement buffer 32 stores the image therein.

The screen rearrangement buffer 32 rearranges the stored image in a frame unit arranged in the order of display into the order for coding according to a GOP structure. The screen rearrangement buffer 32 outputs the rearranged image to the operation unit 33, the intra prediction unit 46, the motion prediction/compensation unit 47, and the mode table setting unit 50. Further, the screen rearrangement buffer 32 outputs a picture type of the image as image type information to the mode table setting unit 50.

The operation unit 33 performs encoding by subtracting a predicted image supplied from the predicted image selection unit 48 from the image supplied from the screen rearrangement buffer 32. The operation unit 33 outputs an image obtained as a result thereof as residual information (difference) to the orthogonal transform unit 34. Further, in a case where no predicted image is supplied from the predicted image selection unit 48, the operation unit 33 outputs an image read from the screen rearrangement buffer 32 as it is as residual information to the orthogonal transform unit 34.

The orthogonal transform unit 34 performs orthogonal transform processing on the residual information from the operation unit 33 in a TU unit. The orthogonal transform unit 34 supplies an orthogonal transform processing result after the orthogonal transform processing to the quantization unit 35.

The quantization unit 35 quantizes the orthogonal transform processing result supplied from the orthogonal transform unit 34. The quantization unit 35 supplies a quantized value which is obtained as a result of the quantization to the lossless encoding unit 36.

The lossless encoding unit 36 acquires information indicating an optimal intra prediction mode (hereinbelow, referred to as the intra prediction mode information) from the intra prediction unit 46. Further, the lossless encoding unit 36 acquires information indicating an optimal inter prediction mode (hereinbelow, referred to as the inter prediction mode information), a motion vector, and information specifying a reference image from the motion prediction/compensation unit 47. Further, the lossless encoding unit 36 acquires offset filter information relating to an offset filter from the filter 41.

The lossless encoding unit 36 performs lossless coding such as variable length coding or arithmetic coding on the quantized value supplied from the quantization unit 35.

Further, the lossless encoding unit 36 losslessly encodes the intra prediction mode information or the inter prediction mode information, the motion vector and the information specifying the reference image, and the offset filter information as coding information relating to coding. The lossless encoding unit 36 supplies the losslessly encoded coding information and the quantized value as encoded data to the accumulation buffer 37, and the accumulation buffer 37 accumulates the encoded data therein.

Not that the losslessly encoded coding information may be header information of a losslessly encoded quantized value (e.g., a slice header).

The accumulation buffer 37 temporarily stores the encoded data supplied from the lossless encoding unit 36. Further, the accumulation buffer 37 supplies the stores encoded data as an encoded stream to a transfer unit 13.

Further, the quantized value output from the quantization unit 35 is also input to the inverse quantization unit 38. The inverse quantization unit 38 inversely quantizes the quantized value. The inverse quantization unit 38 supplies an orthogonal transform processing result which is obtained as a result of the inverse quantization to the inverse orthogonal transform unit 39.

The inverse orthogonal transform unit 39 performs inverse orthogonal transform processing on the orthogonal transform processing result supplied from the inverse quantization unit 38 in a TU unit. Examples of an inverse orthogonal transform method include inverse discrete cosine transform (IDCT) and inverse discrete sine transform (IDST). The inverse orthogonal transform unit 39 supplies residual information which is obtained as a result of the inverse orthogonal transform processing to the addition unit 40.

The addition unit 40 adds up the residual information supplied from the inverse orthogonal transform unit 39 and the predicted image supplied from the predicted image selection unit 48 and performs decoding. The addition unit 40 supplies the decoded image to the filter 41 and the frame memory 44.

The filter 41 performs filter processing on the decoded image supplied from the addition unit 40. Specifically, the filter 41 sequentially performs deblocking filter processing and sample adaptive offset (SAO) filter processing. The filter 41 supplies an encoded picture after the filter processing to the frame memory 44. Further, the filter 41 supplies information indicating the type and offset of the performed sample adaptive offset filter processing as offset filter information to the lossless encoding unit 36.

The frame memory 44 accumulates images supplied from the filter 41 and images supplied from the addition unit 40. An unfiltered image that is accumulated in the frame memory 44 and adjacent to a prediction unit (PU) is supplied as a peripheral image to the intra prediction unit 46 through the switch 45. On the other hand, a filtered image that is accumulated in the frame memory 44 is output as a reference image to the motion prediction/compensation unit 47 through the switch 45.

The intra prediction unit 46 performs intra prediction processing of all candidate intra prediction modes using the peripheral image read from the frame memory 44 through the switch 45 in a PU unit.

Further, the intra prediction unit 46 calculates a cost function value (described in detail below) with respect to each available intra prediction mode which is indicated by information supplied from the mode table setting unit 50 on the basis of an image which is read from the screen rearrangement buffer 32 and a predicted image which is generated as a result of intra prediction processing. Then, the intra prediction unit 46 determines an intra prediction mode having the smallest cost function value as an optimal intra prediction mode.

The intra prediction unit 46 supplies a predicted image which is generated in the optimal intra prediction mode and the corresponding cost function value to the predicted image selection unit 48. The intra prediction unit 46 supplies intra prediction mode information to the lossless encoding unit 36 in a case of being notified of selection of the predicted image generated in the optimal intra prediction mode from the predicted image selection unit 48. Note that the intra prediction mode is a mode representing a PU size, a prediction direction, and the like.

The motion prediction/compensation unit 47 performs motion prediction/compensation processing of each available inter prediction mode which is indicated by information supplied from the mode table setting unit 50. Specifically, the motion prediction/compensation unit 47 detects a motion vector of the available inter prediction mode which is indicated by information supplied from the mode table setting unit 50 in a PU unit on the basis of the image supplied from the screen rearrangement buffer 32 and a reference image read from the frame memory 44 through the switch 45. Then, the motion prediction/compensation unit 47 performs compensation processing on the reference image in a PU unit on the basis of the motion vector to generate a predicted image.

At this time, the motion prediction/compensation unit 47 calculates a cost function value with respect to each available inter prediction mode which is indicated by information supplied from the mode table setting unit 50 on the basis of the image supplied from the screen rearrangement buffer 32 and the predicted image and determines an inter prediction mode having the smallest cost function value as an optimal inter prediction mode. Then, the motion prediction/compensation unit 47 supplies the cost function value of the optimal inter prediction mode and the corresponding predicted image to the predicted image selection unit 48. Further, the motion prediction/compensation unit 47 outputs inter prediction mode information, the corresponding motion vector, and information specifying the reference image to the lossless encoding unit 36 in a case of being notified of selection of the predicted image generated in the optimal inter prediction mode from the predicted image selection unit 48. Note that the inter prediction mode is a mode representing a PU size and the like.

The predicted image selection unit 48 determines either the optimal intra prediction mode or the optimal inter prediction mode corresponding to a smaller cost function value as an optimal prediction mode on the basis of the cost function values supplied from the intra prediction unit 46 and the motion prediction/compensation unit 47. Then, the predicted image selection unit 48 supplies the predicted image of the optimal prediction mode to the operation unit 33 and the addition unit 40. Further, the predicted image selection unit 48 notifies the intra prediction unit 46 or the motion prediction/compensation unit 47 of the selection of the predicted image of the optimal prediction mode.

The rate control unit 49 controls a rate of a quantization operation of the quantization unit 35 on the basis of the encoded data accumulated in the accumulation buffer 37 so as to prevent the occurrence of an overflow or underflow. Further, the rate control unit 49 supplies a quantization parameter Qp to the mode table setting unit 50.

The mode table setting unit 50 includes a plurality of mode tables indicating which of the prediction modes is available and which of the prediction modes is unavailable according to the quantization parameter Qp (that is, in a state in which there is a limitation on the type of a prediction mode to be a selection target). In other words, these mode tables represent the correspondence relationship between the quantization parameter and the prediction mode to be a selection target in a table form.

The mode table setting unit 50 performs mode table selection processing, for example, for each CTB. Specifically, the mode table setting unit 50 calculates statistical information from an original image read from the screen rearrangement buffer 32, and determines a mode table to be used from the plurality of mode tables according to the calculated statistical information, the picture type from the screen rearrangement buffer 32, and the quantization parameter Qp from the rate control unit 49 to determine an available prediction mode. The mode table setting unit 50 supplies information of the determined available prediction mode to the intra prediction unit 46 and the motion prediction/compensation unit 47. For example, if there is one available prediction mode, the available prediction mode is determined as a prediction mode of the current CTB. That is, the prediction mode determined by the predicted image selection unit 48 is any of available prediction modes determined by the mode table setting unit 50.

Figure 13:
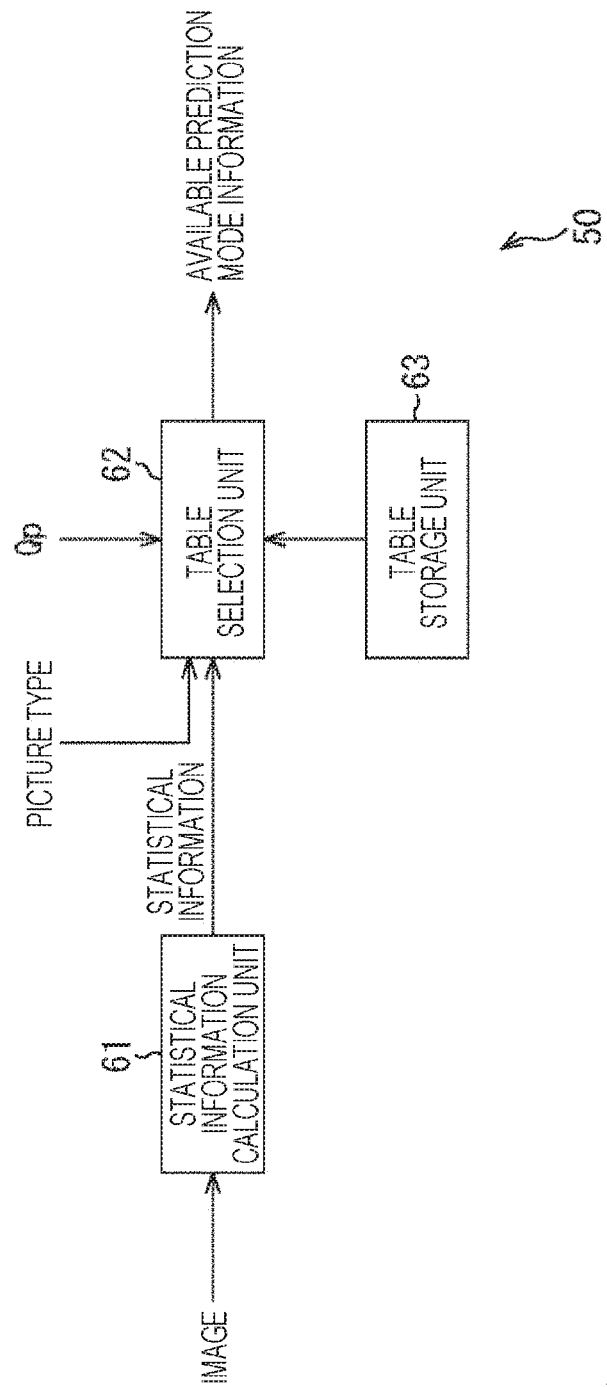
FIG. 13 is a block diagram illustrating a configuration example of a mode table setting unit.

FIG. 13 is a block diagram illustrating a configuration example of the mode table setting unit 50.

The mode table setting unit 50 of FIG. 13 is configured to include a statistical information calculation unit 61, a table selection unit 62, and a table storage unit 63.

The statistical information calculation unit 61 calculates statistical information from an original image read from the screen rearrangement buffer 32. Examples of the statistical information include Variance64×64 and SAD64×64. These information items are represented by formulas (10) and (11).

[Mathematical Formula 8]

$$\text{Variance64} \times 64 = \frac{1}{64}\sum_{n=1}^{64}(x_n - \bar{x})^2 \tag{10}$$

Xn: LUMINANCE VALUE OF FRAME AT CERTAIN TIME
$\bar{X}$: LUMINANCE AVERAGE VALUE OF FRAME AT CERTAIN TIME

[Mathematical Formula 9]

$$SAD64 \times 64 = \frac{1}{64}\sum_{n=1}^{64}(x_n - y_n)^2 \tag{11}$$

Yn: LUMINANCE VALUE OF FRAME AT TIME DIFFERENT FROM Xn

Note that the statistical information is not limited to Variance64×64 and SAD64×64, and may be complexity or another statistical information capable of estimating a motion. For example, in the case of complexity, the statistical information may be total variation or mean absolute deviation (MAD). Further, although a 64×64 unit is used as an example of a unit for obtaining the statistical information, an 8×8, 16×16, or 32×32 unit may be used for calculation, or an average value of any of the units may be used.

The statistical information calculation unit 61 supplies the calculated statistical information (Variance64×64, SAD64×64) to the table selection unit 62. Further, the picture type of the image from the screen rearrangement buffer 32 and the quantization parameter Qp from the rate control unit 49 are supplied to the table selection unit 62.

The table selection unit 62 determines a mode table to be used from the plurality of mode tables which are stored in the table storage unit 63 and have a limitation on the type of a prediction mode to be a selection target according to the statistical information and the picture type. For example, the table selection unit 62 determines whether an area is a gradation area, a fast edge area, or a normal area other than the gradation area and the fast edge area according to whether the picture type is I slice or whether the statistical information is higher or lower than a predetermined threshold and selects a mode table corresponding to each area. Note that the fast edge area indicates, for example, an area including a fast movement edge such as the outline of a passing-by person whose image is captured by a surveillance camera.

Specifically, in a case where the picture type is I slice and the Variance is equal to or lower than a threshold Th_var_flat, an area is determined to be a gradation area.

Further, in a case where the picture type is not I slice, the SAD is equal to or higher than a threshold Th_sao_low and equal to or lower than a threshold Th_sao_high (Th_sad_low<Th_sad_high) (that is, in a case where there is a certain degree of movement), and the Variance is equal to or lower than the threshold Th_var_flat, an area is determined to be a gradation area.

In a case where the picture type is not I slice, the SAD is equal to or higher than the threshold Th_sao_low and equal to or lower than the threshold Th_sao_high (Th_sad_low<Th_sad_high) (that is, in a case where there is a certain degree of movement), and the Variance is higher than the threshold Th_var_flat, equal to or higher than a threshold Th_var_edge_low, and equal to a threshold Th_var_edge_high (that is, there is a certain degree of complexity), an area is determined to be a fast edge area. Note that Th_var_flat<Th_var_edge_low<Th_var_edge_high is satisfied.

In a case other than the above cases, an area is determined to be a normal area. That is, in a case where the picture type is I slice, and the Variance is higher than the threshold Th_var_flat, an area is determined to be a normal area. In a case where the picture type is not I slice, the SAD is equal to or higher than the threshold Th_sao_low and equal to or lower than the threshold Th_sao_high (Th_sad_low<Th_sad_high) (that is, in a case where there is a certain degree of movement), and the Variance is higher than the threshold Th_var_flat, but equal to or lower than the threshold Th_var_edge_low or equal to or higher than the threshold Th_var_edge_high, an area is determined to be a normal area.

Further, also in a case where the picture type is not I slice, and the SAD is lower than the threshold Th_sao_low or higher than the threshold Th_sao_high (Th_sad_low<Th_sad_high), an area is determined to be a normal area.

Then, for example, in the case of a gradation area, a table taking the subjective image quality into consideration is selected. In the case of a fast edge area, a table taking the subjective image quality into consideration is selected. In the case of a normal area other than a gradation area and a fast edge area, a table taking maximization of an encoding efficiency value into consideration is selected.

Typically, in a flat part, if an inter prediction mode or an intra prediction mode of 64×64 is selected, the encoding efficiency tends to be higher. On the other hand, in a smooth gradation area in a flat part and also in a fast edge area including an edge such as the outline of a person or an object, if a fine inter prediction mode or a fine intra prediction mode of 4×4 is selected, a better result tends to be obtained in subjective view. Table selection is performed on the basis of such tendencies.

Then, the table selection unit 62 determines an available prediction mode from the determined table (that is, in a state in which there is a limitation on the type of prediction mode to be a selection target) according to the quantization parameter Qp. Note that the state in which the use is limited indicates an unavailable state, in other words, a state in which the number of available modes is narrowed from all prediction modes. The table selection unit 62 supplies information of the determined available prediction mode to the intra prediction unit 46 and the motion prediction/compensation unit 47.

That is, in particular, in the table taking maximization of the encoding efficiency value into consideration, the lower the quantization parameter Qp is, the higher the importance of the distortion amount in calculation of a cost function value is. Thus, typically, an inter prediction mode or intra prediction mode of 4×4 having a small distortion amount is available. On the other hand, the higher the quantization parameter Qp is, the higher the importance of the bit generation amount in calculation of a cost function value is. Thus, a large inter prediction mode or intra prediction mode of 64×64 having a high encoding efficiency is available.

The table storage unit 63 includes, for example, a memory and stores a plurality of mode tables indicating which of the prediction modes is available and which of the prediction modes is unavailable according to the quantization parameter Qp (in a state in which there is a limitation on the type of a prediction mode to be a selection target).

This makes it possible, in a specific area, to select an optimal mode corresponding to the area. Thus, the image quality can be maintained. Further, the image quality includes not only an image quality based on an objective indicator, but also a subjective image quality. That is, it is possible to maintain both the objective image quality and the subjective image quality. Further, in an area other than the specific area, it is possible to perform well-balanced mode selection in view of the encoding speed and the encoding efficiency.

(Example of Mode Table)

FIG. 14 is a diagram illustrating an example of the mode table taking maximization of the encoding efficiency into consideration. FIG. 15 is a diagram illustrating an example of the mode table taking the subjective image quality into consideration. In the examples of FIGS. 14 and 15, there are prediction modes of 64×64, 32×32, 16×16, 8×8, and 4×4 as candidates for intra prediction, and there are prediction modes of 64×64, 64×32, 32×64, 32×32, 32×24, 32×16, 32×8, 24×32, 16×32, 8×32, 16×16, 16×12, 16×8, 16×4, 12×16, 8×16, 4×16, 8×8, 8×4, 4×8, and 4×4 as candidates for inter prediction. Further, in the examples of FIGS. 14 and 15, each circle indicates an available mode and each cross indicates an unavailable mode.

The mode table of FIG. 14 will be described. In the mode table of FIG. 14, Qp is divided into five ranges. In a case where Qp is 0 to 19, only one prediction mode of 4×4 is available in intra prediction, and four prediction modes of 8×8, 8×4, 4×8, and 4×4 are available in inter prediction. In a case where Qp is 20 to 28, only one prediction mode of 8×8 is available in intra prediction, and four prediction modes of 16×16, 16×8, 8×16, and 8×8 are available in inter prediction. In a case where Qp is 29 to 36, only one prediction mode of 16×16 is available in intra prediction, and four prediction modes of 32×32, 32×16, 16×32, and 16×16 are available in inter prediction.

In a case where Qp is 37 to 43, only one prediction mode of 32×32 is available in intra prediction, and four prediction modes of 64×64, 32×16, 16×32, and 32×32 are available in inter prediction. In a case where Qp is 44 to 51, only one prediction mode of 64×64 is available in intra prediction, and four prediction modes of 64×64, 64×32, 32×64, 32×32 are available in inter prediction.

The mode table of FIG. 15 will be described. In the mode table of FIG. 15, Qp is divided into two ranges. In a case where Qp is 0 to 19, only one prediction mode of 4×4 is available in intra prediction, and one prediction mode of 4×4 is available in inter prediction. In a case where Qp is 20 to 51, only one prediction mode of 8×8 is available in intra prediction, and one prediction mode of 8×8 is available in inter prediction.

As described above, there is a limitation on a prediction mode to be a selection target for each Qp range in both the mode tables. This is because of the necessity of narrowing prediction modes as far as possible for speedup. Further, in both the mode tables, unavailable modes (the modes to be limited) are changed according to the size of the quantization parameter Qp for each range. Each of the mode tables is basically created in such a manner that a mode having a small (fine) size which makes the generated code amount large is selected in a small quantization parameter Qp and a mode having a large size which makes the generated code amount small is selected in a large quantization parameter Qp. Further, comparison between these sizes is performed, for example, using a threshold.

Further, the prediction modes of 32×24, 32×8, 24×32, 8×32, 16×12, 12×16, 16×4, and 4×16 which are made selectable by HEVC (that is, prediction modes of asymmetric motion partitioning which partitions a coding block into two blocks having different sizes) poorly improve the encoding efficiency for an increase in the calculation amount. Thus, each of the mode tables is created so as not to select these prediction modes in view of speed versus efficiency.

Further, in the mode table taking the subjective image quality into consideration, a size larger than 8×8 is not selected because the selection of a size larger than 8×8 affects the image quality.

Further, since the mode tables of FIGS. 14 and 15 show examples of the encoding apparatus for an application of real-time encoding with speed priority, the number of prediction mode candidates (the number of circles in the tables) is limited to five modes and two modes at most, respectively. However, the number of prediction modes to be limited can be changed according to the application of coding. Further, the types of prediction modes to be limited are also changed according to the application of coding. Here, the application is an intended use or a mode of a use service. Further, the application also includes parameters linked to encoding tools such as a bit rate of a bit stream, a resolution, and a picture frame.

(Description for Processing of Encoding Apparatus)

Figure 16:
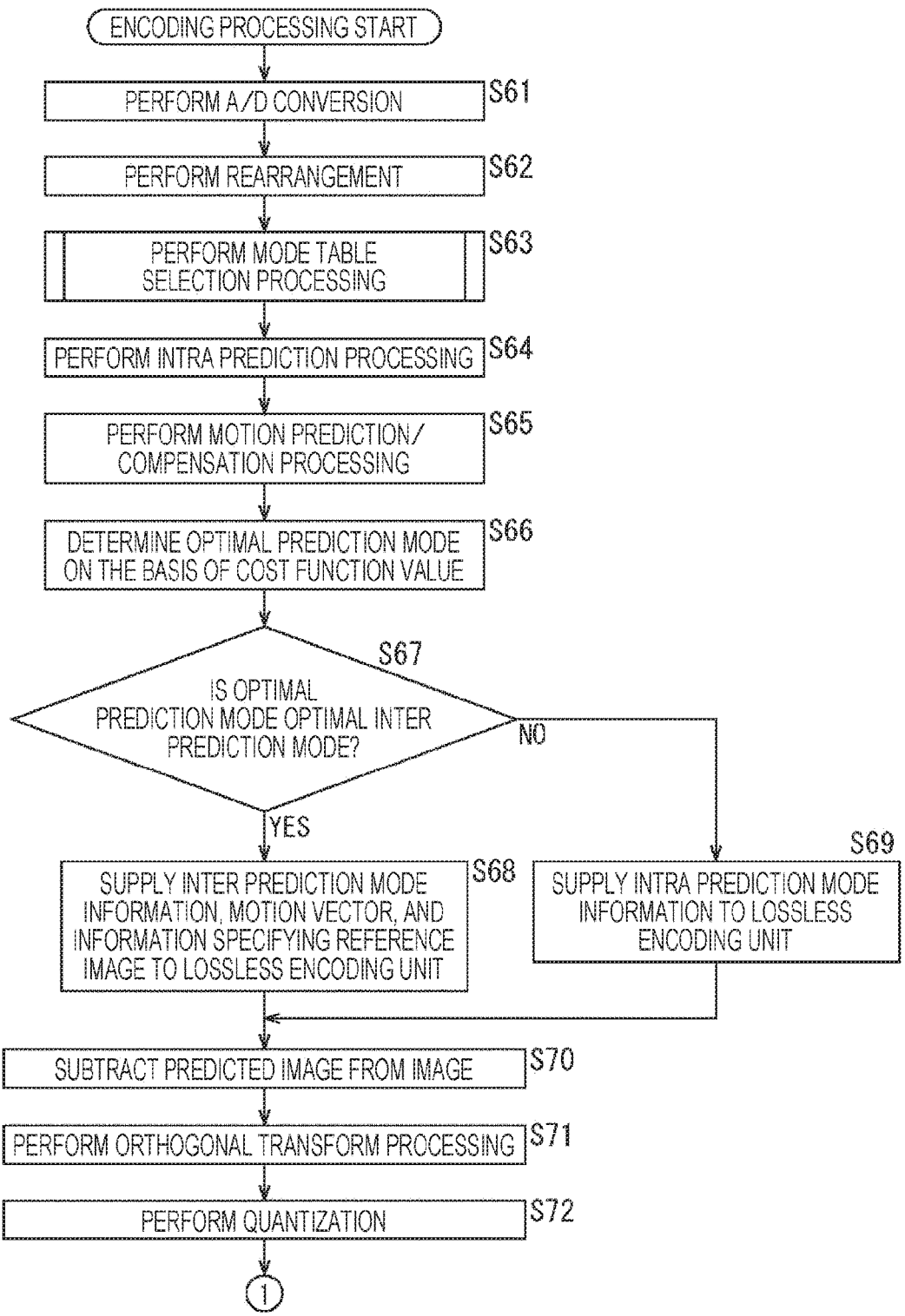
FIG. 16 is a flowchart describing encoding processing.
Figure 17:
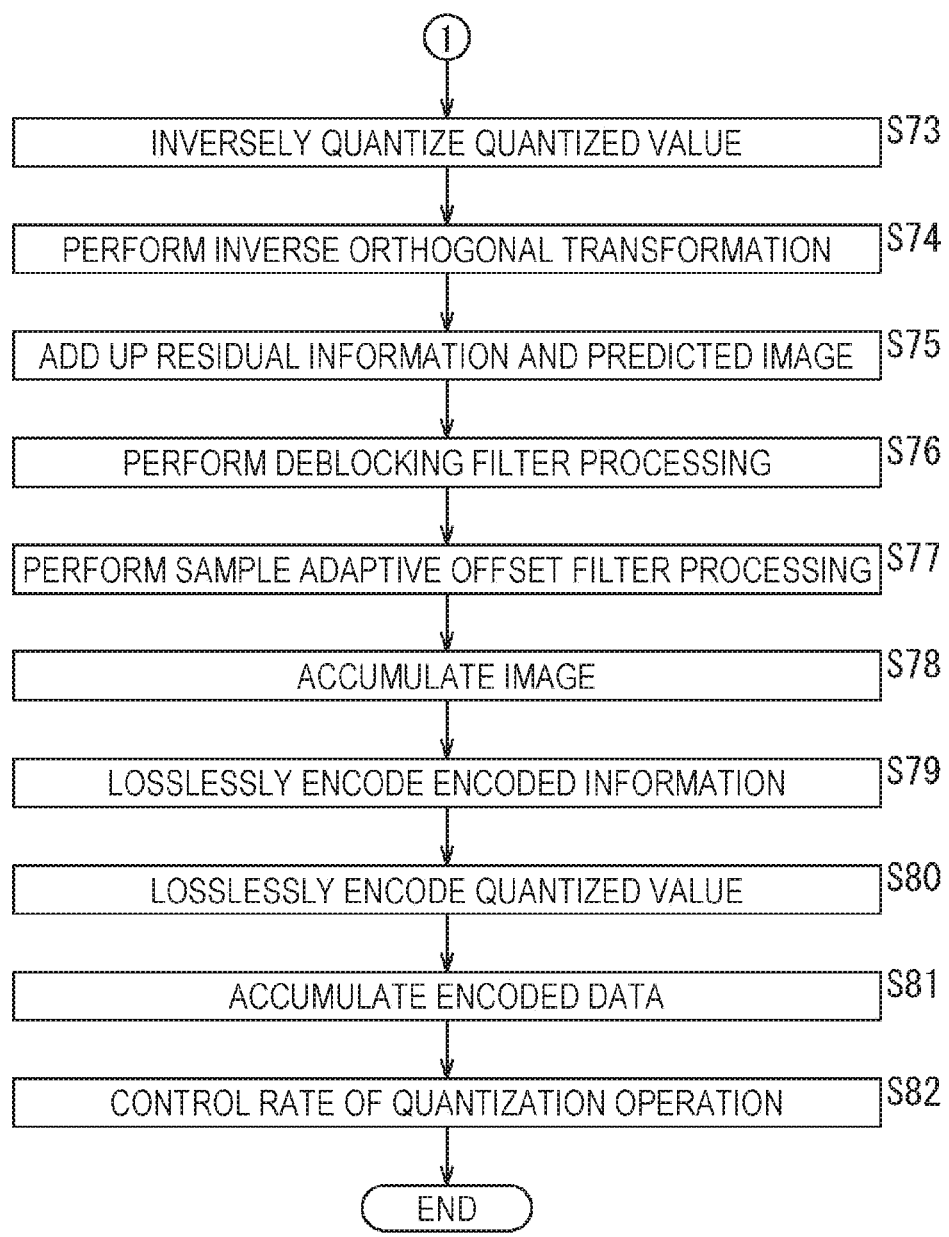
FIG. 17 is a flowchart describing the encoding processing.

FIGS. 16 and 17 are flowcharts describing encoding processing of the encoding apparatus 12 of FIG. 12.

In step S61 of FIG. 16, the A/D converter 31 (FIG. 12) of the encoding apparatus 12 A/D converts an image in a frame unit which is input as an encoding target. The A/D converter 31 outputs the converted image as a digital signal to the screen rearrangement buffer 32, and the screen rearrangement buffer 32 stores the image therein.

In step S62, the screen rearrangement buffer 32 rearranges the stored image arranged in the order of display into the order for coding according to the GOP structure. The screen rearrangement buffer 32 supplies the rearranged image in a frame unit to the operation unit 33, the intra prediction unit 46, the motion prediction/compensation unit 47, and the mode table setting unit 50. Further, the screen rearrangement buffer 32 outputs the picture type of the image to the mode table setting unit 50.

In step S63, the mode table setting unit 50 performs mode table selection processing. The mode table selection processing will be described in detail below with reference to FIG. 18. That is, the mode table setting unit 50 calculates statistical information from an original image read from the screen rearrangement buffer 32, and determines a mode table to be used from a plurality of mode tables according to the calculated statistical information, the picture type from the screen rearrangement buffer 32, and a quantization parameter Qp from the rate control unit 49 to determine an available prediction mode. The mode table setting unit 50 supplies information of the determined available prediction mode to the intra prediction unit 46 and the motion prediction/compensation unit 47.

In step S64, the intra prediction unit 46 performs intra prediction processing of each available intra prediction mode which is indicated by the information supplied from the mode table setting unit 50 in a PU unit. That is, the intra prediction unit 46 calculates a cost function value with respect to each available intra prediction mode which is indicated by the information supplied from the mode table setting unit 50 on the basis of the image read from the screen rearrangement buffer 32 and a predicted image generated as a result of the intra prediction processing. Then, the intra prediction unit 46 determines an intra prediction mode having the smallest cost function value as an optimal intra prediction mode. The intra prediction unit 46 supplies a predicted image which is generated in the optimal intra prediction mode and the corresponding cost function value to the predicted image selection unit 48.

Further, in step S65, the motion prediction/compensation unit 47 performs motion prediction/compensation processing of each available inter prediction mode which is indicated by the information supplied from the mode table setting unit 50 in a PU unit. Further, the motion prediction/compensation unit 47 calculates a cost function value with respect to each available inter prediction mode which is indicated by the information supplied from the mode table setting unit 50 on the basis of the image supplied from the screen rearrangement buffer 32 and the predicted image and determines an inter prediction mode having the smallest cost function value as the optimal inter prediction mode. Then, the motion prediction/compensation unit 47 supplies the cost function value of the optimal inter prediction mode and the corresponding predicted image to the predicted image selection unit 48.

In step S66, the predicted image selection unit 48 determines either the optimal intra prediction mode or the optimal inter prediction mode corresponding to a smaller cost function value as an optimal prediction mode on the basis of the cost function values supplied from the intra prediction unit 46 and the motion prediction/compensation unit 47. Then, the predicted image selection unit 48 supplies the predicted image of the optimal prediction mode to the operation unit 33 and the addition unit 40.

In step S67, the predicted image selection unit 48 determines whether the optimal prediction mode is the optimal inter prediction mode. In a case where it is determined in step S67 that the optimal prediction mode is the optimal inter prediction mode, the predicted image selection unit 48 notifies the motion prediction/compensation unit 47 of the selection of the predicted image generated in the optimal inter prediction mode.

Then, the motion prediction/compensation unit 47 supplies inter prediction mode information, a motion vector, and information specifying a reference image to the lossless encoding unit 36 in step S68, and advances the processing to step S70.

On the other hand, in a case where it is determined in step S67 that the optimal prediction mode is not the optimal inter prediction mode, that is, In a case where the optimal prediction mode is the optimal intra prediction mode, the predicted image selection unit 48 notifies the intra prediction unit 46 of the selection of the predicted image generated in the optimal intra prediction mode. Then, the intra prediction unit 46 supplies intra prediction mode information to the lossless encoding unit 36 in step S69, and advances the processing to step S70.

In step S70, the operation unit 33 performs encoding by subtracting the predicted image supplied from the predicted image selection unit 48 from the image supplied from the screen rearrangement buffer 32. The operation unit 33 outputs an image obtained as a result thereof as residual information to the orthogonal transform unit 34.

In step S71, the orthogonal transform unit 34 performs orthogonal transform processing on the residual information in a TU unit. The orthogonal transform unit 34 supplies an orthogonal transform processing result after the orthogonal transform processing to the quantization unit 35.

In step S72, the quantization unit 35 quantizes the orthogonal transform processing result supplied from the orthogonal transform unit 34. The quantization unit 35 supplies a quantized value which is obtained as a result of the quantization to the lossless encoding unit 36 and the inverse quantization unit 38.

In step S73, the inverse quantization unit 38 performs inverse quantization on the quantized value from the quantization unit 35. The inverse quantization unit 38 supplies an orthogonal transform processing result which is obtained as a result of the inverse quantization to the inverse orthogonal transform unit 39.

In step S74, the inverse orthogonal transform unit 39 performs inverse orthogonal transform processing on the orthogonal transform processing result supplied from the inverse quantization unit 38 in a TU unit. The inverse orthogonal transform unit 39 supplies residual information which is obtained as a result of the inverse orthogonal transform processing to the addition unit 40.

In step S75, the addition unit 40 adds up the residual information supplied from the inverse orthogonal transform unit 39 and the predicted image supplied from the predicted image selection unit 48 and performs decoding. The addition unit 40 supplies the decoded image to the filter 41 and the frame memory 44.

In step S76, the filter 41 performs deblocking filter processing on the decoded image supplied from the addition unit 40.

In step S77, the filter 41 performs sample adaptive offset filter processing on the deblocking-filtered image. The filter 41 supplies an image which is obtained as a result thereof to the frame memory 44. Further, the filter 41 supplies offset filter information to the lossless encoding unit 36 for each LCU.

In step S78, the frame memory 44 accumulates images supplied from the filter 41 and images supplied from the addition unit 40. An unfiltered image that is accumulated in the frame memory 44 and adjacent to a PU is supplied as a peripheral image to the intra prediction unit 46 through the switch 45. On the other hand, a filtered image that is accumulated in the frame memory 44 is output as a reference image to the motion prediction/compensation unit 47 through the switch 45.

In step S79, the lossless encoding unit 36 losslessly encodes the intra prediction mode information or the inter prediction mode information, the motion vector and the information specifying the reference image, and the offset filter information as coding information.

In step S80, the lossless encoding unit 36 losslessly encodes the quantized value supplied from the quantization unit 35. Then, the lossless encoding unit 36 generates encoded data from the coding information losslessly encoded by the processing of step S78 and the losslessly encoded quantized value and supplies the encoded data to the accumulation buffer 37.

In step S81, the accumulation buffer 37 temporarily accumulates the encoded data supplied from the lossless encoding unit 36.

In step S82, the rate control unit 49 controls a rate of a quantization operation of the quantization unit 35 on the basis of the encoded data accumulated in the accumulation buffer 37 so as to prevent the occurrence of an overflow or underflow. At this time, the rate control unit 49 supplies a quantization parameter Qp to the mode table setting unit 50. Then, the encoding processing is finished.

Figure 18:
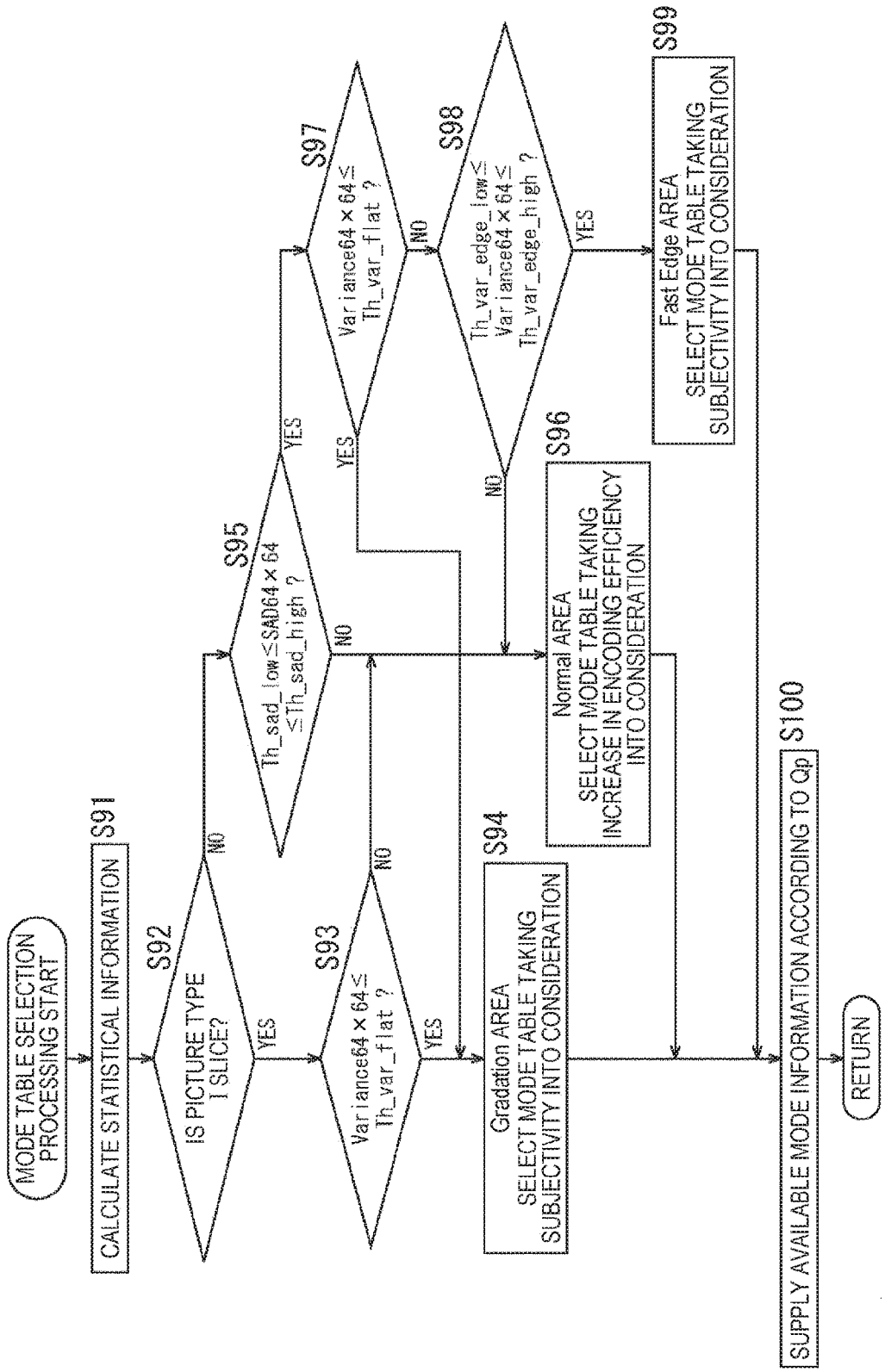
FIG. 18 is a flowchart describing mode table selection processing in detail.

Next, the mode table selection processing in step S63 of FIG. 16 will be described in detail with reference to the flowchart of FIG. 18. Note that the processing is performed in a CTB unit.

The original image read from the screen rearrangement buffer 32 is supplied to the statistical information calculation unit 61 of the mode table setting unit 50. Information indicating the picture type from the screen rearrangement buffer 32 and the quantization parameter Qp from the rate control unit 49 are supplied to the table selection unit 62 of the mode table setting unit 50.

In step S91, the statistical information calculation unit 61 calculates statistical information such as Variance64×64 and SAD64×64 from the original image read from the screen rearrangement buffer 32. The statistical information calculation unit 61 supplies the calculated statistical information (Variance64×64, SAD64×64) to the table selection unit 62.

In step S92, the table selection unit 62 determines whether the picture type is I slice. In a case where it is determined in step S92 that the picture type is I slice, the processing proceeds to step S93. In step S93, the table selection unit 62 determines whether Variance64×64 is equal to or lower than the threshold Th_var_flat. In a case where it is determined in step S93 that Variance64×64 is equal to or lower than the threshold Th_var_flat, the processing proceeds to step S94.

In step S94, the table selection unit 62 determines that the current area is a gradation area and selects a mode table taking the subjectivity into consideration (e.g., FIG. 15) from the mode tables stored in the table storage unit 63.

In a case where it is determined in step S93 that Variance64×64 is larger than the threshold Th_var_flat, the processing proceeds to step S96.

Further, in a case where it is determined in step S92 that the picture type is not I slice, the processing proceeds to step S95. In step S95, the table selection unit 62 determines whether SAD64×64 is equal to or higher than the threshold Th_sad_low and equal to or lower than the threshold Th_sad_high. In a case where it is determined in step S96 that SAD64×64 is lower than the threshold Th_sad_low or higher than the threshold Th_sad_high, the processing proceeds to step S96.

In step S96, the table selection unit 62 determines that the current area is a normal area and selects a mode table taking an increase in the encoding efficiency into consideration (e.g., FIG. 14) from the mode tables stored in the table storage unit 63.

In a case where it is determined in step S95 that SAD64×64 is equal to or higher than the threshold Th_sad_low and equal to or lower than the threshold Th_sad_high, the processing proceeds to step S97. In step S97, the table selection unit 62 determines whether Variance64×64 is equal to or lower than the threshold Th_var_flat. In a case where it is determined in step S97 that Variance64×64 is equal to or lower than the threshold Th_var_flat, the processing proceeds to step S94.

Then, as described above, in step S94, the table selection unit 62 determines that the current area is a gradation area and selects a mode table taking the subjectivity into consideration (e.g., FIG. 15) from the mode tables stored in the table storage unit 63.

In a case where it is determined in step S97 that Variance64×64 is higher than the threshold Th_var_flat, the processing proceeds to step S98. In step S98, the table selection unit 62 determines whether Variance64×64 is equal to or higher than the threshold Th_var_edge_low and equal to or lower than the threshold Th_var_edge_high. In a case where it is determined in step S98 that Variance64×64 is lower than the threshold Th_var_edge_low or higher than the threshold Th_var_edge_high, the processing proceeds to step S96.

Then, as described above, in step S96, the table selection unit 62 determines that the current area is a normal area and selects a mode table taking an increase in the encoding efficiency into consideration (e.g., FIG. 14) from the mode tables stored in the table storage unit 63.

In a case where it is determined in step S98 that Variance64×64 is equal to or higher than the threshold Th_var_edge_low and equal to or lower than the threshold Th_var_edge_high, the processing proceeds to step S99. In step S99, the table selection unit 62 determines that the current area is a fast edge area and selects a mode table taking the subjectivity into consideration (e.g., FIG. 15) from the mode tables stored in the table storage unit 63.

After the mode table is selected according to the statistical information in step S94, S96, or S99, the processing proceeds to step S100. In step S100, the table selection unit 62 selects an available prediction mode according to the quantization parameter Qp from the mode table selected according to the statistical information and supplies information indicating the selected available prediction mode to the intra prediction unit 94 and the motion prediction/compensation unit 95. Then, the mode table selection processing is finished, and the processing returns to step S63 of FIG. 16.

Note that the threshold Th_var_flat, the threshold Th_sad_low, the threshold Th_sad_high, the threshold Th_var_edge_low, and the threshold Th_var_edge vary according to the quantization parameter Qp. This is a measure against an increase in the generated amount in a case where Qp is large, and adjusts an area. Thus, it is possible to suppress an increase in the generated amount in a case where Qp is large.

Here, in the above mode tables of FIGS. 14 and 15, the encoding apparatus which is used for the purpose of real-time encoding with speed priority (that is, the encoding apparatus which has an encoding application) is employed as an example. On the other hand, FIGS. 19 and 20 illustrate mode table examples in which an authoring encoding apparatus with image quality priority is employed.

(Other Examples of Mode Table)

FIG. 19 is a diagram illustrating an example of a mode table taking maximization of the encoding efficiency into consideration. FIG. 20 is a diagram illustrating an example of a mode table taking the subjective image quality into consideration. In the examples of FIGS. 19 and 20, there are modes of 64×64, 32×32, 16×16, 8×8, and 4×4 as candidates for intra prediction, and there are modes of 64×64, 64×32, 32×64, 32×32, 32×24, 32×16, 32×8, 24×32, 16×32, 8×32, 16×16, 16×12, 16×8, 16×4, 12×16, 8×16, 4×16, 8×8, 8×4, 4×8, and 4×4 as candidates for inter prediction. Further, in the examples of FIGS. 19 and 20, each circle indicates an available mode and each cross indicates an unavailable mode.

The mode table of FIG. 19 will be described. In the mode table of FIG. 19, Qp is divided into three ranges. In a case where Qp is 0 to 19, four prediction modes of 32×32, 16×16, 8×8, and 4×4 are available in intra prediction, and eight prediction modes of 32×32, 16×16, 16×8, 8×16, 8×8, 8×4, 4×8, and 4×4 are available in inter prediction. In a case where Qp is 20 to 36, only four prediction modes of 64×64, 32×32, 16×16, and 8×8 are available in intra prediction, and eight prediction modes of 64×64, 32×32, 32×16, 16×32, 16×16, 16×8, 8×16, and 8×8 are available in inter prediction.

In a case where Qp is 37 to 51, only four prediction modes of 64×64, 32×32, 16×16, and 8×8 are available in intra prediction, and eight prediction modes of 64×64, 64×32, 32×64, 32×32, 32×16, 16×32, 16×16, and 8×8 are available in inter prediction.

The mode table of FIG. 20 will be described. In the mode table of FIG. 20, Qp has only one range. In a case where Qp is 0 to 51, only two prediction modes of 4×4 and 8×8 are available in intra prediction, and four prediction modes of 8×8, 8×4, 4×8, and 4×4 are available in inter prediction.

Here, in the mode table of FIG. 19, unavailable modes (the modes to be limited) are changed according to the size of the quantization parameter Qp for each range. Similarly to the mode tables of FIGS. 14 and 15, the mode table of FIG. 19 is basically created in such a manner that a mode having a small (fine) size which makes the generated code amount large is selected in a small quantization parameter Qp and a mode having a large size which makes the generated code amount small is selected in a large quantization parameter Qp.

Further, the reason why Qp is divided into a smaller number of ranges in the example of FIG. 19 than the example of FIG. 14 is that it is not necessary to divide Qp into a large number of ranges and it is possible to attach importance to the quality by increasing prediction modes to be used because there is no need for attaching importance to a real-time property. Similarly in the mode tables of FIGS. 15 and 20, the reason why the range of Qp is not divided in the example of FIG. 20 is that, differently from the example of FIG. 15, it is possible to attach importance to the quality by increasing prediction modes to be used because it is not necessary to attach importance to the real-time property. Further, since the mode tables of FIGS. 14 and 15 shows examples of the encoding apparatus for an application of real-time encoding with speed priority, the number of prediction mode candidates (the number of circles in the tables) is limited to five modes and two modes at most, respectively. On the other hand, since the mode tables of FIGS. 19 and 20 are used for the purpose of authoring encoding, it is possible to set a larger number of prediction mode candidates (8 modes and 4 modes, respectively) than candidates in the case of the real-time encoding purpose. Accordingly, a higher priority can be placed on the image quality.

Further, similarly to the mode tables of FIGS. 14 and 15, since the prediction modes of 32×24, 32×8, 24×32, 8×32, 16×12, 12×16, 16×4, and 4×16 which are made selectable by HEVC (that is, prediction modes of asymmetric motion partitioning which partitions a coding block into two blocks having different sizes) poorly improve the encoding efficiency for an increase in the calculation amount, the mode tables of FIGS. 19 and 20 are created so as not to select these prediction modes in view of speed versus efficiency. Further, the mode table of FIG. 20 is creased so as not to select a size larger than 8×8 because the selection of a size larger than 8×8 affects the image quality.

As described above, the present technology improves the encoding speed and the image quality including the subjective image quality. Thus, the present technology can be used in an encoding apparatus for a low-delay or real-time purpose (application), and a certain degree of image quality can also be maintained. However, a speed improvement rate depends on the design of a table.

As examples of contents that require immediate encoding, in a sport such as football and a live concert such as an open-air concert, there is no choice but to sacrifice the image quality to some extent in order to increase the encoding speed so as to immediately provide contents to a user.

However, the present technology significantly improves the encoding speed. Further, it is possible to provide contents with a higher image quality than a conventional quality to a user.

Further, for example, in remote-monitoring of an outdoor camera (assuming constantly turning one) by remote control for the purpose of a surveillance camera or a material transmission system, if a delay is large, a user cannot stop the turn at a desired moment, and video is disadvantageously deviated in some degree.

Also in the material transmission, if a delay is large in video switching in a relay for a sport such as baseball where both a wireless camera and a wired camera are present, time is disadvantageously returned.

However, since the present technology can achieve a low delay, it is possible to acquire video in consonance with demands of a user and appropriately perform video switching.

In the above, a system corresponding to HEVC is used as the encoding system. However, the present technology is not limited thereto, and other encoding systems/decoding systems can be applied.

Further, a prediction mode may be predicted by learning the current prediction mode from statistical information of an original image and a prediction mode selected in the past without having a mode table as described above. In this case, for example, the present technology can have a configuration of cloud computing which processes one function by a plurality of apparatuses in a shared and cooperated manner through a network.

Second Embodiment (Configuration Example of Cloud Computing with Present Technology Applied)

Figure 21:
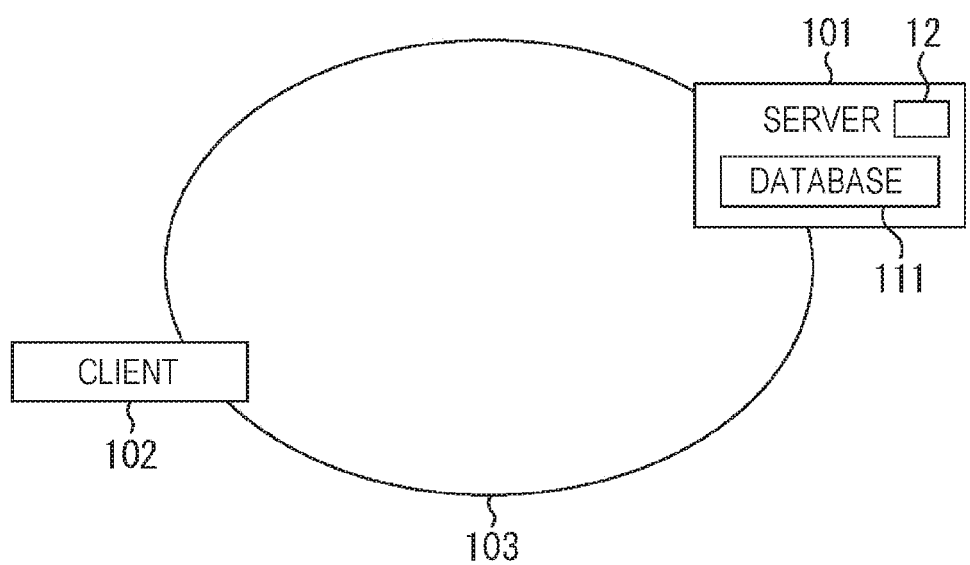
FIG. 21 is a diagram illustrating a configuration example of one embodiment of a cloud computing system.

FIG. 21 is a diagram illustrating a configuration example of one embodiment of a cloud computing system to which the present technology is applied.

As illustrated in FIG. 21, a cloud computing system 100 is configured to include a server 101 and a client 102 which are connected through a network 103 such as the Internet.

The server 101 is provided with the encoding apparatus 12 of FIG. 12 and a database 111 of the above statistical information and prediction modes selected in the past. The encoding apparatus 12 is provided with a mode table setting unit 50 of FIG. 22 which has a function of learning a prediction mode selected in the past instead of the mode mode table setting unit 50 of FIG. 13.

The encoding apparatus 12 (the mode table setting unit 50) receives an image or statistical information of an image from, for example, the client 102. In a case where receiving an image, the encoding apparatus 12 calculates statistical information using the image which is uploaded to the server 101 from, for example, the client 102.

The encoding apparatus 12 learns and selects the current prediction mode from prediction modes selected in the past by a neural network or CNN using the calculated statistical information or statistical information from the client 102, and the database 111, and registers information of the learned prediction mode in the database 111.

Alternatively, when receiving statistical information from the client 102, the encoding apparatus 12 selects a prediction mode using the database 111, and registers information of the selected prediction mode in the database 111 and learns the prediction mode.

After the learning, the encoding apparatus 12 may provide the information of the selected prediction mode to the client 102, or may encode an image using the selected prediction mode and accumulate the encoded image for providing the image to the client 102.

The database 111 stores statistical information and prediction modes selected in the past. For example, the database 111 may store the statistical information and the prediction mode selected in the past in association with each other.

The client 102 includes, for example, a portable terminal. The client 102 transmits information of a captured image and statistical information which is calculated on the basis of the image information to the server 101 through the network 103. When receiving information of a prediction mode from the server 101, the client 102 encodes the image information.

Note that although only one server 101 is illustrated in the example of FIG. 21, a plurality of serves are included. Similarly, although only one client 102 is illustrated, a plurality of clients are included.

Figure 22:
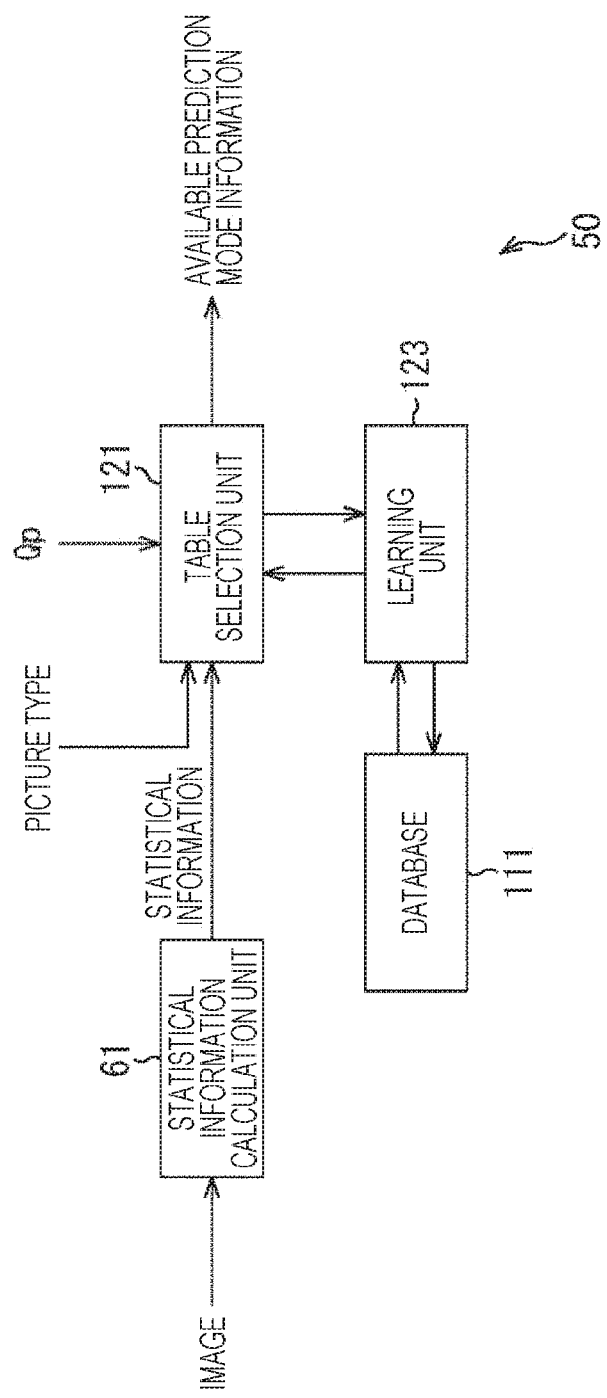
FIG. 22 is a block diagram illustrating another configuration example of the mode table setting unit.

FIG. 22 is a block diagram illustrating a configuration example of the mode table setting unit 50 of FIG. 21.

The mode table setting unit 50 is in common with the mode table setting unit 50 of FIG. 13 in including the statistical information calculation unit 61 of FIG. 13. The mode table setting unit 50 differs from the mode table setting unit 50 of FIG. 13 in including a table selection unit 121 instead of the table selection unit 62 and including a learning unit 123 and the database 111 instead of the table storage unit 123.

The statistical information calculation unit 61 supplies calculated statistical information to the table selection unit 121. The table selection unit 121 supplies a prediction mode which is selected by learning by the learning unit 123 as information of an available prediction mode to the intra prediction unit 46, the motion prediction/compensation unit 47, or the client 102. Further, the table selection unit 121 supplies statistical information from the statistical information calculation unit 61, a picture type, and Qp to the learning unit 123.

The learning unit 123 learns the current prediction mode from the prediction modes selected in the past by a neural network or CNN using the statistical information, the picture type and Qp from the table selection unit 121, and the database 111, and registers information of the learned prediction mode in the database 111.

As described above, although not limited to the cloud computing system 100, an environment that can expect a large amount of machine power such as the cloud computing system 100 makes it possible to perform learning and prediction each time without having any mode table.

Further, for example, the present technology can be applied to an image encoding apparatus that is used in receiving image information (bit stream) which is compressed by orthogonal transform such as discrete cosine transform and motion compensation through network media such as satellite broadcasting, cable television, the Internet, and a portable telephone like the HEVC system. Further, the present disclosure can be applied to an image encoding apparatus that is used in processing on storage media such as an optical disk, a magnetic disk, and a flash memory.

Third Embodiment (Description for Computer with Present Disclosure Applied)

The above series of processing steps can be executed by hardware or can be executed by software. In a case where the series of processing steps is executed by software, a program which constitutes the software is installed in a computer. In this case, the computer includes a computer that is incorporated in dedicated hardware and, for example, a general-purpose personal computer that is capable of executing various functions by installing various programs therein.

Figure 23:
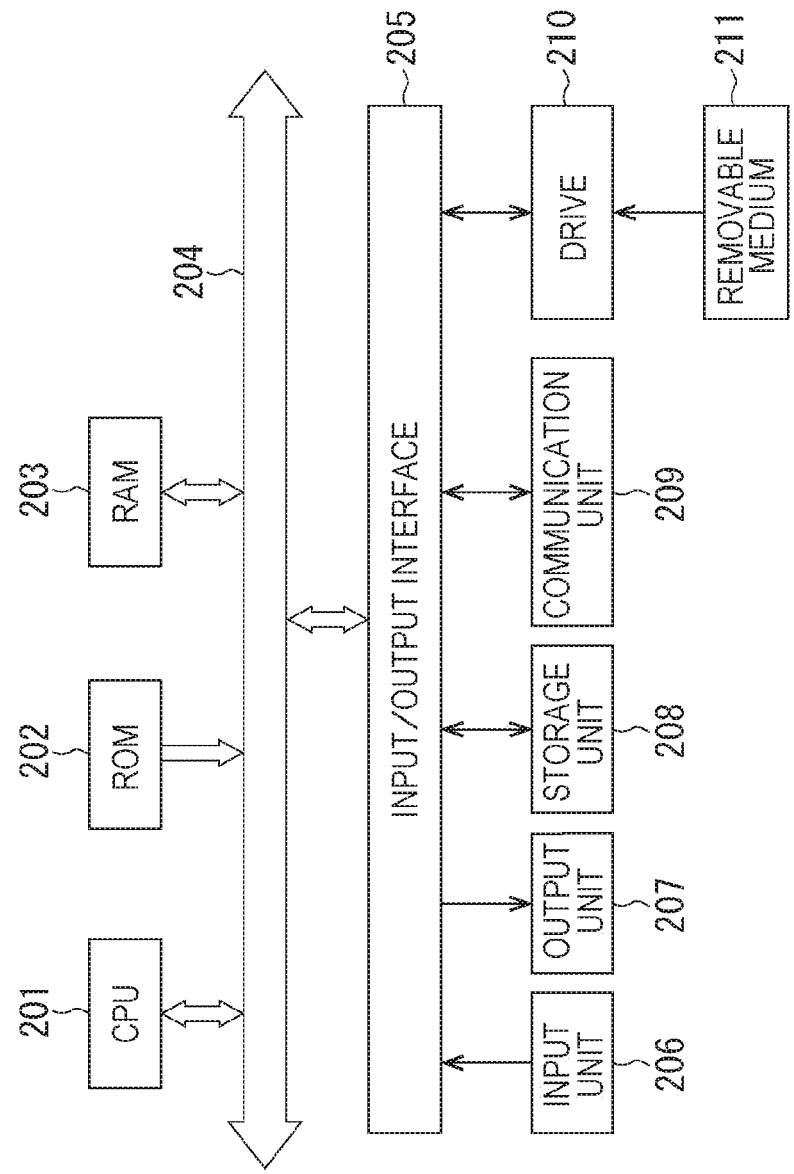
FIG. 23 is a block diagram illustrating a hardware configuration example of a computer.

FIG. 23 is a block diagram illustrating a hardware configuration example of a computer which executes the above series of processing steps by a program.

In the computer, a central processing unit (CPU) 201, a read only memory (ROM) 202, and a random access memory (RAM) 203 are connected to each other through a bus 204.

Further, an input/output interface 205 is connected to the bus 204. An input unit 206, an output unit 207, a storage unit 208, a communication unit 209, and a drive 210 are connected to the input/output interface 205.

The input unit 206 includes a keyboard, a mouse, and a microphone. The output unit 207 includes a display and a speaker. The storage unit 208 includes a hard disk and a nonvolatile memory. The communication unit 209 includes a network interface. The drive 210 drives a removable medium 211 such as a magnetic disk, an optical disk, a magneto-optical disk, or a semiconductor memory.

In the computer configured in the above manner, for example, the CPU 201 executes a program which is stored in the storage unit 208 by loading the program to the RAM 203 through the input/output interface 205 and the bus 204, so that the above series of processing steps is performed.

The program executed by the computer (CPU 201) may be recorded in, for example, the removable medium 211 as a package medium to be provided. Further, the program may be provided through a wired or wireless transfer medium such as a local area network, the Internet, or digital satellite broadcasting.

In the computer, the program can be installed into the storage unit 208 through the input/output interface 205 by attaching the removable medium 211 to the drive 210. Further, the program can be received by the communication unit 209 through a wired or wireless transfer medium and installed into the storage unit 208. Alternatively, the program can be previously installed in the ROM 202 or the storage unit 208.

Further, programs executed by the computer may be processed in a time series manner along the order described in the present specification or may be processed in parallel or at a necessary timing, for example, when called, or the like.

Fourth Embodiment (Configuration Example of Television Apparatus>

Figure 24:
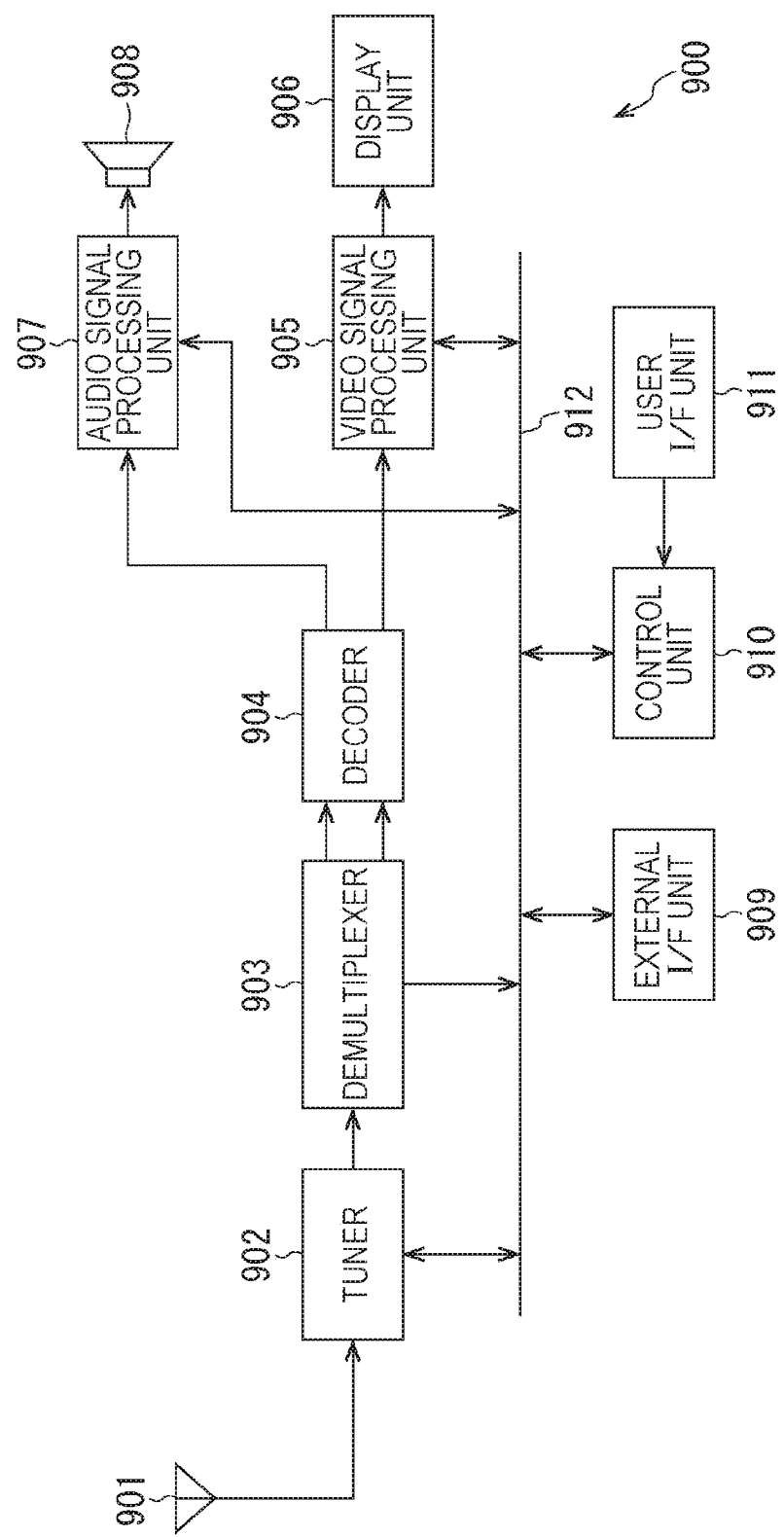
FIG. 24 is a diagram illustrating a schematic configuration example of a television apparatus to which the present disclosure is applied.

FIG. 24 illustrates a schematic configuration of a television apparatus to which the present technology is applied. A television apparatus 900 includes an antenna 901, a tuner 902, a demultiplexer 903, a decoder 904, a video signal processing unit 905, a display unit 906, an audio signal processing unit 907, a speaker 908, and an external interface unit 909. The television apparatus 900 further includes a control unit 910 and a user interface unit 911.

The tuner 902 selects a desired channel from broadcast wave signals which are received by the antenna 901 and performs demodulation thereon, and outputs an encoded bit stream obtained by the demodulation to the demultiplexer 903.

The demultiplexer 903 extracts a packet of video or audio of a viewing target program from the encoded bit stream and outputs data of the extracted packet to the decoder 904. Further, the demultiplexer 903 supplies a packet of data such as an electronic program guide (EPG) to the control unit 910. Further, in a case where scrambling is performed, the scrambling is canceled by, for example, the demultiplexer.

The decoder 904 performs decoding processing on the packet, and outputs video data and audio data which are generated by the decoding processing to the video signal processing unit 905 and the audio signal processing unit 907, respectively.

The video signal processing unit 905 performs noise elimination and video processing according to user setting on the video data. The video signal processing unit 905 generates video data of the program to be displayed on the display unit 906 and image data by processing based on an application which is supplied through the network. Further, the video signal processing unit 905 generates video data for displaying, for example, a menu screen for item selection and superimposes the generated video data on the program video data. The video signal processing unit 905 generates a driving signal on the basis of the video data generated in this manner to drive the display unit 906.

The display unit 906 drives a display device (e.g., a liquid crystal display element) on the basis of the driving signal form the video signal processing unit 905 so as to display the video of the program on the display device.

The audio signal processing unit 907 performs predetermined processing such as noise elimination on audio data, performs D/A conversion processing and amplification processing on the processed audio data, and supplies the audio data to the speaker 908 to perform audio output.

The external interface unit 909 is an interface for connection with an external device or a network, and transmits and receives video data and audio data.

The user interface unit 911 is connected to the control unit 910. The user interface unit 911 includes an operation switch and a remote control signal reception unit and supplies an operation signal corresponding to a user operation to the control unit 910.

The control unit 910 is configured using a central processing unit (CPU) and a memory. The memory stores a program which is executed by the CPU, various data items which are required for the CPU to perform processing, EPG data, and data which is acquired through the network. The program stored in the memory is read and executed by the CPU at a predetermined timing such as the time of starting the television apparatus 900. The CPU controls each unit so that the television apparatus 900 operates according to a user operation by executing the program.

Further, the television apparatus 900 is provided with a bus 912 for connecting the tuner 902, the demultiplexer 903, the video signal processing unit 905, the audio signal processing unit 907, and the external interface unit 909 to the control unit 910.

The television apparatus configured in this manner has the function of a decoding apparatus (decoding method) which decodes an encoded stream as described above. Thus, it is possible to significantly improve the subjective image quality. Further, since a low delay can be achieved, it is possible to acquire video that meets demands of a user and perform appropriate video switching.

Fifth Embodiment (Configuration Example of Portable Telephone)

Figure 25:
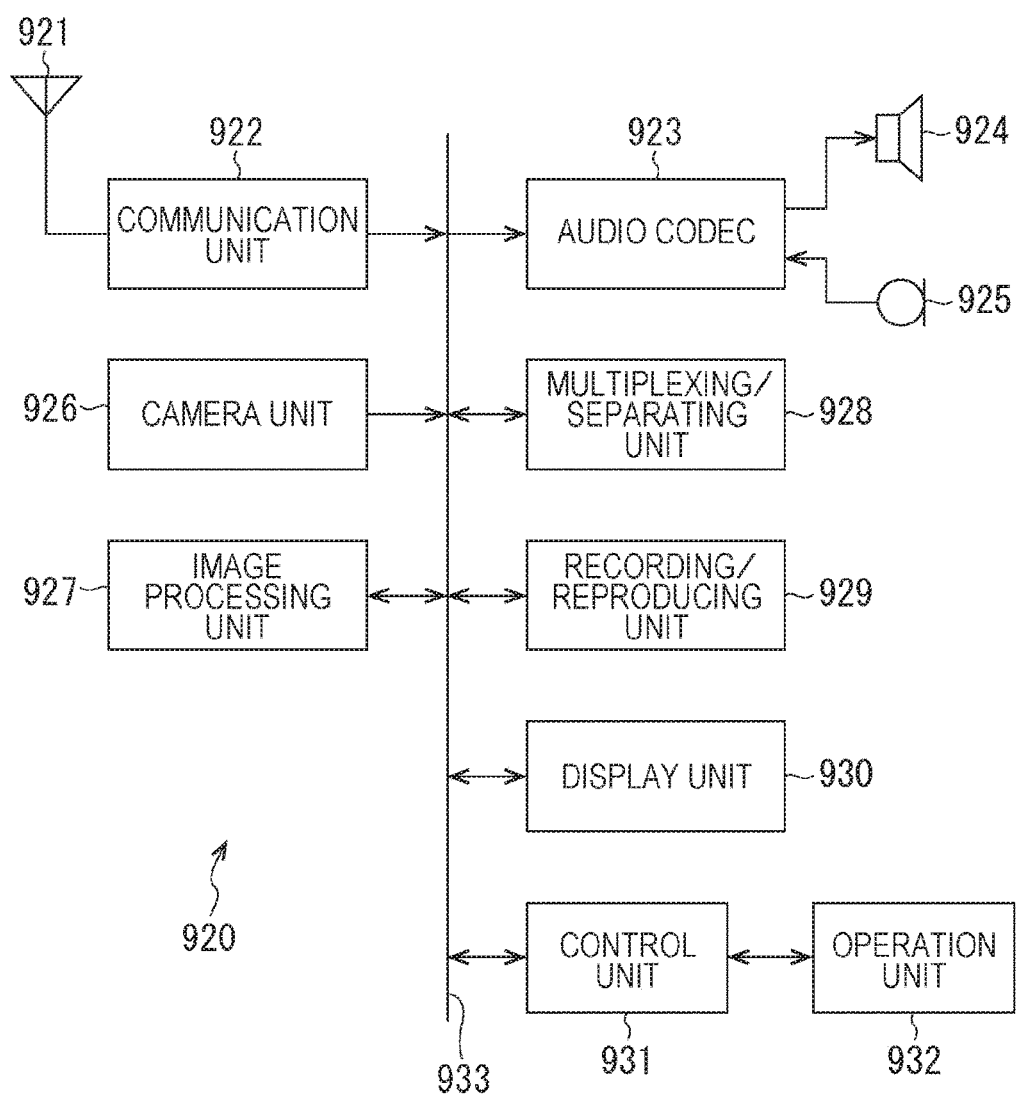
FIG. 25 is a diagram illustrating a schematic configuration example of a portable telephone to which the present disclosure is applied.

FIG. 25 illustrates a schematic configuration of a portable telephone to which the present disclosure is applied. A portable telephone 920 includes a communication unit 922, an audio codec 923, a camera unit 926, an image processing unit 927, a multiplexing/separating unit 928, a recording/reproducing unit 929, a display unit 930, and a control unit 931. These units are connected to each other through a bus 933.

Further, an antenna 921 is connected to the communication unit 922, and a speaker 924 and a microphone 925 are connected to the audio codec 923. Further, an operation unit 932 is connected to the control unit 931.

The portable telephone 920 performs various operations such as transmission and reception of an audio signal, transmission and reception of an email message and image data, image capturing, and data recording in various modes such as a voice call mode and a data communication mode.

In the voice call mode, an audio signal which is generated by the microphone 925 is converted to audio data and compressed by the audio codec 923, and supplied to the communication unit 922. The communication unit 922 performs modulation processing and frequency conversion processing on the audio data to generate a transmission signal. Further, the communication unit 922 supplies the transmission signal to the antenna 921 to transmit the transmission signal to a base station (not illustrated). Further, the communication unit 922 performs amplification, frequency conversion processing, and demodulation processing on a reception signal received by the antenna 921 and supplies the obtained audio data to the audio codec 923. The audio codec 923 decompresses the audio data and converts the audio data to an analog audio signal, and outputs the audio signal to the speaker 924.

Further, in a case where an email message is transmitted in the data communication mode, the control unit 931 receives character data which is input by an operation of the operation unit 932 and displays the input character on the display unit 930. Further, the control unit 931 generates email data on the basis of, for example, a user instruction in the operation unit 932 and supplies the generated email data to the communication unit 922. The communication unit 922 performs modulation processing and frequency conversion processing on the email data and transmits an obtained transmission signal by the antenna 921. Further, the communication unit 922 performs amplification, frequency conversion processing, and demodulation processing on the reception signal received through the antenna 921 to restore the email data. The email data is supplied to the display unit 930 to display email contents.

Further, the portable telephone 920 can also store the received email data in a storage medium by the recording/ reproducing unit 929. The storage medium is any rewritable storage medium. For example, the storage medium is a semiconductor memory such as a RAM or an integrated flash memory, or a removable medium such as a hard disk, a magnetic disk, a magneto-optical disk, an optical disk, a universal serial bus (USB) memory, or a memory card.

In a case where image data is transmitted in the data communication mode, image data which is generated by the camera unit 926 is supplied to the image processing unit 927. The image processing unit 927 performs encoding processing on the image data to generate encoded data.

The multiplexing/separating unit 928 multiplexes the encoded data generated by the image processing unit 927 and the audio data supplied from the audio codec 923 by a predetermined system and supplies the multiplexed data to the communication unit 922. The communication unit 922 performs modulation processing and frequency conversion processing on the multiplexed data and transmits an obtained transmission signal through the antenna 921. Further, the communication unit 922 performs amplification, frequency conversion processing, and demodulation processing on a reception signal received by the antenna 921 to restore the multiplexed data. The obtained multiplexed data is supplied to the multiplexing/separating unit 928. The multiplexing/separating unit 928 separates the multiplexed data, and supplies encoded data and audio data to the image processing unit 927 and the audio codec 923, respectively. The image processing unit 927 performs decoding processing on the encoded data to generate image data. The image data is supplied to the display unit 930, and the display unit 930 displays the received image. The audio codec 923 converts the audio data to an analog audio signal and supplies the analog audio signal to the speaker 924 to output the received audio.

In the portable telephone configured in this manner, the image processing unit 927 has the function of the encoding apparatus (encoding method) of the present technology and the function of the decoding apparatus (decoding method) which decodes an encoded stream as described above. Thus, it is possible to improve the encoding speed and maintain the image quality. Further, since a low delay can be achieved, it is possible to acquire video that meets demands of a user and perform appropriate video switching.

Sixth Embodiment (Configuration Example of Recoding/Reproducing Apparatus)

Figure 26:
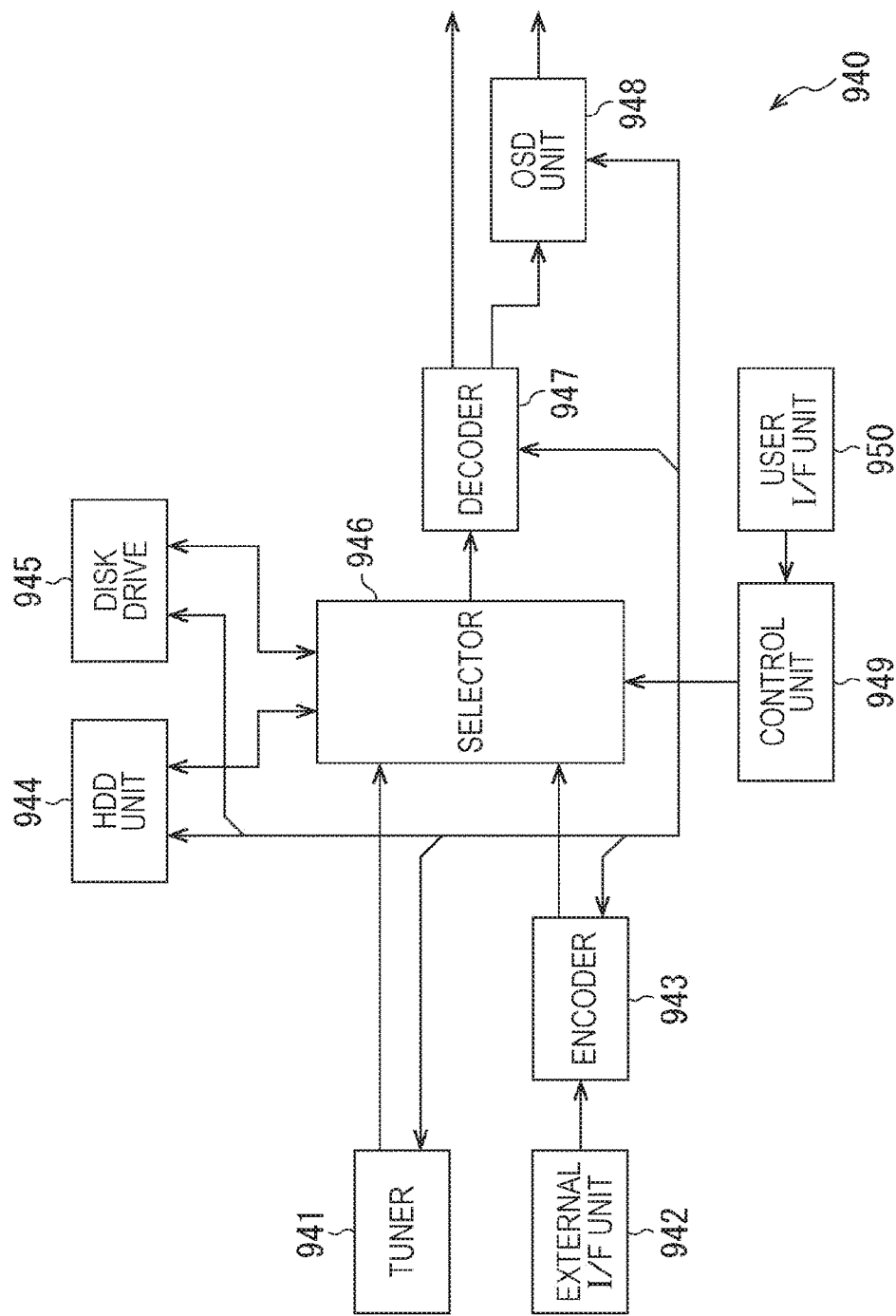
FIG. 26 is a diagram illustrating a schematic configuration example of a recording/reproducing apparatus to which the present disclosure is applied.

FIG. 26 illustrates a schematic configuration of a recording/reproducing apparatus to which the present disclosure is applied. A recording/reproducing apparatus 940, for example, records received audio data and video data of a broadcasting program in a recoding medium, and provides the recorded data items to a user at a timing corresponding to an instruction by the user. Further, the recording/reproducing apparatus 940 can, for example, acquire audio data and video data from another apparatus and record these data items in a recording medium. Further, the recording/reproducing apparatus 940 decodes and outputs audio data and video data which are recorded in a recording medium so that image display and audio output can be performed, for example, in a monitor apparatus.

The recording/reproducing apparatus 940 includes a tuner 941, an external interface unit 942, an encoder 943, a hard disk drive (HDD) unit 944, a disk drive 945, a selector 946, a decoder 947, an on-screen display (OSD) unit 948, a control unit 949, and a user interface unit 950.

The tuner 941 selects a desired channel from broadcast signals which are received by an antenna (not illustrated). The tuner 941 outputs an encoded bit stream which is obtained by demodulating a reception signal of the desired channel to the selector 946.

The external interface unit 942 includes at least any of an IEEE1394 interface, a network interface unit, a USB interface, and a flash memory interface. The external interface unit 942 is an interface for connection with an external device, a network, or a memory card and receives data to be recorded such as video data or audio data.

The encoder 943 encodes unencoded video data or audio data supplied from the external interface unit 942 by a predetermined system and outputs an encoded bit stream to the selector 946.

The HDD unit 944 records video and audio contents data, various programs, and other data in an integrated hard disk, and reads these data items from the hard disk at the time of reproduction.

The disk drive 945 performs recording and reproduction of a signal with respect to an attached optical disk. The optical disk is, for example, a DVD disk (DVD-Video, DVD-RAM, DVD-R, DVD-RW, DVD+R, or DVD+RW) or a Blu-ray (registered trademark) disk.

The selector 946 selects any of encoded bit streams from the tuner 941 or the encoder 943 and supplies the selected encoded bit stream to the HDD unit 944 or the disk drive 945 in recording video and audio. Further, the selector 946 supplies an encoded bit stream which is output from the HDD unit 944 or the disk drive 945 to the decoder 947 in reproducing video and audio.

The decoder 947 performs decoding processing on the encoded bit stream. The decoder 947 supplies video data generated by the decoding processing to the OSD unit 948. Further, the decoder 947 outputs audio data generated by the decoding processing.

The OSD unit 948 generates video data for displaying, for example, a menu screen for item selection, and superimposes the generated video data on the video data output from the decoder 947 and outputs the superimposed data.

The user interface unit 950 is connected to the control unit 949. The user interface unit 950 includes an operation switch and a remote control signal reception unit, and supplies an operation signal corresponding to a user operation to the control unit 949.

The control unit 949 is configured using a CPU and a memory. The memory stores a program executed by the CPU and various data items required for the CPU to perform processing. The program stored in the memory is read and executed by the CPU at a predetermined timing such as the time of starting the recording/reproducing apparatus 940. The CPU controls each unit so that the recording/reproducing apparatus 940 operates according to a user operation by executing the program.

In the recoding/reproducing apparatus configured in the above manner, the encoder 943 has the function of the encoding apparatus (encoding method) of the present technology. Further, the decoder 947 has the function of the decoding apparatus (decoding method) which decodes an encoded stream as described above. Thus, it is possible to improve the encoding speed and maintain the image quality. Further, since a low delay can be achieved, it is possible to acquire video that meets demands of a user and perform appropriate video switching.

Seventh Embodiment (Configuration Example of Imaging Apparatus)

Figure 27:
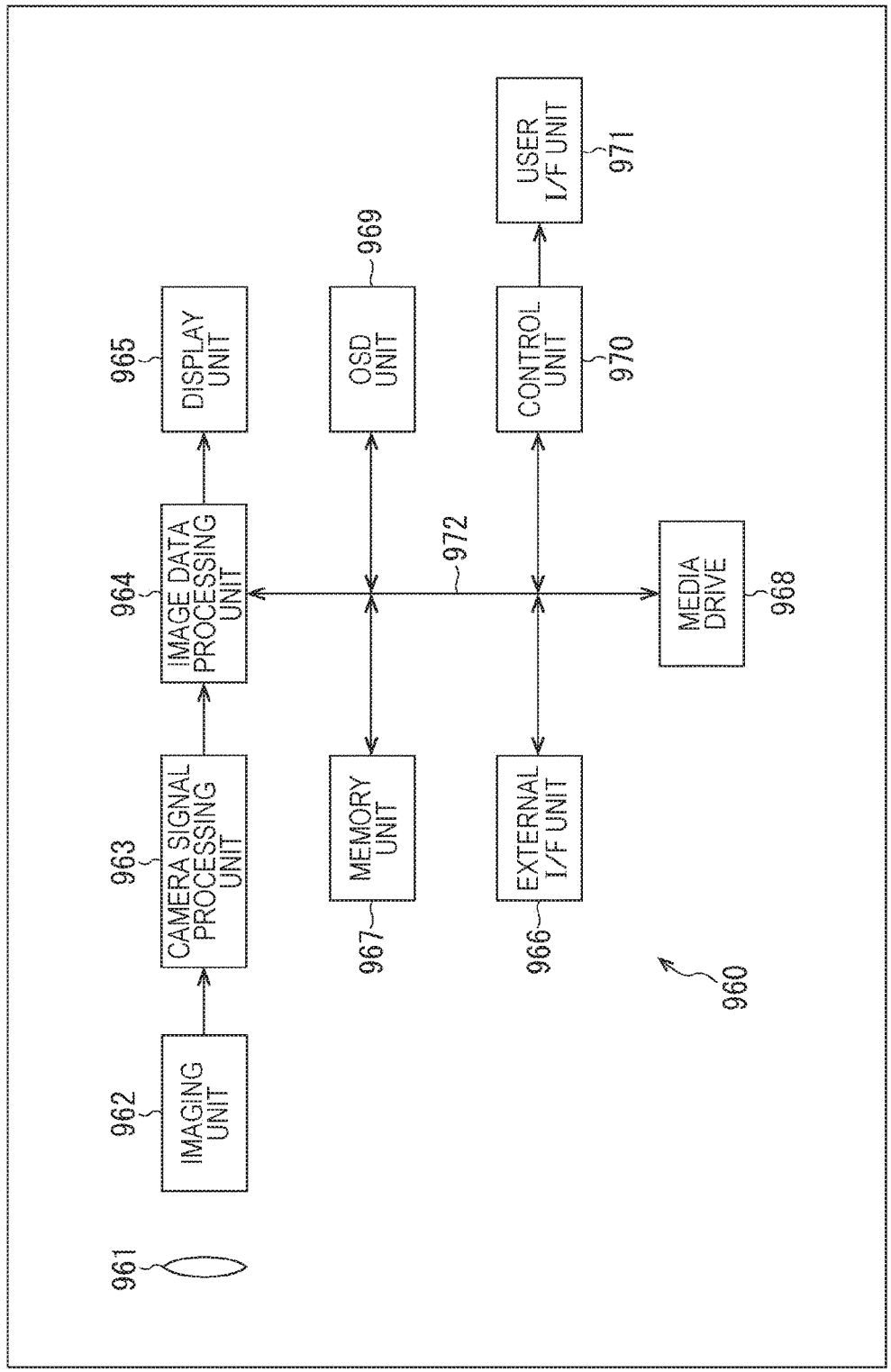
FIG. 27 is a diagram illustrating a schematic configuration example of an imaging apparatus to which the present disclosure is applied.

FIG. 27 illustrates a schematic configuration of an imaging apparatus to which the present disclosure is applied. An imaging apparatus 960 captures an image of a subject, and displays the image of the subject on a display unit or records the image as image data in a recording medium.

The imaging apparatus 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. Further, a user interface unit 971 is connected to the control unit 970. Further, the image data processing unit 964, the external interface unit 966, the memory unit 967, the media drive 968, the OSD unit 969, and the control unit 970 are connected through a bus 972.

The optical block 961 is configured using a focus lens and an aperture mechanism. The optical block 961 forms an optical image of a subject on an imaging surface of the imaging unit 962. The imaging unit 962 is configured using a CCD or CMOS image sensor, and generates an electric signal corresponding to the optical image by photoelectric conversion and supplies the generated electric signal to the camera signal processing unit 963.

The camera signal processing unit 963 performs various camera signal processing such as knee correction, gamma correction, and color correction on the electric signal supplied from the imaging unit 962. The camera signal processing unit 963 supplies image data after the camera signal processing to the image data processing unit 964.

The image data processing unit 964 performs encoding processing on the image data supplied from the camera signal processing unit 963. The image data processing unit 964 supplies encoded data generated by the encoding processing to the external interface unit 966 or the media drive 968. Further, the image data processing unit 964 performs decoding processing on encoded data supplied from the external interface unit 966 or the media drive 968. The image data processing unit 964 supplies image data generated by the decoding processing to the display unit 965. Further, the image data processing unit 964 supplies image data which is supplied from the camera signal processing unit 963 to the display unit 965, and superimposes display data which is acquired from the OSD unit 969 on image data and supplies the superimposed data to the display unit 965.

The OSD unit 969 generates display data such as a menu screen and an icon including a symbol, a character or a figure and outputs the generated display data to the image data processing unit 964.

The external interface unit 966 includes, for example, a USB input/output terminal, and is connected to a printer in a case where an image is printed. Further, a drive is connected to the external interface unit 966 as needed, a removable medium such as a magnetic disk or an optical disk is appropriately attached thereto, and a computer program read therefrom is installed as needed. Further, the external interface unit 966 includes a network interface which is connected to a predetermined network such as LAN or the Internet. The control unit 970 is capable of, for example, reading encoded data from the media drive 968 in accordance with an instruction from the user interface unit 971 and supplying the read encoded data to another apparatus which is connected through a network from the external interface unit 966. Further, the control unit 970 is capable of acquiring encoded data or image data which is supplied from another apparatus through the network through the external interface unit 966 and supplying the acquired data to the image data processing unit 964.

For example, any readable/writable removable medium such as a magnetic disk, a magneto-optical disk, an optical disk, or a semiconductor memory is used as the recording medium which is driven by the media drive 968. Further, the recording medium may be any type of removable medium, and may be a tape device, a disk, or a memory card. Of course, the recoding medium may be a contactless integrated circuit (IC) card.

Further, the media drive 968 and a recording medium may be integrated, and may be configured as a non-transportable storage medium such as an integrated hard disk drive or a solid state drive (SSD).

The control unit 970 is configured using a CPU. The memory unit 967 stores a program executed by the control unit 970 and various data items which are required for the control unit 970 to perform processing. The program stored in the memory unit 967 is read and executed by the control unit 970 at a predetermined timing such as the time of starting the imaging apparatus 960. The control unit 970 controls each unit so that the imaging apparatus 960 operates according to a user operation by executing the program.

In the imaging apparatus configured in the above manner, the image data processing unit 964 has the function of the encoding apparatus (encoding method) of the present application and the function of the decoding apparatus (decoding method) which decodes an encoded stream as described above. Thus, it is possible to improve the encoding speed and maintain the image quality. Further, since a low delay can be achieved, it is possible to acquire video that meets demands of a user and perform appropriate video switching.

Eighth Embodiment (Other Examples of Implementation)

Examples of the apparatus and the system to which the present disclosure is applied have been described above. However, the present disclosure is not limited to these examples, and may also be implemented as any configurations mounted on such apparatus or an apparatus which constitutes such system, for example, a processor as a system large scale integration (LSI), a module which uses a plurality of processors, a unit which uses a plurality of modules, or a set which includes another function added to a unit (that is, a partial configuration of an apparatus).

(Configuration Example of Video Set)

Figure 28:
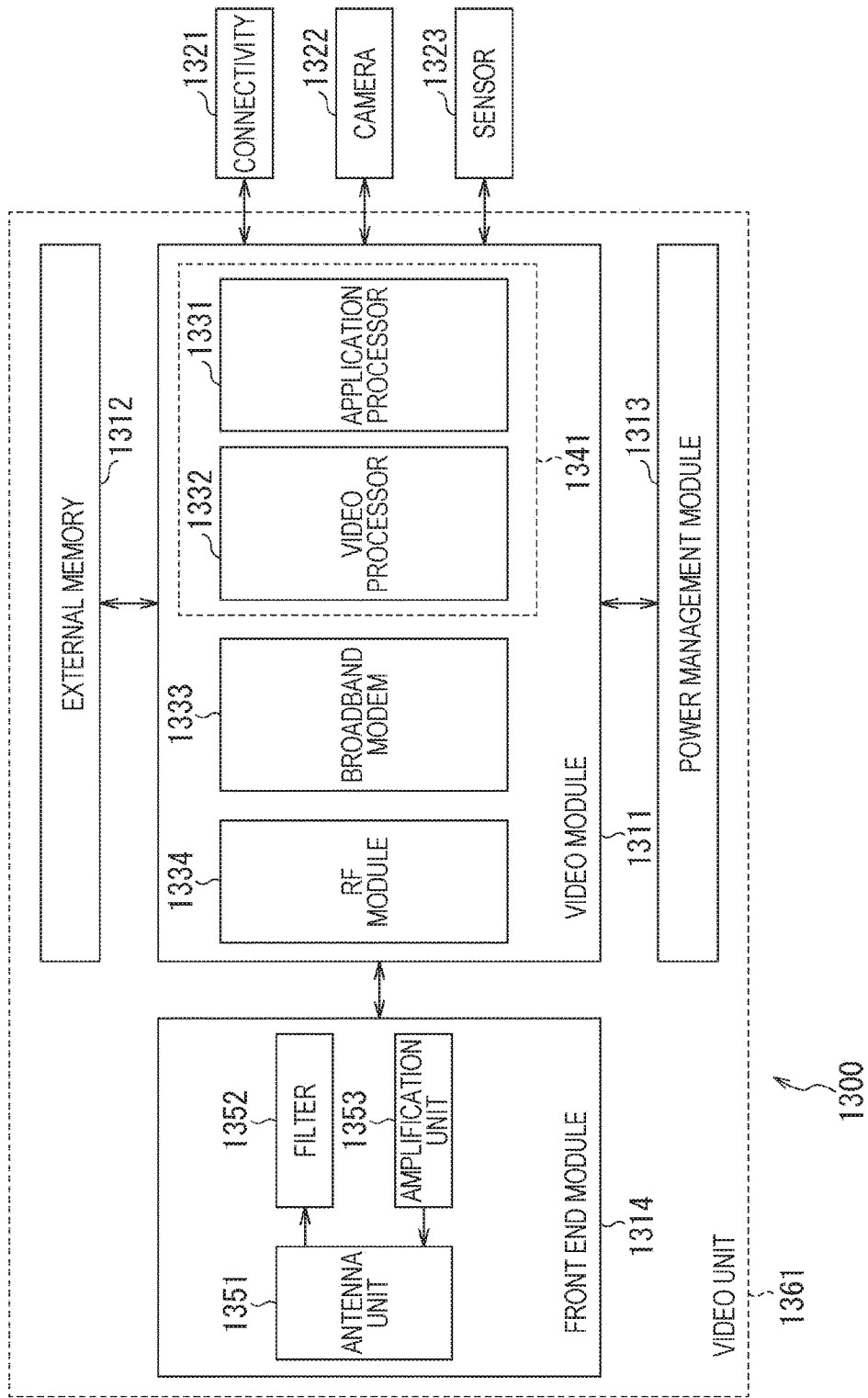
FIG. 28 is a diagram illustrating an example of a schematic configuration of a video set to which the present disclosure is applied.

An example of a case in which the present disclosure is implemented as a set will be described with reference to FIG. 28. FIG. 28 illustrates an example of a schematic configuration of a video set to which the present disclosure is applied.

In recent years, there have been advances in multifunctionality of electronic devices. In development and manufacture of the electronic devices, in a case where a partial configuration thereof is implemented by selling or providing, the configuration is often implemented not only as a configuration having a single function, but also as one set having a plurality of functions by combining a plurality of configurations having related functions.

A video set 1300 illustrated in FIG. 28 has such a multifunctional configuration and combines a device having a function relating to image encoding and decoding (either one or both) and a device having another function relating to the function relating to image encoding and decoding.

As illustrated in FIG. 28, the video set 1300 includes a module group including a video module 1311, an external memory 1312, a power management module 1313 and a front end module 1314, and devices having related functions including a connectivity 1321, a camera 1322 and a sensor 1323.

A module is a component having a unified function by unifying some component functions related to each other. Although a module has any specific physical configuration, for example, a plurality of processors having respective functions, electronic circuit elements such as a resistor and a capacitor, and other devices may be arranged on a circuit board and integrated together. Further, a module and another module or a processor may be combined to construct a new module.

In the example of FIG. 28, the video module 1311 is a combination of configurations having functions relating to image processing, and includes an application processor, a video processor, a broadband modem 1333, and an RF module 1334.

A processor includes a configuration having a predetermined function which is integrated on a semiconductor chip by system on a chip (SoC), and is called, for example, a system large scale integration (LSI). The configuration having a predetermined function may be a logical circuit (hardware configuration), or a CPU, a ROM, and a RAM and a program executed by using the CPU, the ROM, and the RAM (software configuration), or a combination of the hardware configuration and the software configuration. For example, a processor may include a logical circuit, a CPU, a ROM, and a RAM, and part of the function may be implemented by the logical circuit (hardware configuration), and the other part of the function may be implemented by a program executed by the CPU (software configuration).

The application processor 1331 of FIG. 28 is a processor that executes an application relating to image processing. The application executed in the application processor 1331 not only performs operation processing, but also can control a configuration inside and outside the video module 1311 such as the video processor 1332 as needed to implement a predetermined function.

The video processor 1332 is a processor that has a function relating to image encoding and decoding (either one or both).

The broadband modem 1333 is a processor (or a module) that performs processing relating to wired or wireless (or both) broadband communication which is performed through a broadband line such as the Internet or a public telephone line. For example, the broadband modem 1333 digitally modulates data to be transmitted (digital signal) to convert the data to an analog signal and demodulates a received analog signal to convert the analog signal to data (digital signal). For example, the broadband modem 1333 is capable of digitally modulating and demodulating any information such as image data processed by the video processor 1332, a stream obtained by encoding image data, an application program, or setting data.

The RF module 1334 is a module that performs frequency conversion, modulation/demodulation, amplification, and filter processing on a radio frequency (RF) signal which is transmitted and received through an antenna. For example, the RF module 1334 performs frequency conversion on a base band signal which is generated by the broadband modem 1333 to generate an RF signal. Further, for example, the RF module 1334 performs frequency conversion on an RF signal which is received through the front end module 1314 to generate a base band signal.

Further, as indicated by a dotted line 1341 in FIG. 28, the application processor 1331 and the video processor 1332 may be integrated so as to be configured as one processor.

The external memory 1312 is a module that is disposed outside the video module 1311 and includes a storage device which is used by the video module 1311. The storage device of the external memory 1312 may be implemented by any physical configuration. However, since the storage device is typically often used for storing large-volume data such as image data in a frame unit, the storage device is desirably implemented by, for example, a semiconductor memory such as a dynamic random access memory (DRAM) which is relatively inexpensive and has large capacity.

The power management module 1313 manages and controls power supply to the video module 1311 (each configuration in the video module 1311).

The front end module 1314 is a module that provides a front end function (a circuit on a transmission/reception end at the antenna side) to the RF module 1334. As illustrated in FIG. 28, the front end module 1314 includes, for example, an antenna unit 1351, a filter 1352, and an amplification unit 1353.

The antenna unit 1351 includes an antenna which transmits and receives a radio signal and a peripheral configuration thereof. The antenna unit 1351 transmits a signal which is supplied from the amplification unit 1353 as a radio signal and supplies a received radio signal to the filter 1352 as an electric signal (RF signal). The filter 1352 performs filter processing on the RF signal which is received through the antenna unit 1351 and supplies the processed RF signal to the RF module 1334. The amplification unit 1353 amplifies an RF signal supplied from the RF module 1334 and supplies the amplified RF signal to the antenna unit 1351.

The connectivity 1321 is a module that has a function relating to connection with the outside. The connectivity 1321 has any physical configuration. For example, the connectivity 1321 includes a configuration having a communication function other than a communication standard corresponding to the broadband modem 1333 and an external input/output terminal.

For example, the connectivity 1321 may include a module having a communication function compliant with a wireless communication standard such as Bluetooth (registered trademark), IEEE 802.11 (e.g., Wireless Fidelity (Wi-Fi, registered trademark)), near field communication (NFC), or infrared data association (IrDA) and an antenna which transmits and receives a signal compliant with the standard. Further, for example, the connectivity 1321 may include a module having a communication function compliant with a wired communication standard such as universal serial bus (USB) or high-definition multimedia interface (HDMI, registered trademark) and a terminal compliant with the standard. Further, for example, the connectivity 1321 may include another data (signal) transfer function such as an analog input/output terminal.

Further, the connectivity 1321 may include a device of a transfer destination of data (signal). For example, the connectivity 1321 may include a drive (including not only a drive of a removable medium, but also a hard disk, a solid state drive (SSD), and a network attached storage (NAS)) which performs reading and writing of data with respect to a recording medium such as a magnetic disk, an optical disk, a magneto-optical disk, or a semiconductor memory. Further, the connectivity 1321 may include an output device (a monitor or a speaker) for an image or audio.

The camera 1322 is a module having a function of capturing an image of a subject to obtain image data of the subject. Image data obtained by image capturing of the camera 1322 is, for example, supplied to the video processor 1332 and encoded.

The sensor 1323 is a module having any sensor function such as an audio sensor, an ultrasonic sensor, an optical sensor, a light intensity sensor, an infrared sensor, an image sensor, a rotation sensor, an angle sensor, an angular velocity sensor, a speed sensor, an acceleration sensor, a tilt sensor, a magnetic identification sensor, an impact sensor, or a temperature sensor. Data detected by the sensor 1323 is, for example, supplied to the application processor 1331 and used by an application.

The configuration described as a module in the above may be implemented as a processor. Conversely, the configuration described as a processor may be implemented as a module.

In the video set 1300 having the above configuration, the present disclosure can be applied to the video processor 1332 as described below. Thus, the video set 1300 can be implemented as a set to which the present disclosure is applied.

(Configuration Example of Video Processor)

Figure 29:
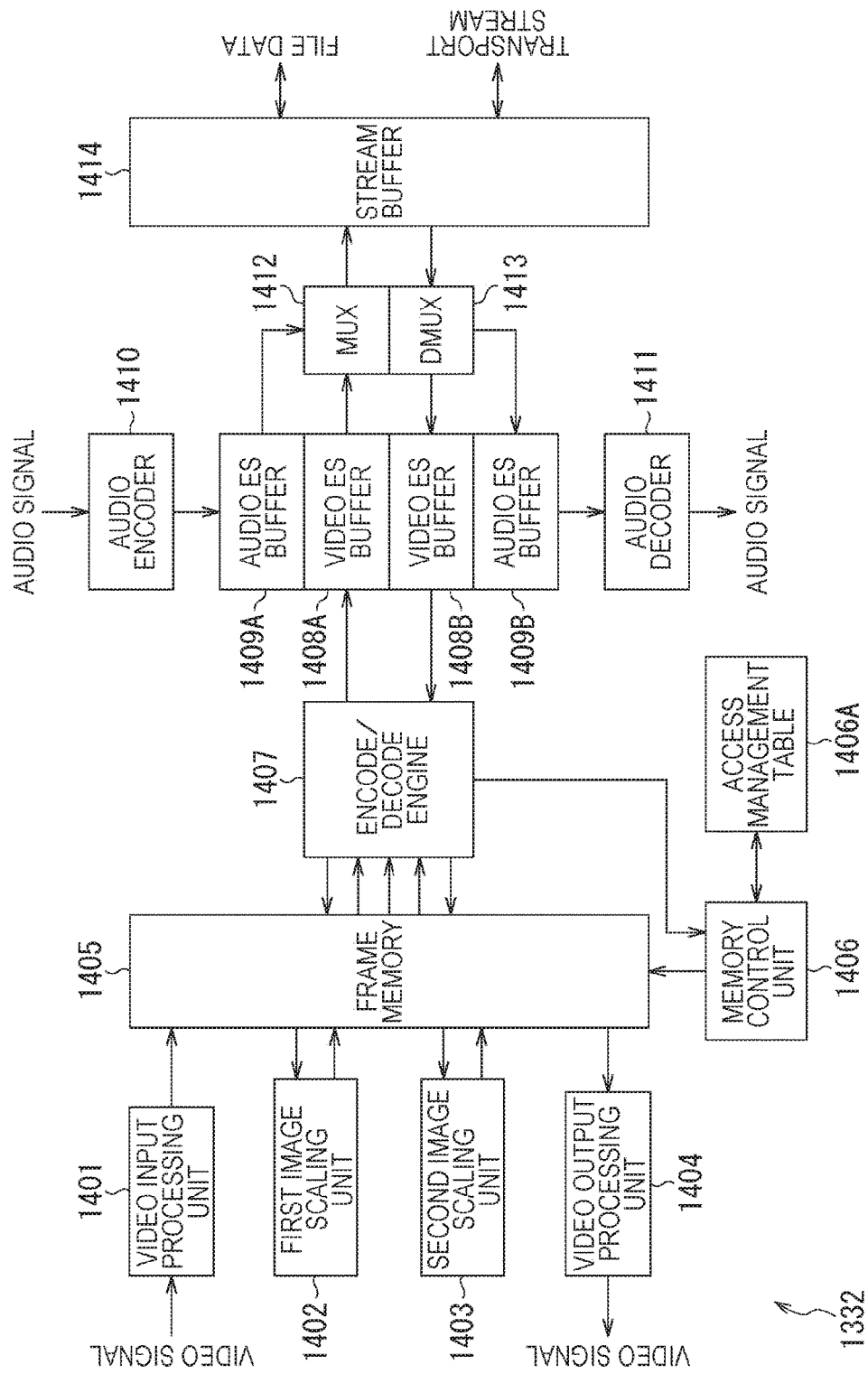
FIG. 29 is a diagram illustrating an example of a schematic configuration of a video processor to which the present disclosure is applied.

FIG. 29 illustrates an example of a schematic configuration of the video processor 1332 (FIG. 28) to which the present disclosure is applied.

In the example of FIG. 29, the video processor 1332 has a function of encoding a video signal and an audio signal by a predetermined system upon reception of these signals and a function of decoding encoded video data and audio data and reproducing and outputting a video signal and an audio signal.

As illustrated in FIG. 29, the video processor 1332 includes a video input processing unit 1401, a first image scaling unit 1402, a second image scaling unit 1403, a video output processing unit 1404, a frame memory 1405, and a memory control unit 1406. Further, the video processor 1332 includes an encode/decode engine 1407, video elementary stream (ES) buffers 1408A and 1408B, and audio ES buffers 1409A and 1409B. Further, the video processor 1332 includes an audio encoder 1410, an audio decoder 1411, a multiplexer (MUX) 1412, a demultiplexer (DMUX) 1413, and a stream buffer 1414.

The video input processing unit 1401 acquires a video signal which is input from, for example, the connectivity 1321 (FIG. 28) and converts the acquired video signal to digital image data. The first image scaling unit 1402 performs format conversion and image scaling processing on image data. The second image scaling unit 1403 performs image scaling processing on image data in accordance with a format in a destination of output through the video output processing unit 1404 or performs format conversion and image scaling processing similar to those performed by the first image scaling unit 1402. The video output processing unit 1404 performs format conversion and conversion to an analog signal on image data and outputs the image data as a reproduced video signal to, for example, the connectivity 1321 (FIG. 28).

The frame memory 1405 is a memory for image data that is shared between the video input processing unit 1401, the first image scaling unit 1402, the second image scaling unit 1403, the video output processing unit 1404, and the encode/decode engine 1407. The frame memory 1405 is implemented as, for example, a semiconductor memory such as a DRAM.

The memory control unit 1406 receives a synchronous signal from the encode/decode engine 1407 and controls access of writing/reading with respect to the frame memory 1405 in accordance with an access schedule to the frame memory 1405 which is written in an access management table 1406A. The access management table 1406A is updated by the memory control unit 1406 in accordance with processing executed by the encode/decode engine 1407, the first image scaling unit 1402, and the second image scaling unit 1403.

The encode/decode engine 1407 performs encode processing on image data and decode processing on a video stream which is data obtained by encoding image data. For example, the encode/decode engine 1407 encodes image data read from the frame memory 1405 and sequentially writes the encoded image data as video streams to the video ES buffer 1408A. Further, for example, the encode/decode engine 1407 sequentially reads video streams from the video ES buffer 1408B and decodes the read video streams, and sequentially writes the decoded video streams as image data into the frame memory 1405. The encode/decode engine 1407 uses the frame memory 1405 as a work area in the encoding and decoding. Further, the encode/decode engine 1407 outputs a synchronous signal to the memory control unit 1406, for example, at the timing of starting processing for each macroblock.

The video ES buffer 1408A buffers a video stream which is generated by the encode/decode engine 1407 and supplies the buffered video stream to the multiplexer (MUX) 1412. The video ES buffer 1408B buffers a video stream which is supplied from the demultiplexer (DMUX) 1413 and supplies the buffered video stream to the encode/decode engine 1407.

The audio ES buffer 1409A buffers an audio stream which is generated by the audio encoder 1410 and supplies the buffered audio stream to the multiplexer (MUX) 1412. The audio ES buffer 1409B buffers an audio stream which is supplied from the demultiplexer (DMUX) 1413 and supplies the buffered audio stream to the audio decoder 1411.

The audio encoder 1410, for example, digitally converts an audio signal which is input from, for example, the connectivity 1321 (FIG. 28) and encodes the audio signal by a predetermined system such as the MPEG audio system or the Audio Code number 3 (AC3) system. The audio encoder 1410 sequentially writes audio streams each of which is data obtained by encoding an audio signal into the audio ES buffer 1409A. The audio decoder 1411 decodes an audio stream supplied from the audio ES buffer 1409B, converts the decoded audio stream, for example, to an analog signal, and supplies the converted signal as a reproduced audio signal, for example, to the connectivity 1321 (FIG. 28).

The multiplexer (MUX) 1412 multiplexes a video stream and an audio stream. This multiplexing method (that is, a format of a bit stream generated by multiplexing) is any method. Further, in the multiplexing, the multiplexer (MUX) 1412 can also add, for example, predetermined header information to the bit stream. That is, the multiplexer (MUX) 1412 can convert a format of a stream by multiplexing. For example, the multiplexer (MUX) 1412 multiplexes a video stream and an audio stream to convert the video stream and the audio stream to a transport stream which is a bitstream of a transfer format. Further, for example, the multiplexer (MUX) 1412 multiplexes a video stream and an audio stream to convert the video stream and the audio stream to data (file data) of a recording file format.

The demultiplexer (DMUX) 1413 demultiplexes a bitstream obtained by multiplexing a video stream and an audio stream by a method corresponding to multiplexing by the multiplexer (MUX) 1412. That is, the demultiplexer (DMUX) 1413 extracts a video stream and an audio stream from a bit stream which is read from the stream buffer 1414

(separates the video stream and the audio stream). That is, the demultiplexer (DMUX) 1413 can convert a format of a stream by demultiplexing (inverse conversion of the conversion performed by the multiplexer (MUX) 1412). For example, the demultiplexer (DMUX) 1413 can convert a transport stream which is supplied from, for example, the connectivity 1321 (FIG. 28) or the broadband modem 1333 (FIG. 28) to a video stream and an audio stream by acquiring the transport stream through the stream buffer 1414 and demultiplexing the acquired transport stream. Further, for example, the demultiplexer (DMUX) 1413 can convert file data which is read from various recording media, for example, by the connectivity 1321 (FIG. 28) to a video stream and an audio stream by acquiring the file data through the stream buffer 1414 and demultiplexing the acquired file data.

The stream buffer 1414 buffers a bit stream. For example, the stream buffer 1414 buffers a transport stream supplied from the multiplexer (MUX) 1412 and supplies the buffered transport stream, for example, to the connectivity 1321 (FIG. 28) or the broadband modem 1333 (FIG. 28) at a predetermined timing or in accordance with a request from the outside or the like.

Further, for example, the stream buffer 1414 buffers file data supplied from the multiplexer (MUX) 1412 and supplies the buffered file data, for example, to the connectivity 1321 (FIG. 28) at a predetermined timing or in accordance with a request from the outside or the like so as to record the buffered file data in various recording media.

Further, the stream buffer 1414 buffers a transport stream acquired through, for example, the connectivity 1321 (FIG. 28) or the broadband modem 1333 (FIG. 28) and supplies the buffered transport stream, for example, to the demultiplexer (DMUX) 1413 at a predetermined timing or in accordance with a request from the outside or the like.

Further, the stream buffer 1414 buffers file data read from various recording media in, for example, the connectivity 1321 (FIG. 28) and supplies the buffered file data, for example, to the demultiplexer (DMUX) 1413 at a predetermined timing or in accordance with a request from the outside or the like.

Next, an example of the operation of the video processor 1332 having such a configuration will be described. For example, a video signal which is input to the video processor 1332 from the connectivity 1321 (FIG. 28) is converted to digital image data of a predetermined system such as a 4:2:2Y/Cb/Cr system in the video input processing unit 1401 and sequentially written into the frame memory 1405. The digital image data is read by the first image scaling unit 1402 or the second image scaling unit 1403, subjected to format conversion to a predetermined system such as a 4:2:0Y/Cb/Cr system and scaling processing, and again written into the frame memory 1405. The image data is encoded by the encode/decode engine 1407 and written as a video stream into the video ES buffer 1408A.

Further, an audio signal which is input to the video processor 1332 from the connectivity 1321 (FIG. 28) is encoded by the audio encoder 1410 and written as an audio stream into the audio ES buffer 1409A.

The video stream in the video ES buffer 1408A and the audio stream in the audio ES buffer 1409A are read and multiplexed by the multiplexer (MUX) 1412 and converted to a transport stream or file data. The transport stream generated by the multiplexer (MUX) 1412 is buffered by the stream buffer 1414 and then, for example, output to an external network through the connectivity 1321 (FIG. 28) or the broadband modem 1333 (FIG. 28). Further, the file data generated by the multiplexer (MUX) 1412 is buffered by the stream buffer 1414, then, for example, output to the connectivity 1321 (FIG. 28), and recorded in various recording media.

Further, for example, a transport stream which is input to the video processor 1332 from the external network through the connectivity 1321 (FIG. 28) or the broadband modem 1333 (FIG. 28) is buffered by the stream buffer 1414 and then demultiplexed by the demultiplexer (DMUX) 1413. Further, for example, file data which is read from various recording media in the connectivity 1321 (FIG. 28) and input to the video processor 1332 is buffered by the stream buffer 1414 and then demultiplexed by the demultiplexer (DMUX) 1413. That is, the transport stream or the file data input to the video processor 1332 is separated into a video stream and an audio stream by the demultiplexer (DMUX) 1413.

The audio stream is supplied to the audio decoder 1411 through the audio ES buffer 1409B and decoded therein, so that an audio signal is reproduced. Further, the video stream is written into the video ES buffer 1408B, then sequentially read and decoded by the encode/decode engine 1407, and written into the frame memory 1405. The decoded image data is scaled by the second image scaling unit 1403 and written into the frame memory 1405. Then, the decoded image data is read by the video output processing unit 1404, format-converted to a predetermined system such as a 4:2:2Y/Cb/Cr system, and further converted to an analog signal, so that a video signal is reproduced and output.

In a case where the present disclosure is applied to the video processor 1332 configured in this manner, the present disclosure according to each of the above embodiments may be applied to the encode/decode engine 1407. That is, for example, the encode/decode engine 1407 may have the function of the encoding apparatus and the function of the decoding apparatus according to the first embodiment. This enables the video processor 1332 to obtain effects similar to the effects described above with reference to FIGS. 1 to 22.

Further, in the encode/decode engine 1407, the present disclosure (that is, the function of the image encoding apparatus and the function of the image decoding apparatus according to each of the above embodiments) may be implemented by hardware such as a logical circuit, or implemented by software such as an embedded program, or may be implemented by both of them.

(Another Configuration Example of Video Processor)

Figure 30:
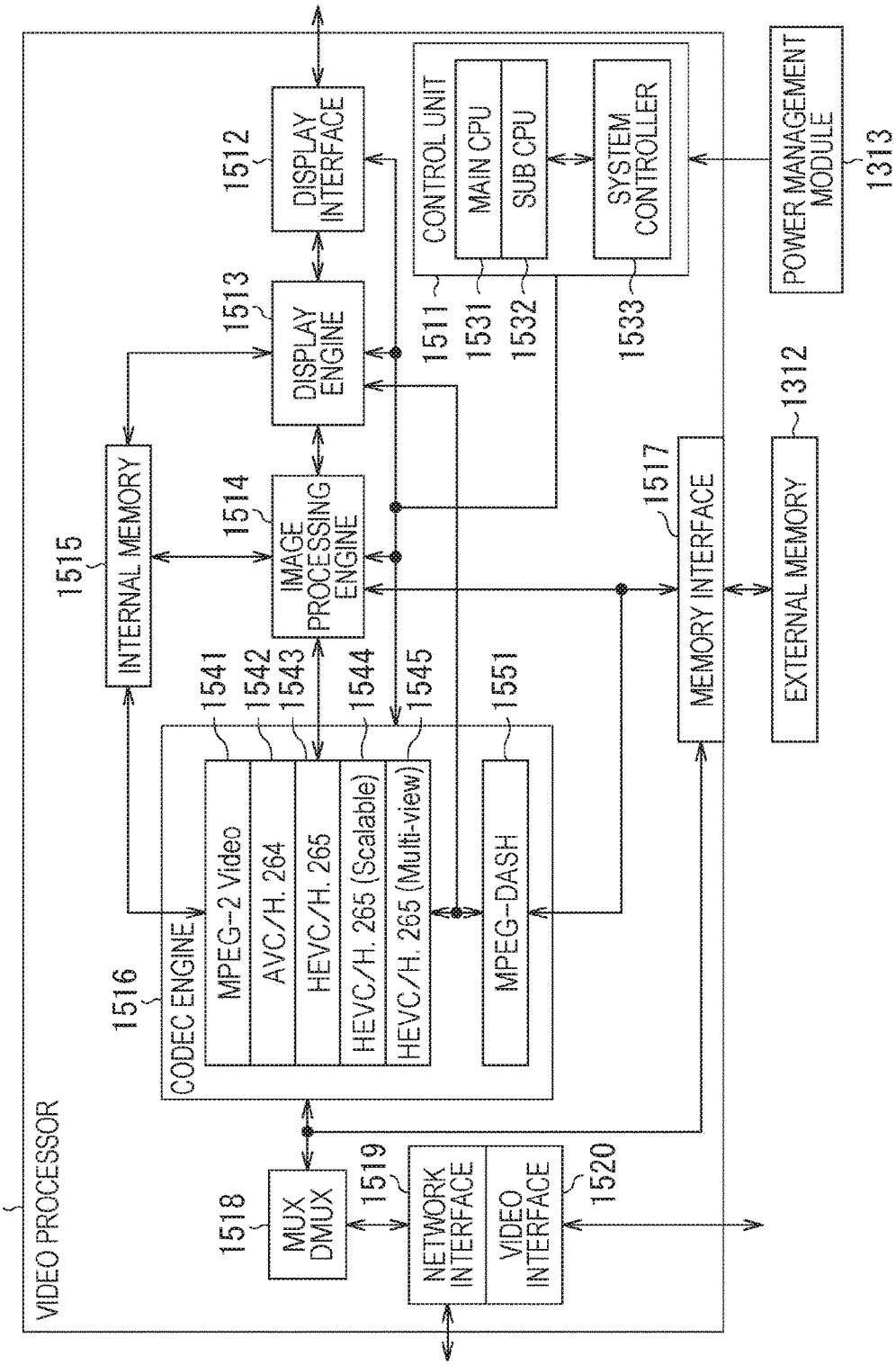
FIG. 30 is a diagram illustrating another example of the schematic configuration of the video processor to which the present disclosure is applied.

FIG. 30 illustrates another example of the schematic configuration of the video processor 1332 (FIG. 28) to which the present disclosure is applied. In the example of FIG. 30, the video processor 1332 has a function of encoding and decoding video data by a predetermined system.

More specifically, as illustrated in FIG. 30, the video processor 1332 includes a control unit 1511, a display interface 1512, a display engine 1513, an image processing engine 1514, and an internal memory 1515. Further, the video processor 1332 includes a codec engine 1516, a memory interface 1517, a multiplexer/demultiplexer (MUX/DMUX) 1518, a network interface 1519, and a video interface 1520.

The control unit 1511 controls the operation of each of the processing units inside the video processor 1332, specifically, the display interface 1512, the display engine 1513, the image processing engine 1514, and the codec engine 1516.

As illustrated in FIG. 30, the control unit 1511 includes, for example, a main CPU 1531, a sub CPU 1532, and a system controller 1533. The main CPU 1531 executes a program for controlling the operation of each processing unit inside the video processor 1332. The main CPU 1531 generates a control signal in accordance with the program and supplies the generated control signal to each processing unit (that is, controls the operation of each processing unit). The sub CPU 1532 plays a role of assisting the main CPU 1531. For example, the sub CPU 1532 executes a child process or a subroutine of a program executed by the main CPU 1531. The system controller 1533 controls the operations of the main CPU 1531 and the sub CPU 1532, for example, designates a program executed by the main CPU 1531 and the sub CPU 1532.

The display interface 1512 outputs image data to, for example, the connectivity 1321 (FIG. 28) under the control of the control unit 1511. For example, the display interface 1512 converts digital image data to an analog signal and outputs the converted analog signal as a reproduced video signal or outputs the digital image data as it is to a monitor apparatus of the connectivity 1321 (FIG. 28).

The display engine 1513 performs various conversion processing such as format conversion, size conversion, and color gamut conversion on image data under the control of the control unit 1511 in accordance with a hardware specification of a monitor apparatus which displays the image.

The image processing engine 1514, for example, performs predetermined image processing such as filter processing for improving the image quality on image data under the control of the control unit 1511.

The internal memory 1515 is provided inside the video processor 1332 and shared between the display engine 1513, the image processing engine 1514, and the codec engine 1516. The internal memory 1515 is used, for example, for transmission and reception of data between the display engine 1513, the image processing engine 1514, and the codec engine 1516. For example, the internal memory 1515 stores data supplied from the display engine 1513, the image processing engine 1514, or the codec engine 1516 and supplies the stored data to the display engine 1513, the image processing engine 1514, or the codec engine 1516 ad needed (e.g., in response to a request). The internal memory 1515 may be implemented by any storage device. However, since the internal memory 1515 is often used for storing small-volume data such as image data in a block unit or a parameter, the internal memory 1515 is desirably implemented by a semiconductor memory that has a relatively small capacity (relative to the external memory 1312, for example), but has a high response speed such as a static random access memory (SRAM).

The codec engine 1516 performs processing relating to encoding and decoding of image data. An encoding/decoding system corresponding to the codec engine 1516 is any system, and may be one system or a plurality of systems. For example, the codec engine 1516 may have codec functions of a plurality of encoding/decoding systems, and may perform encoding of image data or decoding of encoded data by one selected from these codec functions.

In the example of FIG. 30, the codec engine 1516 includes, for example, MPEG-2 Video 1541, AVC/H.264 1542, HEVC/H.265 1543, HEVC/H.265 (Scalable) 1544, HEVC/H.265 (Multi-view) 1545, and MPEG-DASH 1551 as functional blocks of processing relating to the codec.

The MPEG-2 Video 1541 is a functional block that encodes and decodes image data by the MPEG-2 system. The AVC/H.264 1542 is a functional block that encodes and decodes image data by the AVC system. The HEVC/H.265 1543 is a functional block that encodes and decodes image data by the HEVC system. The HEVC/H.265 (Scalable) 1544 is a functional block that scalable-encodes and scalable-decodes image data by the HEVC system. The HEVC/H.265 (Multi-view) 1545 is a functional block that multiaspect-encodes and multiaspect-decodes image data by the HEVC system.

The MPEG-DASH 1551 is a functional block that transmits and receives image data by the MPEG-dynamic adaptive streaming over HTTP (MPEG-DASH) system. MPEG-DASH is a technology that performs streaming of video using HyperText Transfer Protocol (HTTP) and is characterized, for example, by selecting appropriate encoded data in a segment unit from a plurality of previously-prepared encoded data items having different resolutions and transferring the selected encoded data. The MPEG-DASH 1551 generates a stream compliant with a standard and controls transfer of the stream, and the above MPEG-2 Video 1541 to the HEVC/H.265 (Multi-view) 1545 are used in encoding/decoding of image data.

The memory interface 1517 is an interface for the external memory 1312. Data items supplied from the image processing engine 1514 and the codec engine 1516 are supplied to the external memory 1312 through the memory interface 1517. Further, data read from the external memory 1312 is supplied to the video processor 1332 (the image processing engine 1514 or the codec engine 1516) through the memory interface 1517.

The multiplexer/demultiplexer (MUX/DMUX) 1518 multiplexes and demultiplexes various data items relating to an image such as a bit stream of encoded data, image data, and a video signal. A method of the multiplexing/demultiplexing may be any method. For example, in multiplexing, the multiplexer/demultiplexer (MUX/DMUX) 1518 is capable of not only integrating a plurality of data items into one data, but also adding predetermined header information to the data. Further, in demultiplexing, the multiplexer/demultiplexer (MUX/DMUX) 1518 is capable of not only dividing one data into a plurality of data items, but also adding predetermined header information to each divided data item. That is the multiplexer/demultiplexer (MUX/DMUX) 1518 is capable of converting a format of data by multiplexing and demultiplexing. For example, the multiplexer/demultiplexer (MUX/DMUX) 1518 is capable of converting a bit stream to a transport stream which is a bit stream of a transfer format or to data (file data) of a recording file format by multiplexing the bit stream. Of course, inverse conversion thereof can be performed by demultiplexing.

The network interface 1519 is, for example, an interface for the broadband modem 1333 (FIG. 28) and the connectivity 1321 (FIG. 28). The video interface 1520 is, for example, an interface for the connectivity 1321 (FIG. 28) and the camera 1322 (FIG. 28).

Next, an example of the operation of the video processor 1332 will be described. For example, when a transport stream is received from an external network through the connectivity 1321 (FIG. 28) or the broadband modem 1333 (FIG. 28), the transport stream is supplied to the multiplexer/demultiplexer (MUX/DMUX) 1518 through the network interface 1519 and demultiplexed therein, and decoded by the codec engine 1516. Image data obtained by decoding by the codec engine 1516 is, for example, subjected to predetermined image processing by the image processing engine 1514, subjected to predetermined conversion by the display engine 1513, and supplied to, for example, the connectivity 1321 (FIG. 28) through the display interface 1512, and an image thereof is displayed on the monitor. Further, for example, image data obtained by decoding by the codec engine 1516 is re-encoded by the codec engine 1516, multiplexed by the multiplexer/demultiplexer (MUX/DMUX) 1518 and thereby converted to file data, output to, for example, the connectivity 1321 (FIG. 28) through the video interface 1520, and recorded in various recording media.

Further, for example, file data of encoded data obtained by encoding image data, the file data being read from a recording medium (not illustrated) by the connectivity 1321 (FIG. 28), is supplied to the multiplexer/demultiplexer (MUX/DMUX) 1518 through the video interface 1520 and demultiplexed therein, and decoded by the codec engine 1516. Image data obtained by decoding by the codec engine 1516 is subjected to predetermined image processing by the image processing engine 1514, subjected to predetermined conversion by the display engine 1513, and supplied to, for example, the connectivity 1321 (FIG. 28) through the display interface 1512, and an image thereof is displayed on the monitor. Further, for example, image data obtained by decoding by the codec engine 1516 is re-encoded by the codec engine 1516, multiplexed by the multiplexer/demultiplexer (MUX/DMUX) 1518 and thereby converted to a transport stream, supplied to, for example, the connectivity 1321 (FIG. 28) or the broadband modem 1333 (FIG. 28) through the network interface 1519, and transferred to another apparatus (not illustrated).

Further, transmission and reception of image data or another data between the processing units inside the video processor 1332 are performed using the internal memory 1515 or the external memory 1312. Further, the power management module 1313 controls, for example, power supply to the control unit 1511.

In a case where the present disclosure is applied to the video processor 1332 configured in the above manner, the present disclosure according to each of the above embodiments may be applied to the codec engine 1516. That is, for example, the codec engine 1516 may include functional blocks that implement the encoding apparatus and the decoding apparatus according to the first embodiment. Further, for example, the codec engine 1516 configured in this manner enables the video processor 1332 to obtain effects similar to the effects described above with reference to FIGS. 1 to 25.

Further, in the codec engine 1516, the present disclosure (that is, the function of the image encoding apparatus and the function of the image decoding apparatus according to each of the above embodiments) may be implemented by hardware such as a logical circuit, or implemented by software such as an embedded program, or may be implemented by both of them.

The two examples of the configuration of the video processor 1332 have been described above. However, the video processor 1332 may have any configuration and may have a configuration other than the above two examples. Further, the video processor 1332 may be configured as one semiconductor chip or may be configured as a plurality of semiconductor chips. For example, the video processor 1332 may be a three-dimensional laminated LSI formed by laminating a plurality of semiconductors or may be implemented by a plurality of LSIs.

(Example of Application to Apparatus)

The video set 1300 can be incorporated in various apparatuses that process image data. For example, the video set 1300 can be incorporated in the television apparatus 900 (FIG. 24), the portable telephone 920 (FIG. 25), the recording/reproducing apparatus 940 (FIG. 26), or the imaging apparatus 960 (FIG. 27). Incorporating the video set 1300 in an apparatus enables the apparatus to obtain effects similar to the effects described above with reference to FIGS. 1 to 22.

Further, even part of each configuration of the video set 1300 described above can be implemented as a configuration to which the present disclosure is applied if the configuration includes the video processor 1332. For example, only the video processor 1332 can be implemented as a video processor to which the present disclosure is applied. Further, for example, as described above, the processor indicated by the dotted line 1341 or the video module 1311 can be implemented as a processor or a module to which the present disclosure is applied. Further, for example, the video module 1311, the external memory 1312, the power management module 1313, and the front end module 1314 can be combined and implemented as a video unit 1361 to which the present disclosure is applied. Any of the configurations can obtain effects similar to the effects described above with reference to FIGS. 1 to 22.

That is, any configuration that includes the video processor 1332 can be incorporated in various apparatuses that process image data similarly to the video set 1300. For example, the video processor 1332, the processor indicated by the dotted line 1341, the video module 1311, or the video unit 1361 can be incorporated in the television apparatus 900 (FIG. 24), the portable telephone 920 (FIG. 25), the recording/reproducing apparatus 940 (FIG. 26), or the imaging apparatus 960 (FIG. 27). Further, incorporating any of the configurations to which the present disclosure is applied in an apparatus enables the apparatus to obtain effects similar to the effects described above with reference to FIGS. 1 to 22 similarly to the video set 1300.

Further, in the present specification, the system means a set of a plurality of elements (e.g., apparatuses and modules (components)), and it does not matter whether all the elements are present in the same housing. Thus, a plurality of apparatuses that are housed in different housings and connected through a network and one apparatus that includes a plurality modules housed in one housing are both systems.

The effects described in the present specification are merely examples and not limited, and another effect may be achieved.

Embodiments of the present disclosure are not limited to the above embodiments, and can be variously modified without departing from the gist of the present disclosure.

For example, the present disclosure can also be applied to an encoding apparatus and a decoding apparatus of a coding system other than the HEVC system.

Further, the present disclosure can be applied to an encoding apparatus and a decoding apparatus that are used in receiving an encoded stream trough network media such as satellite broadcasting, cable television, the Internet, and a portable telephone or in processing an encoded stream on storage media such as an optical disk, a magnetic disk, and a flash memory.

Further, the present disclosure can have a configuration of cloud computing which processes one function in a shared and cooperated manner by a plurality of apparatuses through a network.

Further, in each step described in the above flowcharts can be executed by one apparatus and can also be executed by a plurality of apparatuses in a shared manner.

Further, in a case where a plurality of processes are included in one step, the plurality of processes included in the step can be executed by one apparatus and can also be executed by a plurality of apparatuses in a shared manner.

Although the preferred embodiments of the present disclosure have been described in detail above with reference to the accompanying drawings, the present disclosure is not limited to the above examples. It is apparent that a person having ordinary skill in the art to which the present disclosure belongs can conceive various modifications or corrections within the range of the technical idea described in the claims, and it is clearly understood that these modifications or corrections fall within the technical scope of the present disclosure.

Further, the present technology can also have the following configurations.

(1) An image encoding apparatus including:
a setting unit that sets a prediction mode used in encoding an image in a state in which there is a limitation on a type of a prediction mode to be a selection target according to a quantization parameter used in encoding the image; and
an encoding unit that encodes the image for each recursively partitioned coding block according to the prediction mode set by the setting unit.

(2) The image encoding apparatus according to (1), in which the setting unit sets a prediction mode used in encoding an image in a state in which there is a limitation on a prediction mode to be a selection target for each range of the quantization parameter.

(3) The image encoding apparatus according to (1) or (2), in which the setting unit sets a prediction mode used in encoding an image in a state in which a prediction mode having a small block size is a selection target and a prediction mode having a large block size is a non-selection target in a case where the quantization parameter is smaller than a threshold.

(4) The image encoding apparatus according to any of (1) to (3), in which the setting unit sets a prediction mode used in encoding an image in a state in which a prediction mode having a large block size is a selection target and a prediction mode having a small block size is a non-selection target in a case where the quantization parameter is equal to or larger than a threshold.

(5) The image encoding apparatus according to any of (1) to (4), in which the setting unit sets a prediction mode used in encoding an image in a state in which a prediction mode of asymmetric motion partitioning is a non-selection target.

(6) The image encoding apparatus according to any of (1) to (5), in which the setting unit sets a prediction mode used in encoding an image in a state in which a prediction mode having a block size equal to or larger than a predetermined size is a non-selection target.

(7) The image encoding apparatus according to any of (1) to (6), in which the setting unit changes a correspondence relationship between the quantization parameter and a prediction mode to be a selection target according to statistical information of the image.

(8) The image encoding apparatus according to any of (7), in which the setting unit changes the correspondence relationship between the quantization parameter and the prediction mode to be a selection target for each coding tree block (CTB) that is an origin of recursive partitioning of a coding block.

(9) The image encoding apparatus according to (7) or (8), in which the statistical information of the image is distributed information or motion information of the image.

(10) The image encoding apparatus according to any of (7) to (9), in which the setting unit changes a correspondence relationship between the quantization parameter and a prediction mode to be a selection target according to an application.

(11) The image encoding apparatus according to (10), in which the setting unit changes the number of prediction modes to be a selection target according to the application.

(12) The image encoding apparatus according to (10) or (11), in which the setting unit changes the type of a prediction mode to be a selection target according to the application.

(13) The image encoding apparatus according to any of (1) to (12), further including a memory that stores a correspondence relationship between the quantization parameter and a prediction mode to be a selection target in a table form,
in which the setting unit sets a prediction mode using a table stored in the memory.

(14) The image encoding apparatus according to any of (1) to (13), further including a learning unit that learns a pattern of a prediction mode to be limited according to a prediction mode set by the setting unit,
in which the setting unit sets a prediction mode according to the pattern learned by the learning unit.

(15) The image encoding apparatus according to (14), in which the learning unit learns the pattern of the prediction mode to be limited according to a type of the image or statistical information of the image.

(16) An image encoding method including:
setting a prediction mode used in encoding an image in a state in which there is a limitation on a type of a prediction mode to be a selection target according to a quantization parameter used in encoding the image by an image encoding apparatus; and
encoding the image for each recursively partitioned coding block according to the set prediction mode by the image encoding apparatus.

REFERENCE SIGNS LIST

12 Encoding apparatus
32 Screen rearrangement buffer
46 Intra prediction unit
47 Motion prediction/compensation unit
49 Rate control unit
50 Mode table setting unit
61 Statistical information calculation unit
62 Table selection unit
63 Table storage unit
100 Cloud computing
101 Server
102 Client
111 Database
121 Table selection unit
123 Registration unit

The invention claimed is:

1. An image encoding apparatus, comprising:
a setting unit configured to set a prediction mode to encode an image in a state in which there is a limitation on a type of the prediction mode to be a selection target, wherein the limitation is based on a quantization parameter of the image; and
an encoding unit configured to encode the image for each recursively partitioned coding block based on the prediction mode set by the setting unit.

2. The image encoding apparatus according to claim 1, wherein the setting unit is further configured to set the prediction mode in the state in which there is the limitation on the prediction mode to be the selection target, wherein the limitation is for each range of the quantization parameter.

3. The image encoding apparatus according to claim 2, wherein the setting unit is further configured to set the prediction mode in the state in which the prediction mode that has one of a small block size is the selection target or a large block size is a non-selection target based on the quantization parameter that is smaller than a threshold.

4. The image encoding apparatus according to claim 2, wherein the setting unit is further configured to set the prediction mode in the state in which the prediction mode that has one of a large block size is the selection target or a small block size is a non-selection target based on the quantization parameter that is one of equal to or larger than a threshold.

5. The image encoding apparatus according to claim 2, wherein the setting unit is further configured to set the prediction mode of a asymmetric motion partition as a non-selection target.

6. The image encoding apparatus according to claim 2, wherein the setting unit is further configured to set the prediction mode, in the state in which the prediction mode has a block size one of equal to or larger than a particular size, as a non-selection target.

7. The image encoding apparatus according to claim 1, wherein the setting unit is further configured to change a relation between the quantization parameter and the prediction mode to be the selection target based on statistical information of the image.

8. The image encoding apparatus according to claim 7, wherein the setting unit is further configured to change a relation between the quantization parameter and the prediction mode to be the selection target for each coding tree block (CTB) generated based on a recursive partition of a coding block.

9. The image encoding apparatus according to claim 7, wherein the statistical information of the image is one of distributed information or motion information of the image.

10. The image encoding apparatus according to claim 1, wherein the setting unit is further configured to change a relation between the quantization parameter and the prediction mode to be the selection target based on an application.

11. The image encoding apparatus according to claim 10, wherein the setting unit is further configured to change a number of prediction modes to be the selection target based on the application.

12. The image encoding apparatus according to claim 10, wherein the setting unit is further configured to change the type of the prediction mode to be the selection target based on the application.

13. The image encoding apparatus according to claim 1, further comprising a memory configured to store a relation between the quantization parameter and the prediction mode to be the selection target in a table form,
wherein the setting unit is further configured to set the prediction mode based on a table stored in the memory.

14. The image encoding apparatus according to claim 1, further comprising a learning unit configured to learn a pattern of the prediction mode to be limited based on the prediction mode set by the setting unit,
wherein the setting unit is further configured to set the prediction mode based on the pattern learned by the learning unit.

15. The image encoding apparatus according to claim 14, wherein the learning unit is further configured to learn the pattern of the prediction mode to be limited based on one of a type of the image or statistical information of the image.

16. A method, comprising:
setting a prediction mode to encode an image in a state in which there is a limitation on a type of the prediction mode to be a selection target based on a quantization parameter of the image, wherein the image is encoded by an image encoding apparatus; and
encoding the image for each recursively partitioned coding block based on the set prediction mode by the image encoding apparatus.

* * * * *